(12) United States Patent
Litman et al.

(10) Patent No.: US 12,409,668 B2
(45) Date of Patent: Sep. 9, 2025

(54) SYSTEMS AND METHODS FOR PRINTING A FLEXIBLE WEB AND PRINTING COMPOSITIONS

(71) Applicant: Cryovac, LLC, Charlotte, NC (US)

(72) Inventors: Stanley Litman, Amherst, NY (US); Tom Huang, East Amherst, NY (US); Morgan Ashley Smith, East Amherst, NY (US); Lawrence Albe Pilon, Hamburg, NY (US); Kevin John Hook, Grand Island, NY (US); Daniel Edward Kanfoush, Grand Island, NY (US); Anthony Vincent Moscato, N. Tonawanda, NY (US); Brett Christopher Rimes, Grand Island, NY (US); Alan Ronald Murzynowski, Grand Island, NY (US); Theodore F. Cyman, Grand Island, NY (US); Paul Coniglio, East Amherst, NY (US); Frank J. Rocco, N. Tonawanda, NY (US); Myron Chester Heeb, West Seneca, NY (US)

(73) Assignee: Cryovac, LLC, Charlotte, NC (US)

( * ) Notice: Subject to any disclaimer, the term of this patent is extended or adjusted under 35 U.S.C. 154(b) by 230 days.

(21) Appl. No.: 17/910,457

(22) PCT Filed: Mar. 11, 2021

(86) PCT No.: PCT/US2021/021869
§ 371 (c)(1),
(2) Date: Sep. 9, 2022

(87) PCT Pub. No.: WO2021/183742
PCT Pub. Date: Sep. 16, 2021

(65) Prior Publication Data
US 2023/0158812 A1 May 25, 2023

Related U.S. Application Data

(60) Provisional application No. 62/988,723, filed on Mar. 12, 2020, provisional application No. 62/988,731, filed on Mar. 12, 2020.

(51) Int. Cl.
B41J 11/00 (2006.01)
B41J 15/06 (2006.01)

(52) U.S. Cl.
CPC ........ *B41J 11/00222* (2021.01); *B41J 11/008* (2013.01); *B41J 15/06* (2013.01); *B41J 2203/011* (2020.08)

(58) Field of Classification Search
CPC . B41J 11/00; B41J 2/01; B41J 25/308; C09D 11/101; B41M 7/00; B41M 7/0045; B41M 5/52; B32B 27/08
See application file for complete search history.

(56) References Cited

U.S. PATENT DOCUMENTS 3,450,791 A    6/1969  Sekmakas et al.
5,091,444 A    2/1992  Bauer et al.
(Continued)

FOREIGN PATENT DOCUMENTS

CN    103386813    11/2013
CN    103534099    1/2014
(Continued)

OTHER PUBLICATIONS

Chemical Characterisation of Polyurethanes, May 14, 2018.
(Continued)

*Primary Examiner* — John Zimmermann
(74) *Attorney, Agent, or Firm* — Jason R. Womer

(57) ABSTRACT

A printing system comprises a transport apparatus adapted to transport a flexible web (24) along a process direction and first and second individually controllable inkjet imager units
(Continued)

(44, 60, 70, 82) offset from one another along the process direction. Each of the first imager unit and the second imager unit includes a first portion (226) operable to print on a first portion of the web and a second portion (228) operable to print on the second portion of the web wherein each of the first portion and second portion of the first and second imager units is stationary along the process direction and the lateral direction.

21 Claims, 34 Drawing Sheets

(56) References Cited

U.S. PATENT DOCUMENTS

| | | | |
|---|---|---|---|
| 5,352,283 A | 10/1994 | Beach et al. | |
| 5,397,387 A | 3/1995 | Deng et al. | |
| 5,453,122 A | 9/1995 | Lyon | |
| 5,556,925 A | 9/1996 | Kousaka et al. | |
| 5,652,286 A | 7/1997 | Deng | |
| 5,734,390 A | 3/1998 | Sakaizawa et al. | |
| 5,744,519 A | 4/1998 | Heraud et al. | |
| 5,760,123 A | 6/1998 | Vogt-Birnbrich et al. | |
| 5,764,254 A | 6/1998 | Nicoloff et al. | |
| 5,764,263 A * | 6/1998 | Lin | B41M 7/00 347/101 |
| 5,800,601 A | 9/1998 | Zou et al. | |
| 5,812,151 A | 9/1998 | Kishine | |
| 5,814,701 A | 9/1998 | Catena et al. | |
| 5,825,391 A | 10/1998 | Yang | |
| 5,874,488 A | 2/1999 | Wang et al. | |
| 5,883,644 A | 3/1999 | Nicoloff et al. | |
| 5,958,169 A | 9/1999 | Titterington et al. | |
| 6,028,126 A | 2/2000 | Wang et al. | |
| 6,033,048 A | 3/2000 | Nicoloff et al. | |
| 6,060,541 A | 5/2000 | Anderson et al. | |
| 6,069,218 A | 5/2000 | Vogt-Birnbrich et al. | |
| 6,103,780 A | 8/2000 | Matzinger et al. | |
| 6,136,382 A | 10/2000 | Kamen et al. | |
| 6,136,890 A | 10/2000 | Carlson et al. | |
| 6,179,417 B1 | 1/2001 | Lowry et al. | |
| 6,312,858 B1 | 11/2001 | Yacobucci | |
| 6,372,172 B1 | 4/2002 | Sudduth et al. | |
| 6,437,041 B1 | 8/2002 | Bosch et al. | |
| 6,531,228 B1 | 3/2003 | Bartelink et al. | |
| 6,670,002 B1 | 12/2003 | Sekiguchi et al. | |
| 6,682,779 B1 | 1/2004 | Wefringhaus et al. | |
| 6,780,231 B2 | 8/2004 | Scholz et al. | |
| 6,794,425 B1 | 9/2004 | Ellis et al. | |
| 6,852,763 B2 | 2/2005 | Noda | |
| 6,863,389 B2 | 3/2005 | Merz et al. | |
| 6,905,732 B1 | 6/2005 | Dunshee et al. | |
| 6,960,275 B2 | 11/2005 | Vesley et al. | |
| 6,986,808 B2 | 1/2006 | Fu et al. | |
| 7,022,385 B1 | 4/2006 | Nasser | |
| 7,132,014 B2 | 11/2006 | Mizutani et al. | |
| 7,176,248 B2 | 2/2007 | Valentini et al. | |
| 7,374,605 B2 | 5/2008 | Chung et al. | |
| 7,513,945 B2 | 4/2009 | Nakano et al. | |
| 7,637,605 B2 | 12/2009 | Mukata et al. | |
| 7,649,030 B2 | 1/2010 | Iu | |
| 7,740,694 B2 | 6/2010 | Sharmin et al. | |
| 7,785,410 B2 | 8/2010 | Renner et al. | |
| 7,828,426 B2 | 11/2010 | Brust et al. | |
| 7,871,467 B2 | 1/2011 | Sano et al. | |
| 7,872,060 B2 | 1/2011 | Schmid et al. | |
| 7,942,960 B2 | 5/2011 | Sano et al. | |
| 7,988,777 B2 | 8/2011 | Tanoue et al. | |
| 8,025,918 B2 | 9/2011 | Broguiere et al. | |
| 8,052,277 B2 | 11/2011 | Kim et al. | |
| 8,092,003 B2 | 1/2012 | Sloan | |
| 8,142,559 B2 | 3/2012 | Robertson et al. | |
| 8,187,371 B2 | 5/2012 | Brust et al. | |
| 8,192,008 B2 | 6/2012 | Brust et al. | |
| 8,227,524 B2 | 7/2012 | Rolly | |
| 8,267,505 B2 | 9/2012 | Jolly et al. | |
| 8,313,572 B2 | 11/2012 | Oyanagi et al. | |
| 8,430,492 B2 | 4/2013 | Falkner et al. | |
| 8,465,580 B2 | 6/2013 | Tanoue et al. | |
| 8,476,332 B2 | 7/2013 | Jeremic | |
| 8,480,223 B2 | 7/2013 | Shibata | |
| 8,492,456 B2 | 7/2013 | Chen et al. | |
| 8,563,634 B2 | 10/2013 | Deiner et al. | |
| 8,573,762 B1 | 11/2013 | Prasad | |
| 8,574,356 B2 | 11/2013 | Kagata et al. | |
| 8,623,126 B1 | 1/2014 | Brust et al. | |
| 8,664,331 B2 | 3/2014 | Richards | |
| 8,716,390 B2 | 5/2014 | Reisacher et al. | |
| 8,759,418 B2 | 6/2014 | Li et al. | |
| 8,777,396 B2 | 7/2014 | Mizes et al. | |
| 8,777,399 B2 | 7/2014 | Mo et al. | |
| 8,841,357 B2 | 9/2014 | Nagahama et al. | |
| 8,939,568 B2 | 1/2015 | Stoeva et al. | |
| 8,940,821 B2 | 1/2015 | Brust et al. | |
| 9,073,357 B1 | 7/2015 | Condello et al. | |
| 9,085,150 B2 | 7/2015 | Aoyama | |
| 9,090,734 B2 | 7/2015 | Kraiter et al. | |
| 9,180,705 B1 | 11/2015 | Regelsberger et al. | |
| 9,187,665 B2 | 11/2015 | Vasudevan et al. | |
| 9,228,096 B2 | 1/2016 | Overbeerk et al. | |
| 9,249,326 B2 | 2/2016 | Robertson et al. | |
| 9,309,438 B2 | 4/2016 | Lindekens et al. | |
| 9,375,031 B2 | 6/2016 | Boccacci et al. | |
| 9,376,582 B1 | 6/2016 | Dannhauser et al. | |
| 9,387,670 B1 | 7/2016 | Kelly et al. | |
| 9,434,201 B2 | 9/2016 | Dannhauser et al. | |
| 9,446,604 B2 | 9/2016 | Sarkisian et al. | |
| 9,493,013 B2 | 11/2016 | Chen et al. | |
| 9,790,380 B2 | 10/2017 | Verheggen et al. | |
| 9,868,869 B2 | 1/2018 | Litman et al. | |
| 10,336,094 B2 | 7/2019 | Ogura | |
| 10,350,904 B2 | 7/2019 | Hasegawa | |
| 10,414,168 B2 | 9/2019 | Yoshida | |
| 10,604,667 B2 | 3/2020 | Pilon et al. | |
| 10,738,208 B2 | 8/2020 | Ingle et al. | |
| 2001/0037749 A1 | 11/2001 | Ogawa et al. | |
| 2003/0144375 A1 | 7/2003 | Wu et al. | |
| 2004/0085419 A1 | 5/2004 | Yau et al. | |
| 2004/0189772 A1 * | 9/2004 | Arai | B41J 11/00212 347/102 |
| 2004/0252173 A1 * | 12/2004 | Ben-Zur | B41J 3/4078 347/101 |
| 2005/0025880 A1 | 2/2005 | Masuda | |
| 2005/0046680 A1 | 3/2005 | Cheng et al. | |
| 2005/0093956 A1 | 5/2005 | Egan | |
| 2005/0182154 A1 | 8/2005 | Berge et al. | |
| 2006/0001725 A1 | 1/2006 | Nagata et al. | |
| 2006/0100308 A1 | 5/2006 | Yau et al. | |
| 2006/0109327 A1 | 5/2006 | Diamond et al. | |
| 2006/0164487 A1 * | 7/2006 | Kadomatsu | B41J 11/00214 347/102 |
| 2006/0257760 A1 | 11/2006 | Mori et al. | |
| 2007/0142572 A1 | 6/2007 | Ogawa et al. | |
| 2007/0193692 A1 | 8/2007 | Arafat et al. | |
| 2007/0289487 A1 | 12/2007 | Ham et al. | |
| 2008/0006175 A1 | 1/2008 | King et al. | |
| 2008/0049055 A1 | 2/2008 | Edamura et al. | |
| 2008/0081124 A1 | 4/2008 | Sano et al. | |
| 2008/0136854 A1 | 6/2008 | Yamaguchi et al. | |
| 2008/0207805 A1 | 8/2008 | Blease et al. | |
| 2008/0207811 A1 | 8/2008 | Brust et al. | |
| 2008/0226880 A1 | 9/2008 | Parra Pastor et al. | |
| 2008/0227356 A1 | 9/2008 | Poruthoor et al. | |
| 2008/0254228 A1 | 10/2008 | Kojima et al. | |
| 2008/0317957 A1 | 12/2008 | Overbeek et al. | |
| 2009/0081423 A1 * | 3/2009 | Sano | B41J 15/04 427/210 |
| 2009/0169748 A1 | 7/2009 | House et al. | |
| 2009/0169749 A1 | 7/2009 | Brust et al. | |
| 2009/0182098 A1 | 7/2009 | Sano et al. | |
| 2009/0213151 A1 | 8/2009 | Dannhauser et al. | |
| 2009/0246484 A1 | 10/2009 | Kumagai et al. | |
| 2009/0306285 A1 | 12/2009 | Li et al. | |

(56) References Cited

U.S. PATENT DOCUMENTS

| | | |
|---|---|---|
| 2010/0046014 A1 | 2/2010 | Eun et al. |
| 2010/0239761 A1 | 9/2010 | Haenen et al. |
| 2010/0304057 A1 | 12/2010 | Zeng et al. |
| 2011/0032303 A1 | 2/2011 | Li |
| 2011/0058006 A1 | 3/2011 | Kobayashi |
| 2011/0239903 A1 | 10/2011 | Sujeeth et al. |
| 2012/0001980 A1 | 1/2012 | Ichinose et al. |
| 2012/0004348 A1 | 1/2012 | Reisacher et al. |
| 2012/0021193 A1 | 1/2012 | Lecolley et al. |
| 2012/0108717 A1 | 5/2012 | Park et al. |
| 2012/0135209 A1 | 5/2012 | Becker et al. |
| 2012/0162299 A1 | 6/2012 | Chappell |
| 2012/0223999 A1 | 9/2012 | Kraiter et al. |
| 2012/0306976 A1 | 12/2012 | Kitagawa et al. |
| 2012/0314009 A1 | 12/2012 | Kashara |
| 2012/0321863 A1 | 12/2012 | O'Donnell et al. |
| 2012/0329921 A1 | 12/2012 | Vasudevan et al. |
| 2013/0021406 A1 | 1/2013 | Stoeva et al. |
| 2013/0162722 A1 | 6/2013 | Brust et al. |
| 2013/0165618 A1 | 6/2013 | Brust et al. |
| 2013/0201250 A1 | 8/2013 | Berge |
| 2013/0221288 A1 | 8/2013 | Liu et al. |
| 2013/0224445 A1 | 8/2013 | Donohoe et al. |
| 2013/0237661 A1 | 9/2013 | Brust et al. |
| 2013/0265376 A1 | 10/2013 | Gil-Torrente et al. |
| 2013/0286087 A1 | 10/2013 | Berge |
| 2013/0300794 A1 | 11/2013 | Leighton et al. |
| 2013/0307914 A1 | 11/2013 | Chen et al. |
| 2014/0017461 A1 | 1/2014 | Matsuyama |
| 2014/0022321 A1 | 1/2014 | Komatsu |
| 2014/0037913 A1 | 2/2014 | Nagahama et al. |
| 2014/0085368 A1 | 3/2014 | Mo |
| 2014/0118449 A1 | 5/2014 | Sarkisian et al. |
| 2014/0134337 A1 | 5/2014 | Overbeerk et al. |
| 2014/0161985 A1 | 6/2014 | Gane et al. |
| 2014/0185064 A1 | 7/2014 | Muraji et al. |
| 2014/0240399 A1 | 8/2014 | Saito et al. |
| 2014/0290519 A1 | 10/2014 | Herrmann et al. |
| 2014/0364548 A1 | 12/2014 | Everhardus et al. |
| 2015/0038641 A1 | 2/2015 | Gobelt et al. |
| 2015/0118452 A1 | 4/2015 | Ohashi et al. |
| 2015/0119510 A1 | 4/2015 | Eliyahu et al. |
| 2015/0183192 A1 | 7/2015 | Bhattacharya et al. |
| 2015/0191602 A1 | 7/2015 | Denda |
| 2015/0210859 A1 | 7/2015 | Denda et al. |
| 2015/0225285 A1 | 8/2015 | Domey et al. |
| 2015/0232294 A1 | 8/2015 | Newhouse et al. |
| 2015/0315393 A1 | 11/2015 | Xu et al. |
| 2015/0344708 A1 | 12/2015 | Niu et al. |
| 2016/0031246 A1 | 2/2016 | Sreekumar et al. |
| 2016/0057901 A1* | 2/2016 | Sargeant ............... B32B 29/002 428/339 |
| 2016/0075154 A1* | 3/2016 | Häcker ................. B41J 25/304 347/104 |
| 2016/0107447 A1* | 4/2016 | Reder .................... B41J 2/2114 347/22 |
| 2016/0155030 A1 | 6/2016 | Blank et al. |
| 2016/0166446 A1 | 6/2016 | Warner et al. |
| 2016/0243820 A1* | 8/2016 | Yanaka ................... B41J 3/407 |
| 2016/0279978 A1 | 9/2016 | Stephens et al. |
| 2016/0355006 A1 | 12/2016 | Reder |
| 2017/0021641 A1* | 1/2017 | Goi ....................... C09D 11/107 |
| 2017/0072722 A1 | 3/2017 | Mueller et al. |
| 2017/0096570 A1 | 4/2017 | Litman et al. |
| 2017/0137648 A1 | 5/2017 | Seki et al. |
| 2017/0225460 A1 | 8/2017 | Strasemeier et al. |
| 2017/0321084 A1 | 11/2017 | Huang et al. |
| 2018/0016743 A1 | 1/2018 | Kido et al. |
| 2018/0118962 A1 | 5/2018 | Litman et al. |
| 2019/0118549 A1 | 4/2019 | Yasuda et al. |
| 2019/0171135 A1 | 6/2019 | Ota et al. |
| 2019/0283459 A1 | 9/2019 | Nakamura et al. |
| 2019/0375955 A1 | 12/2019 | Rahimi et al. |
| 2020/0047532 A1 | 2/2020 | Deighton et al. |
| 2020/0377762 A1 | 12/2020 | Deighton et al. |
| 2021/0053362 A1* | 2/2021 | Shigeta ................. B41J 2/2132 |

FOREIGN PATENT DOCUMENTS

| | | |
|---|---|---|
| CN | 104070837 | 10/2014 |
| CN | 105525531 | 4/2016 |
| CN | 105531721 | 4/2016 |
| CN | 105793811 | 7/2016 |
| CN | 106133072 | 11/2016 |
| CN | 106541715 | 3/2017 |
| CN | 109484037 | 3/2019 |
| DE | 102015205105 | 9/2016 |
| EP | 0709328 | 5/1996 |
| EP | 0795410 | 9/1997 |
| EP | 2927287 | 10/2015 |
| EP | 2933194 | 10/2015 |
| JP | 2001158135 A | 6/2001 |
| JP | 2016168756 | 9/2016 |
| WO | 9938699 | 8/1999 |
| WO | 2016128560 | 8/2016 |
| WO | 2017193039 | 11/2017 |
| WO | 2018156195 | 8/2018 |
| WO | 2019115608 A1 | 6/2019 |
| WO | 2019131204 A1 | 7/2019 |
| WO | 2019159859 A1 | 8/2019 |
| WO | 2019212494 | 11/2019 |

OTHER PUBLICATIONS

Takelac WS-4000 Polyurethane Resin Technical Datasheet, Apr. 25, 2018.

Takelac WS-5000 Polyurethane Resin Technical Datasheet, Apr. 25, 2018.

Takelac WS-6021 Polyurethane Resin Technical Datasheet, Apr. 25, 2018.

Wang Duoren, New Adhesive and Coating Materials, Beijing China Building Materials Press, May 2000.

* cited by examiner

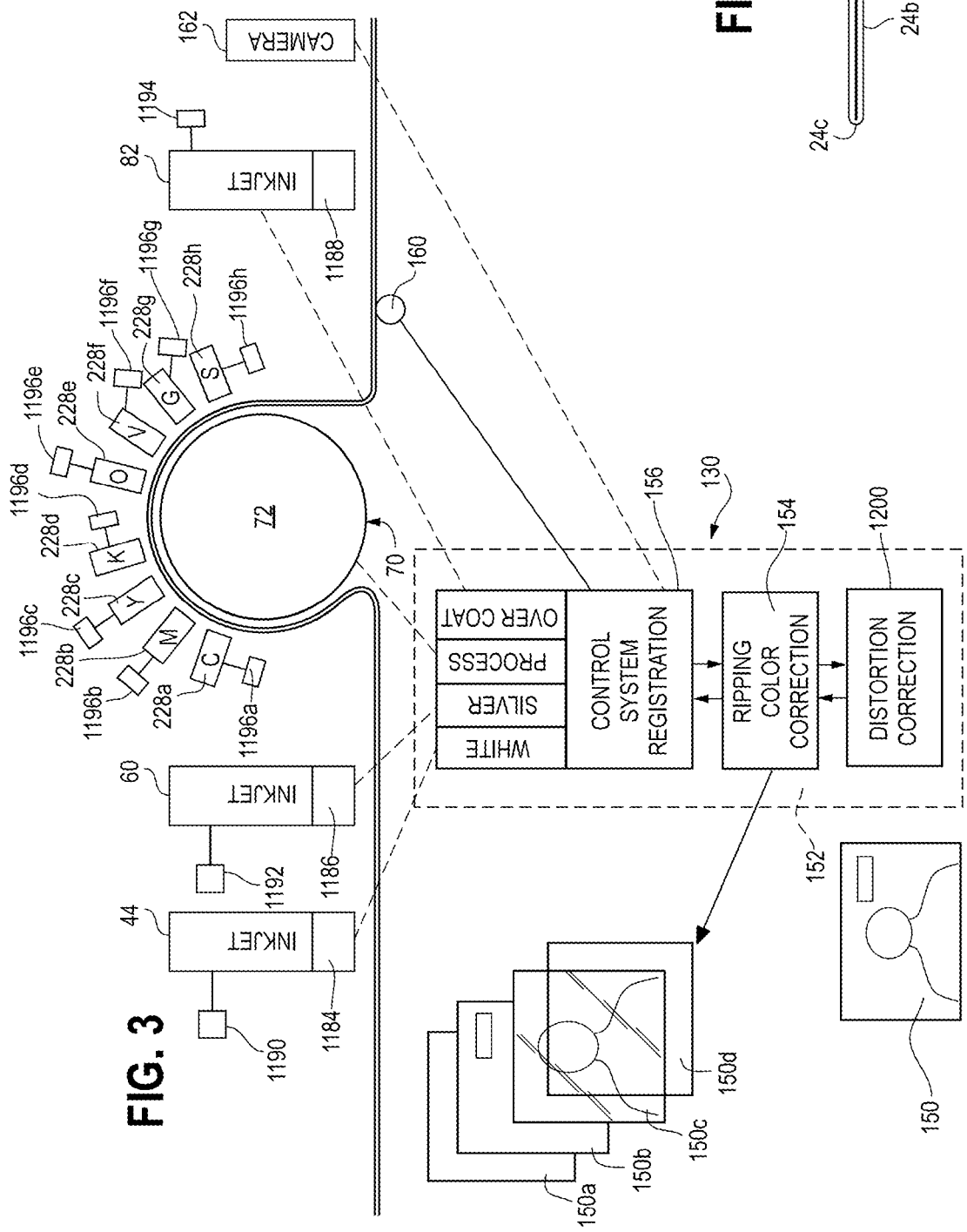

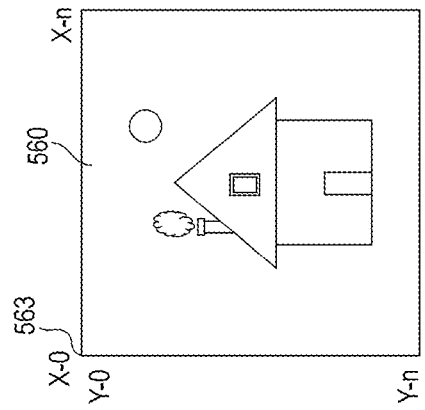
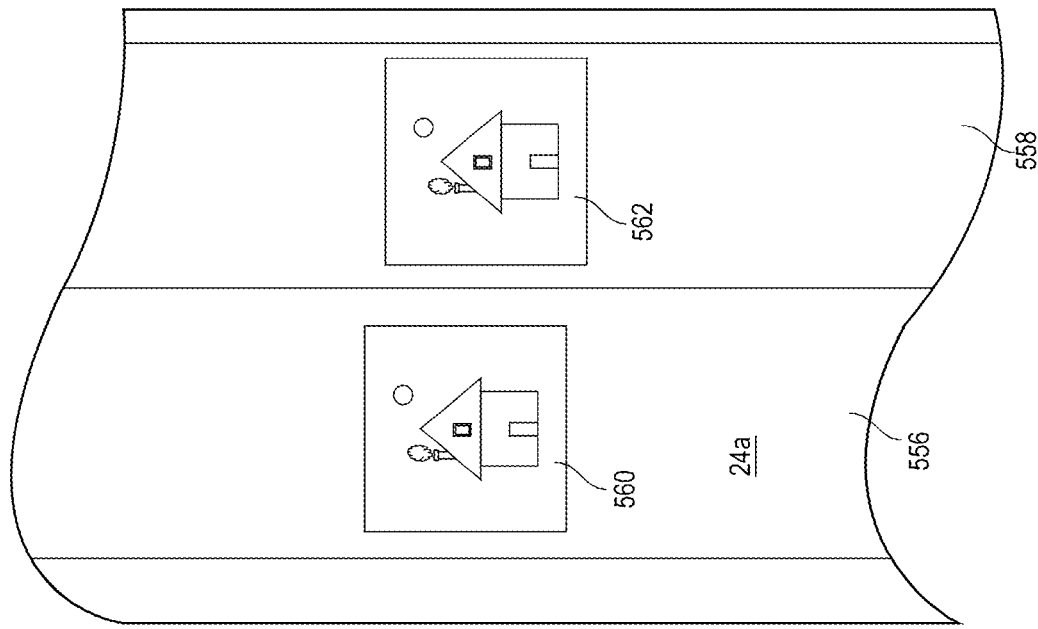

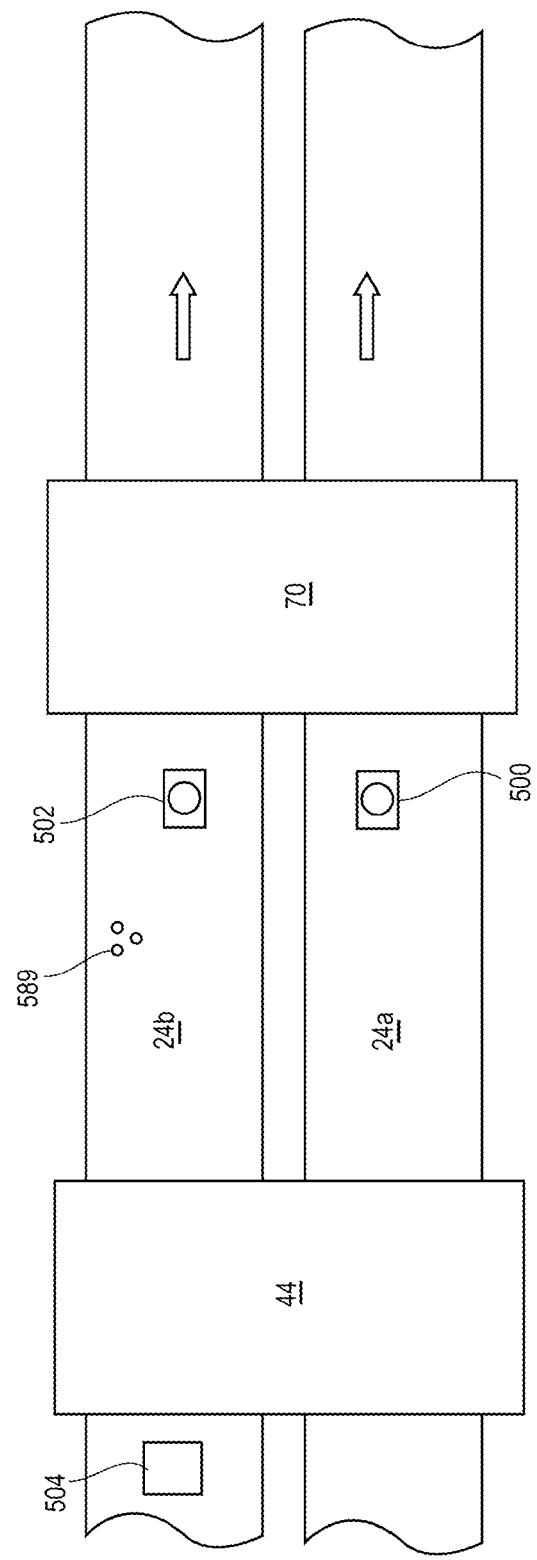

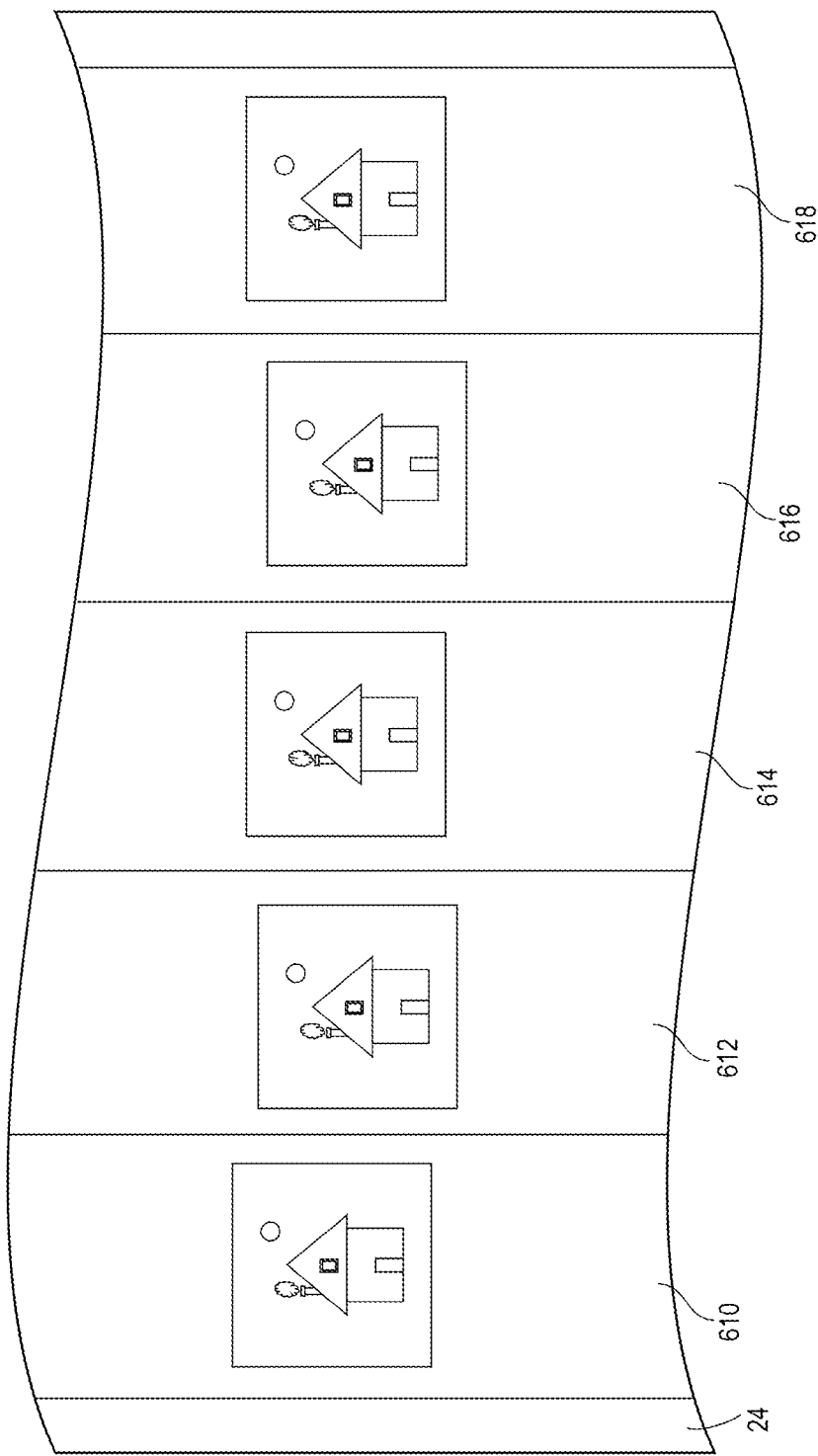

SYSTEMS AND METHODS FOR PRINTING A FLEXIBLE WEB AND PRINTING COMPOSITIONS

CROSS-REFERENCE TO RELATED APPLICATIONS

This application claims priority to U.S. Provisional Patent Application Ser. No. 62/988,723, filed Mar. 12, 2020 and entitled "Systems and Methods for Printing A Flexible Web and Printing Compositions," the entirety of which is incorporated herein by reference. This application claims priority to U.S. Provisional Patent Application Ser. No. 62/988,731, filed Mar. 12, 2020 and entitled "Systems and Methods for Printing A Flexible Web and Printing Compositions," the entirety of which is incorporated herein by reference.

BACKGROUND

The present subject matter relates to printing systems and methods, and more particularly to systems and methods for printing a flexible web.

Flexographic printing is a well-known technique in the printing industry utilizing a flexible relief plate. It is used for printing on many substrates, including plastic, metallic films, and other water impermeable material.

Ink jet printing is also a well-known technique wherein a digital image is recreated upon a substrate by depositing droplets of ink onto the substrate.

Additionally, high speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. These characteristics must be carefully taken into account during the system design process because it may be necessary: 1.) to control material shrinkage during imaging so that the resulting imaged film may be subsequently used in a shrink-wrap process, and 2.) to avoid system control problems by minimizing dynamic interactions between system components due to the elastic deformability of the substrate. Such considerations also impact the process of registering printed content so that the content is accurately reproduced.

Specifically, a flexible web may be printed simplex (i.e., on one side) or duplex (that is, two sided). In either event, separately printed images, even if printed by a single printing unit (e.g., a multi-color imager unit), must be accurately registered with one another to minimize misregistration errors, such as color shifts, moire, undesired dot gain effects, or the like.

Furthermore, the use of water-based inks and coatings for commercial print applications, including but not limited to flexography and ink jet printing, has been on the increase due in part to environmental and health concerns about volatile organic compounds ("VOC's") in solvent-based compositions that emit during the drying process.

Health concerns are highlighted when printing for the food industry. For instance, Switzerland has put legislation in place regulating food-packaging printing inks. A list of components that may be used in printing inks have been compiled in an effort to remove some substances deemed carcinogenic, mutagenic, or toxic to reproduction. While only required in Switzerland, the Swiss Ordinance RS 817.023.21 with respect to printing inks and coatings alike is generally accepted as useful when creating ink(s) and/or ink receptive compound(s) for indirect food contact purposes, such as for food packaging, worldwide.

As for general printing on a substrate or web that is porous or permeable, water within the ink is partially absorbed by the surface of the web during a drying process. However, there exists a problem when water-based inks are deposited on a web that is impermeable, such as a plastic web, metal web, and similar surfaces. Since inks dry primarily via evaporation during a drying and/or curing period, the lack of ability of the water-based ink to penetrate or absorb into the web itself leads to individual ink droplets spreading across the surface of the web. If a compilation of individual ink droplets spread and touch one another, the desired image quality may be adversely affected due to coalescing of the adjacent ink droplets. This is a problem that typically occurs with high-speed printing.

Additionally, another problem during high speed printing known as "ink retransfer" or "pickoff" may occur, where the ink for the printed image has not sufficiently dried before contacting another part of the web system, such as an idler roller, and the ink is transferred unintentionally from the printed area to the roller.

Furthermore, if during the printing process the temperature of the substrate exceeds the substrate's threshold for dimensional integrity, the substrate may shrink and/or deform leading to unusable product.

The discussion above is merely provided for general background information and is not intended to be used as an aid in determining the scope of the claimed subject matter.

BRIEF DESCRIPTION

According to one aspect, a printing system comprises a transport apparatus adapted to transport a flexible web along a process direction and first and second individually controllable ink jet imager units offset from one another along the process direction. Each of the first imager unit and the second imager unit includes a first portion operable to print on a first portion of the web and a second portion operable to print on the second portion of the web wherein each of the first portion and second portion of the first and second imager units is stationary along the process direction and the lateral direction. The first imager unit prints on the web at a first resolution and the second imager unit prints on the web at a second resolution different than the first resolution. A first closed-loop control system controls web handling and a distance of at least one of the first portion and the second portion of at least one of the first imager unit and the second imager unit from the web. A second closed-loop control system controls registration between the first imager unit and the second imager unit.

According to another aspect, a printing system for printing a heat-shrinkable web comprises a transport apparatus adapted to transport a flexible web along a process direction and first and second individually controllable ink jet imager units offset from one another along the process direction. Each of the first imager unit and the second imager unit includes a first portion operable to print on a first portion of the web and a second portion operable to print on the second portion of the web wherein each of the first portion and second portion of the first and second imager units is stationary along the process direction and the lateral direction. The first imager unit includes printheads that print on the web at a first resolution and the second imager unit includes printheads that print on the web at a second resolution different than the first resolution. A first closed-loop control system controls web handling and a distance of at least one of the printheads from the web and a second closed-loop control system is responsive to web temperature and controls print drying without substantial shrinking of the web. A third closed-loop control system controls registration between the first imager unit and the second imager unit.

According to yet another aspect, a printing system for printing a polymeric heat shrinkable web comprises a first imager unit for applying a first printing composition to the web, a second imager unit for applying a second printing composition to the web, and a closed-loop control system that controls web handling and a distance of at least one printhead of at least one of the first imager unit and the second imager unit from the web. The first printing composition comprises at least one of a polymer, a defoamer agent, a surfactant, a surface treatment agent, an opacifier, and water. The second printing composition comprises at least one of a pigment, a polymer, a co-solvent, a surfactant, and water.

According to a still further aspect, a printing system for printing a polymeric heat shrinkable web comprises a first imager unit for applying a first printing composition to the web, a second imager unit for applying a second printing composition to the web, and a closed-loop control system that controls web handling and a distance of at least one printhead of at least one of the first imager unit and the second imager unit from the web. The first printing composition comprises at least one of a viscosity modifier, a polymer, a surfactant, a defoamer agent, a surface treatment agent, an antimicrobial agent, and water. The second printing composition comprises at least one of a pigment, a polymer, a co-solvent, a surfactant, and water.

According to yet another aspect, a method of printing comprises the steps of transporting a flexible web along a process direction and providing first and second individually controllable ink jet imager units offset from one another along the process direction. Each of the first imager unit and the second imager unit includes a first portion operable to print on a first portion of the web and a second portion operable to print on the second portion of the web and each of the first portion and second portion of the first and second imager units is stationary along the process direction and the lateral direction. Further, the first imager unit is operable to print on the web at a first resolution and the second imager unit is operable to print on the web at a second resolution different than the first resolution. The method further includes the steps of controlling web handling, controlling a distance of at least one of the first portion and the second portion of at least one of the first imager unit and the second imager unit from the web, and controlling registration between the first imager unit and the second imager unit.

According to a still further aspect, a method of printing a heat-shrinkable web comprises the steps of transporting a flexible web along a process direction and operating first and second individually controllable ink jet imager units offset from one another along the process direction. Each of the first imager unit and the second imager unit includes a first portion operable to print at a first resolution on a first portion of the web and a second portion operable to print at a second resolution different than the first resolution on the second portion of the web. Further, each of the first portion and second portion of the first and second imager units is stationary along the process direction and the lateral direction and each of the first portions and each of the second portions includes at least one printhead. The method further includes the steps of controlling web handling, controlling a distance of at least one of the printheads from the web, controlling print drying web responsive to web temperature without substantial shrinking of the web, and controlling registration between the first imager unit and the second imager unit.

According to yet another aspect, a method of printing a web of polymeric heat-shrinkable material comprises the steps of operating a first imager unit for applying a first printing composition to the web, operating a second imager unit for applying a second printing composition to the web, and operating a closed-loop control system that controls web handling and a distance of at least one printhead of at least one of the first imager unit and the second imager unit from the web. The first printing composition comprises at least one of a polymer, a defoamer agent, a surfactant, a surface treatment agent, an opacifier, and water. The second printing composition comprises at least one of a pigment, a polymer, a co-solvent, a surfactant, and water.

According to another aspect, a method of printing a web of polymeric heat-shrinkable material comprises the steps of operating a first imager unit for applying a first printing composition to the web, operating a second imager unit for applying a second printing composition to the web, and operating a closed-loop control system that controls web handling and a distance of at least one printhead of at least one of the first imager unit and the second imager unit from the web. The first printing composition comprises at least one of a viscosity modifier, a polymer, a surfactant, a defoamer agent, a surface treatment agent, an antimicrobial agent, and water. The second printing composition comprises at least one of a pigment, a polymer, a co-solvent, a surfactant, and water.

According to another aspect, a printing system for printing a heat-shrinkable web comprises a transport apparatus adapted to transport a flexible web along a process direction and first and second individually controllable ink jet imager units offset from one another along the process direction wherein each of the first imager unit and the second imager unit includes a first portion operable to print on a first portion of the web and a second portion operable to print on the second portion of the web wherein each of the first portion and second portion of the first and second imager units is stationary along the process direction and the lateral direction. At least one dryer is operable to dry print on the web without substantial shrinking of the web. A first closed-loop control system is responsive to an indication of web temperature and controls the at least one dryer and a second closed-loop control system controls registration between the first imager unit and the second imager unit.

According to another aspect, a printing system for printing a heat-shrinkable web comprises a transport apparatus adapted to transport a flexible web along a process direction and first and second individually controllable ink jet imager units offset from one another along the process direction. Each of the first imager unit and the second imager unit includes a first portion operable to print on a first portion of the web and a second portion operable to print on the second portion of the web wherein each of the first portion and second portion of the first and second imager units is stationary along the process direction and the lateral direction and wherein the first imager unit prints on the web at a first resolution and the second imager unit prints on the web at a second resolution different than the first resolution. At least one dryer is operable to dry print on the web without substantial shrinking of the web. A first closed-loop control system is responsive to an indication of web temperature that controls the at least one dryer. A second closed-loop control system controls registration between the first imager unit and the second imager unit wherein the second closed-loop control system is adapted to register first content printed by the first portion of the first imager unit with content printed by the first portion of the second imager unit, register content printed by the second portion of the first imager unit with content printed by the second portion of the second imager unit, independently control the first portion and the second portion of the first imager unit, and independently control the first portion and the second portion of the second imager unit.

According to yet another aspect, a printing system for printing a polymeric heat shrinkable web comprises a first imager unit for applying a first printing composition to the web and a second imager unit for applying a second printing composition to the web. The first printing composition comprises at least one of a polymer, a defoamer agent, a surfactant, a surface treatment agent, an opacifier, and water. The second printing composition comprises at least one of a pigment, a polymer, a co-solvent, a surfactant, and water.

According to a still further aspect, a printing system for printing a polymeric heat shrinkable web comprises a first imager unit for applying a first printing composition to the web and a second imager unit for applying a second printing composition to the web. The first printing composition comprises at least one of a viscosity modifier, a polymer, a surfactant, a defoamer agent, a surface treatment agent, an antimicrobial agent, and water. The second printing composition comprises at least one of a pigment, a polymer, a co-solvent, a surfactant, and water.

Another aspect relates to a method of printing a heat-shrinkable web comprising the steps of transporting a flexible web along a process direction and operating first and second individually controllable ink jet imager units offset from one another along the process direction to apply water-based ink to the web. Each of the first imager unit and the second imager unit includes a first portion operable to print on a first portion of the web and a second portion operable to print on the second portion of the web wherein each of the first portion and second portion of the first and second imager units is stationary along the process direction and the lateral direction. The method further includes the steps of drying print on the web without substantial shrinking of the web, controlling the at least one dryer responsive to web temperature, and controlling registration between the first imager unit and the second imager unit.

According to a still further aspect, a method of printing a heat-shrinkable web comprises the steps of transporting a flexible web along a process direction and operating first and second individually controllable ink jet imager units offset from one another along the process direction to apply water-based ink to the web. Each of the first imager unit and the second imager unit includes a first portion operable to print on a first portion of the web and a second portion operable to print on the second portion of the web wherein each of the first portion and second portion of the first and second imager units is stationary along the process direction and the lateral direction. The method further includes the steps of drying print on the web without substantial shrinking of the web and controlling the at least one dryer responsive to web temperature. Still further, the method includes the step of controlling registration between the first imager unit and the second imager unit including the step of operating the second closed-loop control system to register first content printed by the first portion of the first imager unit with content printed by the first portion of the second imager unit, register content printed by the second portion of the first imager unit with content printed by the second portion of the second imager unit, independently control the first portion and the second portion of the first imager unit, and independently control the first portion and the second portion of the second imager unit.

According to another aspect, a method of printing a web of polymeric heat-shrinkable material comprises the steps of operating a first imager unit for applying a first printing composition to the web and operating a second imager unit for applying a second printing composition to the web. The first printing composition comprises at least one of a polymer, a defoamer agent, a surfactant, a surface treatment agent, an opacifier, and water. The second printing composition comprises at least one of a pigment, a polymer, a co-solvent, a surfactant, and water.

According to yet another aspect, a method of printing a web of polymeric heat-shrinkable material comprises the steps of operating a first imager unit for applying a first printing composition to the web and operating a second imager unit for applying a second printing composition to the web. The first printing composition comprises at least one of a viscosity modifier, a polymer, a surfactant, a defoamer agent, a surface treatment agent, an antimicrobial agent, and water. The second printing composition comprises at least one of a pigment, a polymer, a co-solvent, a surfactant, and water.

Other aspects and advantages will become apparent upon consideration of the following detailed description and the attached drawings wherein like numerals designate like structures throughout the specification.

This brief description is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 2 is an end elevational view of a polymeric film to be imaged by the system of FIG. 1;

FIG. 3 is a simplified functional block diagram of the print management system of FIG. 1;

FIG. 20 is a fragmentary plan view of the web with content portions printed in two lanes of the web;

FIG. 21 is an enlarged plan view of one of the printed content portions of FIG. 20;

FIG. 22 is fragmentary plan view of a portion of the web with imager units and sensors;

FIG. 23 is a fragmentary plan view of the web with content portions printed in five lanes of the web;

DETAILED DESCRIPTION

Figure 1:
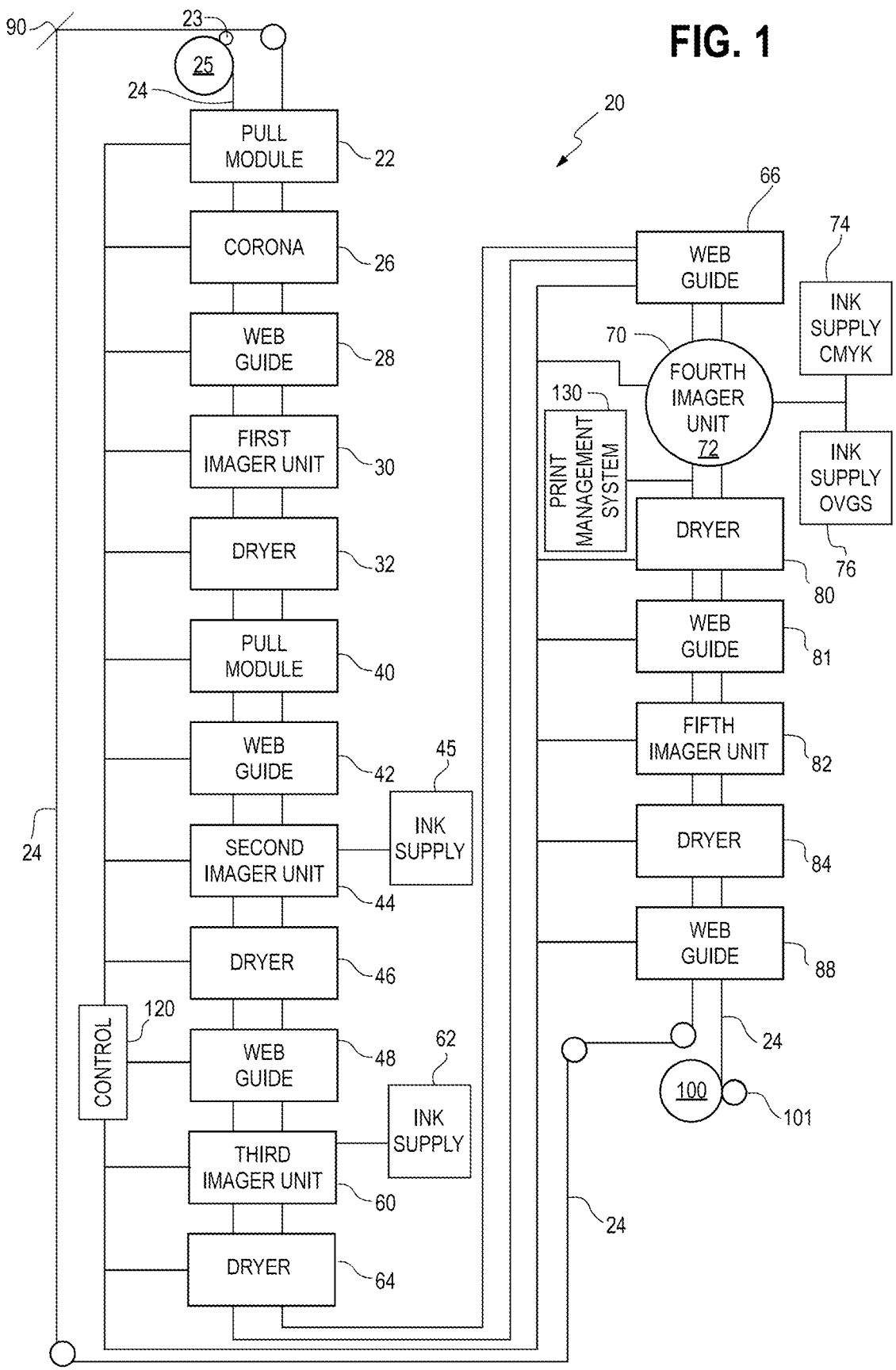
FIG. 1 is a simplified block diagram of an exemplary system for printing images and/or text on a substrate.

FIG. 1 shows an exemplary system 20 for printing content (e.g., images and/or text) on a substrate, such as a shrinkable plastic film used in food grade applications. It should be understood, however, that the system 20 may be used to print on any polymer or other flexible material that is dimensionally stable or unstable during processing for any application, e.g., other than food grade. The system 20 preferably operates at high-speed, e.g., on the order of zero to about 500 or more feet per minute (fpm) and even up to about 1000 fpm, although the system may be operable at a different speed, as necessary or desirable. The illustrated system 20 is capable of printing images and/or text on both sides of a substrate (i.e., the system 20 is capable of duplex printing) although this need not be the case. In the illustrated embodiment, a first side of a substrate is imaged by a sequence of particular units during a first pass, the substrate is then turned over and the other side of the substrate is imaged by all of the particular units or only by a subset of the particular units during a second pass. First portions of one or more of the particular units may be operable during the first pass and second portions of one or more of the particular units laterally offset from the first portions may be operable during the second pass. Also, one or more of the particular units may be capable of simultaneously treating and/or imaging both sides of the substrate during one pass, in which case such unit(s) need not be operable during the other pass of the substrate. In the illustrated embodiment, the first portions are equal in lateral extent to the second portions, although this is not necessarily the case. Thus, for example, the system may have a 52 inch width, and may be capable of duplex printing up to a 26 inch wide substrate. Alternatively, a 52 inch wide (or smaller) substrate may be printed on a single side (i.e., simplex printed) during a single production run. If desired, additional imager units and associated dryer and web guide units may be added in line with the disclosed imager units and other units so as to obtain full-width (i.e., 52 inch in the disclosed embodiment) duplex printing capability. Still further, a substrate having a different width, such as 64 inches (or larger or smaller width) may be accommodated.

Further, the illustrated system 20 may comprise a fully digital system that solely utilizes ink jet printers, although other printing methodologies may be utilized to image one or more layers, such as flexographic printing, lithographic offset printing, silk screen printing, intaglio printing, letterpress printing, etc. Ink jet technology offers drop on demand capability, and thus, among other advantages, allows high levels of color control and image customization.

In addition to the foregoing, certain ink jet heads are suitable to apply the high opacity base ink(s) that may be necessary so that other inks printed thereon can receive enough reflected white light (for example) so that the overprinted inks can adequately perform their filtering function. Some printhead technologies are more suitable for flood coating printing, like printing overcoat varnish, primers, and white, and metallic inks.

On the other hand, printing high fidelity images with high resolution printheads achieves the best quality. Using drum technology and printing with ink jet is the preferred way to maintain registration, control a flexible/shrinkable film substrate, and reproduce an extended gamut color pallet.

The system disclosed herein has the capability to print an extended gamut image. In some cases the color reproduction required may need a custom spot color to match the color exactly. In these cases, an extra eighth channel (and additional channels, if required) can be used to print custom color(s) in synchronization with the other processes in the system.

Printing on flexible/shrinkable films with water-based inks has many challenges and require fluid management, temperature control, and closed loop processes. Thus, in the present system, for example, the ability to maintain a high quality color gamut at high speed is further process controlled by sensor(s) that may comprise one or more calibration cameras to fine tune the system continually over the length of large runs.

As used herein, the phrase "heat-shrinkable" is used with reference to films which exhibit a total free shrink (i.e., the sum of the free shrink in both the machine and transverse directions) of at least 10% at 185° F., as measured by ASTM D2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D2732. Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

As shown in FIG. 1, the illustrated system 20 includes a first pull module 22 that unwinds a web of plastic web 24 from a roll 25 that is engaged by a nip roller 23 at the beginning of a first printing pass through the system 20. The web 24 may comprise a flattened cylinder or tube of plastic film comprising two layers having sides 24*a*, 24*b* (see FIG. 2) joined at side folds 24*c*, 24*d*, although the web 24 may instead simply comprise a single layer of material, if desired and as referred to above. Once unwound by the module 22, the web 24 may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment module may be capable of treating both sides of the web 24 simultaneously. A first web guide 28 of conventional type that controls the lateral position of the web 24 in a closed-loop manner then guides the corona-treated web 24 a first imager unit 30. A first dryer unit 32 is operated to dry the material that is applied to the web 24 by the first imager unit 30. The material applied by the first imager unit 30 may be deposited over the entirety of the web 24 or may be selectively applied only to some or all areas that will later receive ink.

A second pull module 40 and a second web guide 42 (wherein the latter may be identical to the first web guide 28) deliver the web 24 to a second imager unit 44 that prints a material supplied by a first supply unit 45 on the web 24. A second dryer unit 46 is operable to dry the material applied by the second imager unit 44.

Thereafter, the web 24 is guided by a third web guide 48 (again, which may be identical to the first web guide 28) to a third imager unit 60 that applies material supplied by a second supply unit 62 thereon, such as at a location at least partially covering the material that was deposited by the second imager unit 44. A third dryer unit 64 is operable to dry the material applied by the third imager unit 60 and the web 24 is then guided by a fourth web guide 66 (that also may be identical to the first web guide 28) to a fourth imager unit 70 comprising a relatively high resolution, extended color gamut imager unit 70.

The imager unit 70 includes a drum 72 around which are arranged ink jet printheads for applying primary process color inks CMYK to the web 24 along with secondary process color inks orange, violet, and green OVG and an optional spot color ink S to the web 24 at a relatively high resolution, such as 1200 dpi and at a high speed (e.g., 100-500 fpm). The extended gamut printing is calibrated at the high printing speed. The drop sizes thus applied are relatively small (on the order of 3-6 pL). If desired, the imager unit 70 may operate at a different resolution and/or apply different drop sizes. The inks are supplied by third and fourth supply units 74, 76, respectively, and, in some embodiments, the inks are of the water-based type. The process colors comprising the CMYK and OVG inks enable reproduction of extended gamut detailed images and high quality graphics on the web 24. A fourth dryer unit 80 is disposed downstream of the fourth imager unit 70 and dries the inks applied thereby.

Following imaging, the web 24 may be guided by a web guide 81 (preferably identical to the first web guide 28) and coated by a fifth imager unit 82 comprising an ink jet printer operating at a relatively low resolution and large drop size (e.g., 600 dots-per-inch (dpi), 5-12 picoliter (pL) size drops) to apply an overcoat, such as varnish, to the imaged portions of the web 24. The overcoat is dried by a fifth dryer unit 84. Thereafter, the web is guided by a web guide 88 (also preferably identical to the first web guide 28), turned over by a web turn bar 90, which may comprise a known air bar, and returned to the first pull module 22 to initiate a second pass through the system 20, following which material deposition/imaging on the second side of the web 24 may be undertaken, for example, as described above. The fully imaged web 24 is then stored on a take-up roll 100 engaged by a nip roll 101 and thereafter may be further processed, for example, to create shrink-wrap bags.

While the web 24 is shown in FIG. 1 as being returned to first the pull module 22 at the initiation of the second pass, it may be noted that the web may be instead delivered to another point in the system 20, such as the web guide 28, the first imager unit 30, the pull module 40, the web guide 42, or the imager unit 44 (e.g., when the web 24 is not to be pre-coated), bypassing front end units and/or modules, such as the module 22 and the corona treatment unit 26.

Further, in the case that the web 24 is to be simplex printed (i.e., on only one side) the printed web 24 may be stored on the take-up roll 100 immediately following the first pass through the system 20, thereby omitting the second pass entirely.

The web 24 may be multilayer and may have a thickness of 0.25 mm or less, or a thickness of from 0.5 to 30 mils, or from 0.5 to 15 mils, or from 1 to 10 mils, or from 1 to 8 mils, or from 1.1 to 7 mils, or from 1.2 to 6 mils, or from 1.3 to 5 mils, or from 1.5 to 4 mils, or from 1.6 to 3.5 mils, or from 1.8 to 3.3 mils, or from 2 to 3 mils, or from 1.5 to 4 mils, or from 0.5 to 1.5 mils, or from 1 to 1.5 mils, or from 0.7 to 1.3 mils, or from 0.8 to 1.2 mils, or from 0.9 to 1.1 mils. The web 24 may have a film percent transparency (also referred to herein as film clarity) measured in accordance with ASTM D 1746-97 "Standard Test Method for Transparency of Plastic Sheeting", published April, 1998, which is hereby incorporated, in its entirety, of at least 15 percent, or at least 20 percent, or at least 25 percent, or at least 30 percent.

Preferably, the system 20 includes a first tension zone between the roll 25 (which is a driven roll) and the pull module 22, a second tension zone between the pull module 22 and the imager unit 30, a third tension unit between the imager unit 30 and the pull module 40, a fourth tension zone between the pull module 40 and the imager unit 44, a fifth tension zone between the imager unit 44 and the imager unit 60, a sixth tension zone between the imager unit 60 and the drum 72, a seventh tension zone between the drum 72 and the imager unit 82, and an eighth tension zone between the imager unit 82 and the take-up roll 100 (which is a driven roll). One or more tension zones may be disposed between the imager unit 82 and the pull module 22 and/or at other points in the system 20. Each of the elements defining the ends of the tension zones comprises, for example, a driven roll (which, in the case of the imager units 30, 44, 60, 70, and 82, comprise imager drums) with a nip roller as described in greater detail hereinafter. Preferably, all of the tension zones are limited to about 20 feet or less in length. The web tension in each tension zone is controlled by one or more tension controllers such that the web tension does not fall outside of predetermined range(s).

The nature and design of the first, second, and third imager units 30, may vary with the printing methodologies that are to be used in the system 20. For example, in a particular embodiment in which a combination of flexographic and ink jet reproduction is used, then the first imager unit 30 may apply a composition comprising a clear primer and a dispersion of a white colorant, such as titanium dioxide, in a flood-coated fashion to the web 24. The second imager unit 44, which may comprise an ink jet printer or a flexographic unit, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a further embodiment, the first imager unit 30 comprises a flexographic unit that applies a white pigmented ink to the web 24, the second imager unit 44 comprises an ink jet printer or a flexographic unit that applies one or more metallic inks, and the third imager unit 60 comprises an ink jet printer or flexographic unit that applies a clear primer to the web 24.

In yet another embodiment that uses ink jet technology throughout the system 20, the first imager unit 30 comprising an ink jet printer may apply a composition comprising a clear primer and a dispersion of a white colorant, such as titanium dioxide, to the web 24. The second imager unit 44, which comprises an ink jet printer, may thereafter deposit one or more metallic ink(s) onto the web at least in portions that received material from the first imager unit 30. In such an embodiment, the third imager unit 60 is not required, and the imager unit 60 and dryer unit 64 and web guide 66 associated therewith may be omitted.

In a still further embodiment, the first imager unit 30 comprises an ink jet printer that applies a white pigmented ink to the web 24, the second imager unit 44 comprises an ink jet printer that applies one or more metallic inks, and the third imager unit 60 comprises an ink jet printer that applies a clear primer to the web 24.

Any one or more of the imager units 30, 44, 60, 70, and 82 may be omitted or the functionality thereof may be combined with one or more other imager units. Thus, for example, in the case where a combined primer and white pigmented material are applied, the combination may be printed by one of the imager units 30 or 44 and the other of the imager units 30, 44 may be omitted.

In some embodiments each of the first, second, and third imager units 30, 44, 60 comprises a 600 dpi inkjet printer that applies relatively large drops (i.e., at least 5-12 pL) each using piezoelectric ink jet heads, although the imager units 30, 44, and/or 60 may operate at a different resolution and/or apply different sizes of drops. Thus, for example, a printhead designed for use with metallic and precoating inks in the present system may have a resolution of 400 dpi and drop volume of 20-30 pL. The pre-coating material, white, and metallic inks have relatively heavy pigment loading and/or large particle sizes that are best applied by the relatively low resolution/large drop size heads of the imager units 30, 44, 60.

In alternative embodiments, one or more of the primer, white, and coating imager units may operate at a relatively high resolution and/or small drop size, such as 1200 dpi/3-6 pL.

The primer renders at least a portion of the surface of the web 24 suitable to receive later-applied water-based inks. It is preferable (although not necessary) to apply the primer just before the process and spot color inks are applied by the fourth imager unit 70 so that the such colors are directly applied to the dried primer.

Preferably, the fourth imager unit 70 comprises the above-described ink jet printer so that drop-on-demand technology may be taken advantage of, particularly with respect to print-to-print variability, high resolution, and the ability to control registration precisely.

The fifth imager unit 82 also preferably comprises an ink jet printer that operates at least at 1200 dpi or 2400 dpi, although it may instead be implemented by a different printing methodology, such as a flexographic unit.

As noted in greater detail hereinafter, a supervisory or global control system 120 is responsive to sensors (not shown in FIG. 1) and is responsible for overall closed-loop control of various system devices during a production run.

A further control system comprising a print management control system 130 controls the various imager units also in a closed-loop fashion to control image reproduction as well as color correction, registration, correct for missing pixels, etc. The print management control system 130 controls the various imager units 30, 44, 60, 70, and 82. For example, the imager unit 70 includes first and second imager portions 225, 227 wherein each imager portion 225, 227 comprises one or two printheads for each of the colors CMYK and OVG and the spot color S for a total of sixteen printheads (in the case that there is a single printhead per imager portion). Eight of the printheads 226a-226d and 228a-228d.

Also in the illustrated embodiment, each dryer unit 32, 46, 64, 80, and 84 is controlled by an associated closed-loop dryer management system (not shown in FIG. 1) during printing to, among other things, minimize image offsetting (sometimes referred to as "pick-off"), which can result in artifacts that may result from improper or insufficient drying of ink deposited on the web causing undried ink/coating to adhere (i.e., offset) to one or more system handling components, such as idler roller(s) or other component(s), and be transferred from such system handling component(s) to other portions of the web.

In the case of a partially or completely ink jet implemented system, the printheads used by the first through fifth imager units 30, 44, 60, 70, and/or 82 may be of the same or different types, even within each printer, and/or, as noted previously, different printing methodologies could be used to apply inks/coatings. In any event, the global control system 120 and/or the print management control system 130 is (are) programmed to convert input data representing the various layers, such as data in a print-ready source format (e.g., Adobe Portable Document Format or PDF) to bitmaps by a ripping process or other page representation(s) during pre-processing taking into account the operational characteristics of the various printhead types/printing methodologies (such as the resolution(s) and drop size(s) to be deposited) and properties of the web (such as shrinkage when exposed to heat).

In addition to the foregoing, one or more additional control systems may be provided, for example, to track and control the web 24 as the web 24 is conveyed through the system 20 and as described further hereinafter. The various control systems may be implemented together or separately by one or more suitable programmable devices, input sensors, and output control devices, as appropriate or desirable.

Referring next to FIG. 3, an exemplary embodiment of the print management control system 130 is illustrated in generalized form, it being assumed that the first imager unit 30 applies pre-coating material over a selected portion of or over the entire web 24 so that control of such imager unit 30 is straightforward and therefore not illustrated. The exemplary print management control system 130 takes in pages 150 in a print-ready format, such as PDF or another print-ready or non-print-ready format, and divides each page into data representing layers that are to be imaged by the imager units 44, 60, 70, and 82. More particularly, using the illustrated page 150 as an example, a processing unit 152 divides the data defining the page 150 into layer data representing four layers 150a, 150b, 150c, and 150d to be printed in white, silver, process colors (with an optional spot color), and overcoat, respectively, color corrects the layer data as needed taking into account the particular inks and web material, and converts the color corrected layer data into four layer bitmaps using a raster image processing (RIP) technique (block 154). The processing unit 152 then determines registration parameters that are used in conjunction with the layer bitmaps to control the individual imager units 44, 60, 70, and 82 (block 156) such that the layer images are accurately printed atop one another on the web 24.

The processing unit 152, which may comprise a suitably programmed computer or server or other programmable device, is responsive to feedback signals developed by sensors including a position encoder 160 and, optionally, a camera 162 that sense web position and the printed image so that the processing unit 152 and/or other controls can operate in a closed-loop manner during start up, shutdown and steady state operation.

It has been found that digitally imaging heat shrinkable extensible tube material presents web handling issues due to the risk of printhead damage from wrinkles and splices that are not a risk for normal flexographic imaging processes. Wrinkles in extensible film webs can be formed in several ways: 1.) air trapped in the web 24 forms pockets due to smooth nip points and the pockets wrap over solid idler rollers that inadvertently burst the air pockets during web movement and deform the material surface; 2.) the distance between contact points may be excessive, thereby allowing the material to fold onto itself; 3.) the alignment tolerances between contact rollers may be inadequately controlled, leading to wrinkle formation; and 4.) standard tension control methods are typically not sufficiently precisely controllable to avoid wrinkling.

Figure 4:
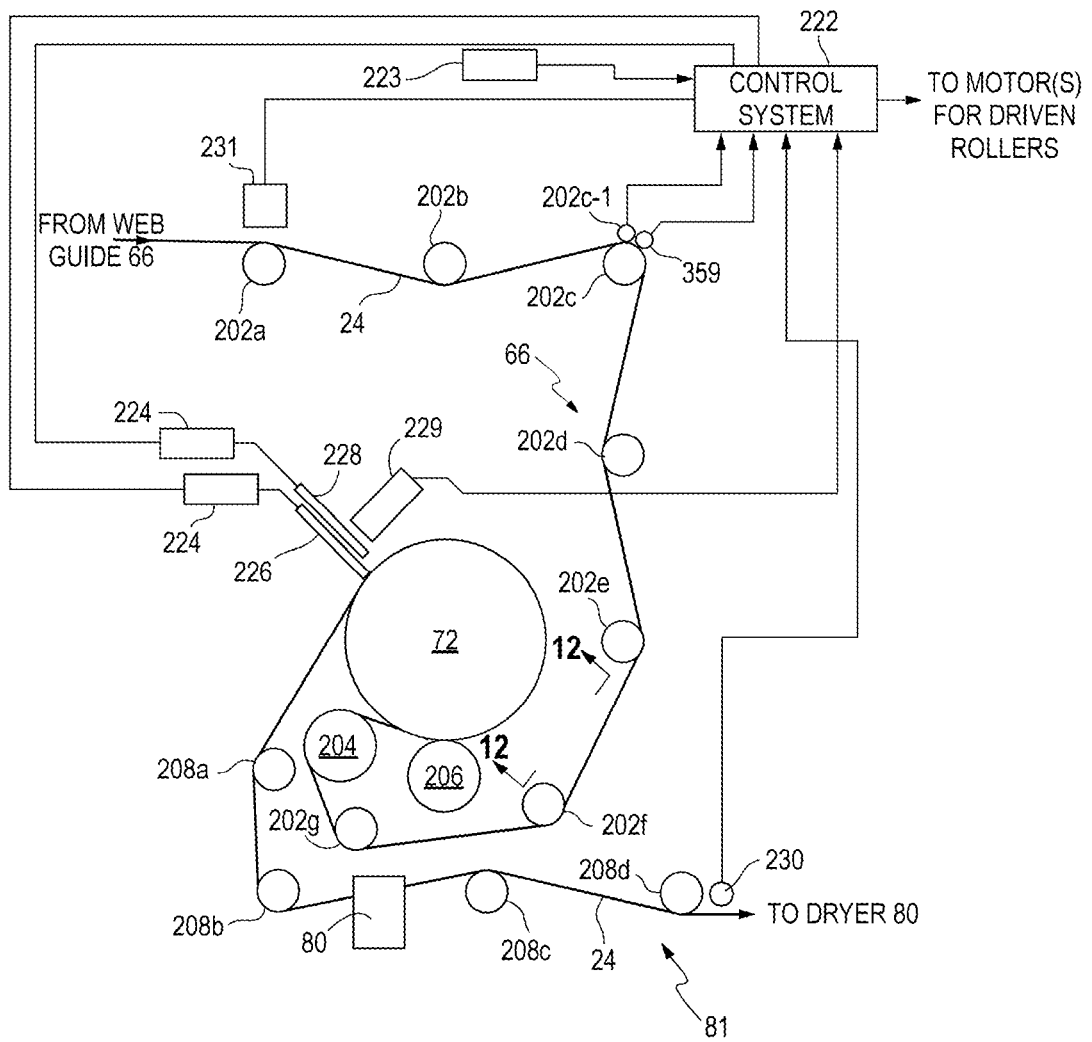
FIG. 4 is a combined diagrammatic view and block diagram of an exemplary embodiment of the fourth imager unit of FIG. 1 illustrating web rotatable devices and a control system.

In order to address these issues a web handling system 220, a portion of which is shown in FIG. 4, manages the travel of the web 24 to and from the fourth imager unit 70, for example. (It should be noted that the fourth imager unit 70 is inverted front-to-back as compared to the showing thereof in FIG. 3). Similar and/or identical components may be used to control the movement of the web at other portions of the system 20, as described in greater detail hereinafter. The web handling system 220 comprises journaled infeed idler rollers 202a-202g, a journaled spreader roller 204, a journaled nip roller 206 disposed adjacent the drum 72, and journaled outfeed idler rollers 208a-208d. It should be noted that a greater or lesser number of rollers may instead be used to transport the web 24, as necessary or desirable.

Figure 5:
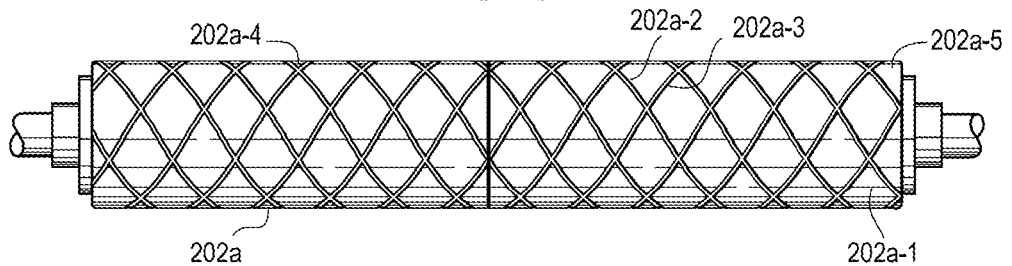
FIG. 5 is a side elevational view of an idler roller used in the embodiment of FIG. 4.
Figure 6:
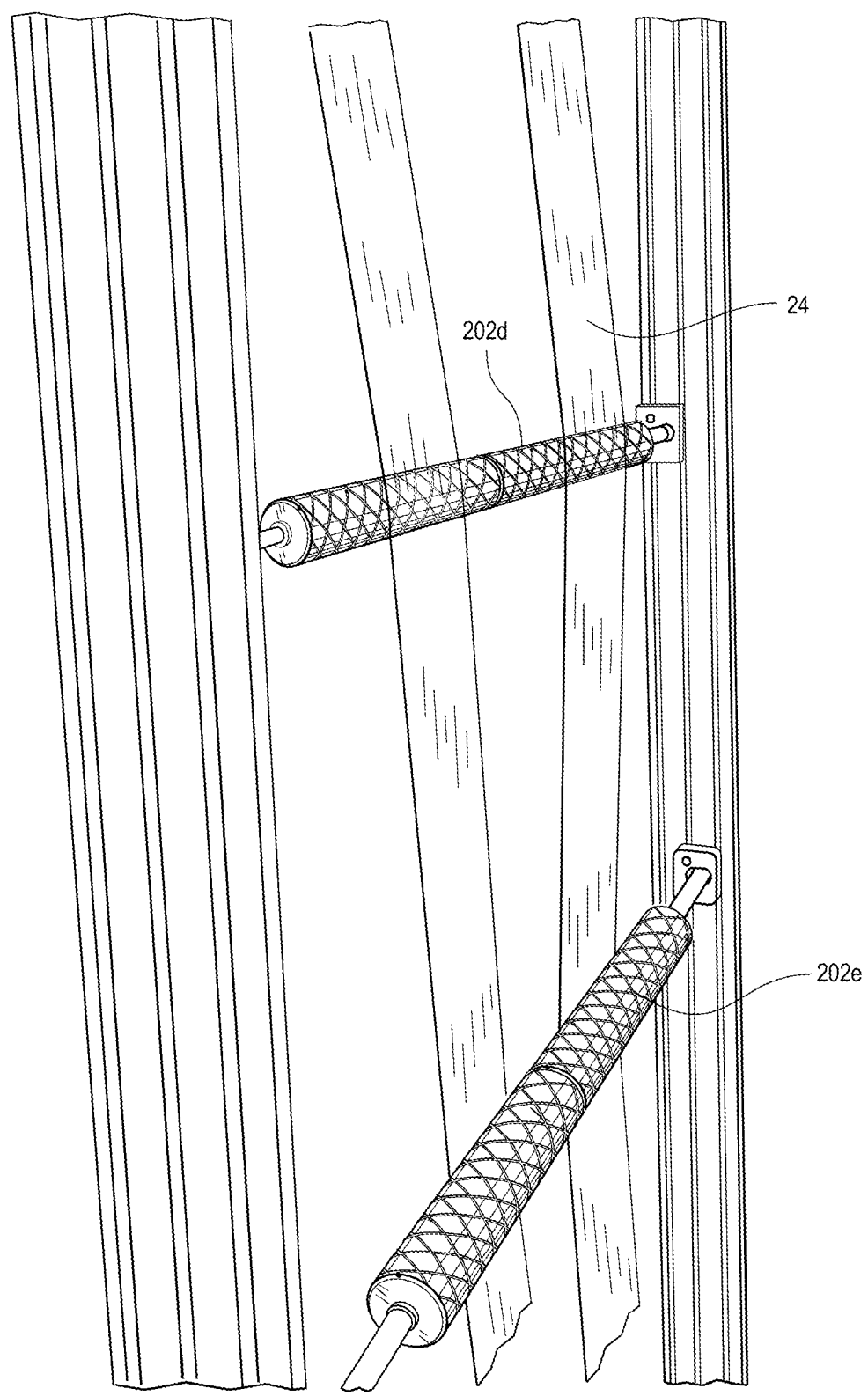
FIG. 6 is a fragmentary perspective side view of the rollers 202d and 202e of FIG. 4.
Figure 10:
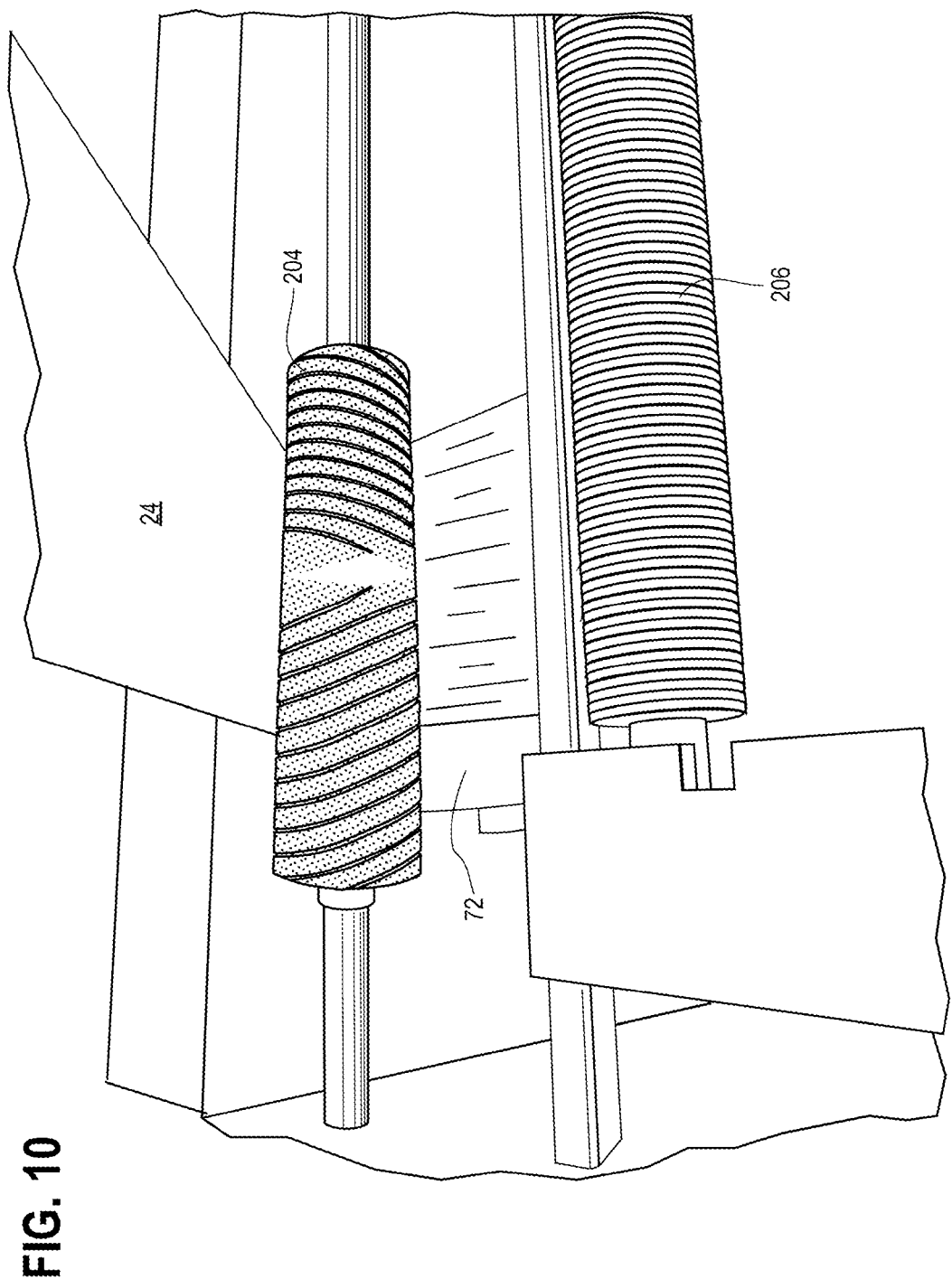
FIG. 10 is fragmentary side perspective view of the spreader roller 204, nip roller 206, and drum 72 of FIG. 4.

Referring to FIGS. 5, 6, and 10, in the illustrated embodiment the idler rollers 202 and 208 are identical to one another and each of the idler rollers 202, 208 is fabricated of a metal or other material. Referring specifically to FIG. 5, the idler roller 202a comprises a cylindrical surface 202a-1 and diagonally-extending grooves 202a-2 and 202a-3 that cross one another, preferably, but not necessarily, at right angles. The grooves 202a-2 and 202a-3 are all identical to one another Each of the idler rollers 202, 208, such as the idler roller 202a, preferably comprises two independently journaled (i.e., split) portions comprising halves 202a-4 and 202a-5 that are separated by a small distance, such as one-ten thousandths of an inch, so that the halves 202a-4 and 202a-5 can rotate in response to the passage of, for example, a 52 inch web thereover, or can rotate independently at different speeds in response to the passage of, for example, two 26 inch webs thereover. Preferably, each of the grooves 202a-2 and 202a-3 of each portion 202a-4 and 202a-5 has a V-shape or a U-shape that extends continuously from one axial end of each roller portion 202a-4 and 202a-5 to the other axial end of the roller portion 202a-4 and 202a-5. The spreader roller 204 may comprise any known or conventional spreader roller of any suitable type, such as a fixed bow roll, an adjustable bow roll, a concave web spreading roll, an ESR segmented expander roll, or an expander web spreading roll.

Figure 11:
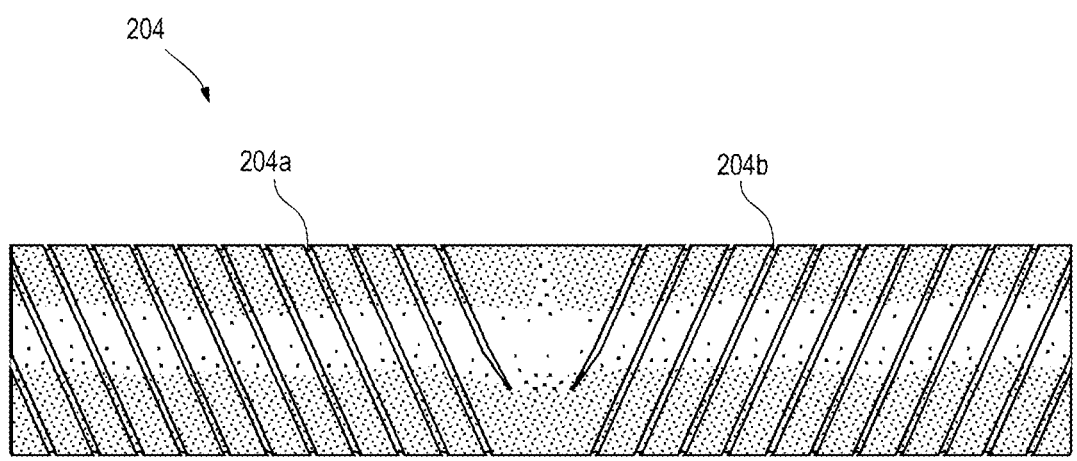
FIG. 11 is an elevational side view of the spreader roller of FIG. 10.

In the illustrated embodiment, the spreader roller 204 comprises a conventional resilient cylindrical roller with two spiral grooves 204a and 204b (FIG. 11).

Figure 7:
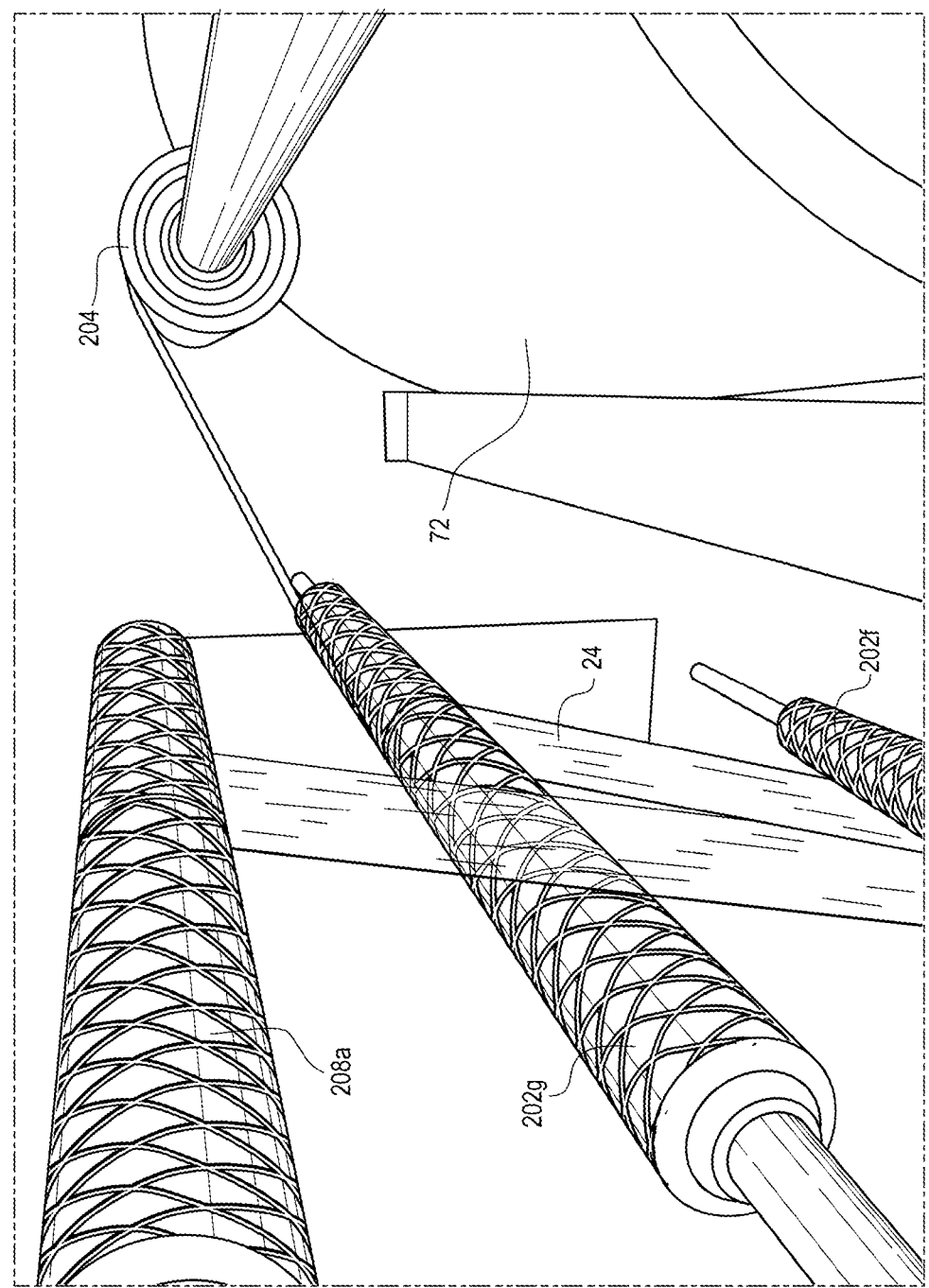
FIG. 7 is a fragmentary perspective view of the idler rollers 208a, 202g, and 202f, the spreader roller 204, and the drum 72 of FIG. 4.
Figure 8:
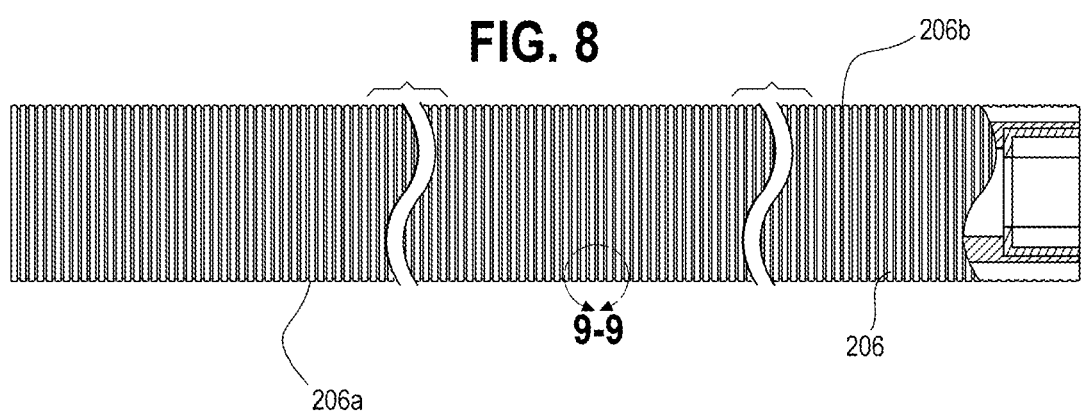
FIG. 8 is a side elevational view of the nip roller 206 used in the embodiment of FIG. 4.
Figure 9:
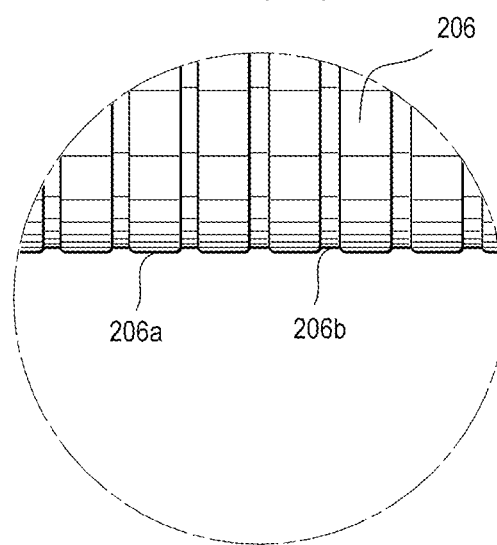
FIG. 9 is an enlarged fragmentary side elevational view of a portion of the nip roller 206 of FIG. 8.

Referring to FIGS. 7-9, the nip roller 206 is also of conventional or known design and comprises a resilient outer surface 206a and a plurality of grooves 206b. The grooves 206b are disposed perpendicular to a longitudinal axis of the roller 206 and are therefore parallel to one another. In the illustrated embodiment the grooves 206b have identical dimensions to one another and are equally spaced along the roller 206, although some or all of the grooves 206b may have different dimensions than some or all of the remaining grooves 206b. Further, in the illustrated embodiment each of the grooves 206b has a rectangular cross-sectional shape comprising a width parallel to the longitudinal axis of one-sixteenth of an inch, a depth of one-sixteenth of an inch, and a spacing between centers of adjacent grooves of one-quarter inch. Further, the outer surface 206a may be made of rubber or other suitable material. During operation, air trapped in the web 24 collects in the grooves 206b and passes through the nip with the drum 72 so that the air is not allowed to accumulate behind the nip and possibly stretch or burst the web 24.

Preferably, each idler roller 202 and 208 is spaced center to center from adjacent rollers 202, 204, 206, and 208 in a range between 38 to 28 inches, more preferably in a range between 36 to 30 inches, and most preferably in a range between 35 to 33 inches. Alternatively, each idler roller 202 and 208 is spaced center to center from adjacent rollers 202, 204, 206, and 208 no more than about 36 inches, and more preferably no more than about 34 inches, and most preferably less than or equal to about 30 inches so that the unsupported length of the web 24 is limited at all points in the system 220. Also, roller-to-roller alignment is precisely controlled by ensuring that the centerline of every roller 202, 204, 206, and 208 in the system is preferably aligned no more than about 0.001 inches per foot along the longitudinal axis of each roller to a selected single virtual datum point, and more preferably no more than about 0.00075 inches per foot along the longitudinal axis of each roller to a selected single virtual datum point, and most preferably less than or equal to about 0.0005 inches per foot along the longitudinal axis of each roller to a selected single virtual datum point. In addition, a spreader roller, such as the roller 204, is disposed at no greater than a particular distance before every critical nip point in the system 20. Specifically, the spreader roller 204 is preferably disposed a distance from the nip point between the nip roller 206 and the drum 72 in a range between about 6 inches to about 11 inches, more preferably in a range between about 6.5 inches and about 9.0 inches, and most preferably between about 7.0 inches and about 8.5 inches as measured between the point at which the web 24 leaves contact with the spreader roller 204 and the nip point. Alternatively, the spreader roller 204 is preferably disposed a distance from the nip point between the nip roller 206 and the drum 72 about 10 inches or less, more preferably about 8.5 inches or less, and most preferably about 7 inches or less as measured between the point at which the web 24 leaves contact with the spreader roller 204 and the nip point to maintain wrinkle free material in the nip. Thus, the system 220 may have the foregoing parameter magnitudes comprising a roller spacing between adjacent rollers of no greater than 34 inches, an alignment no greater than about 0.001 inches per foot along the longitudinal axis of each roller to a selected single virtual datum point, and a distance of no greater than about 7 inches between a spreader roller and a nip point. One might alternatively use any other combination(s) of the foregoing recited parameter magnitudes as desired, such as a roller spacing of about 36 or about 30 inches, an alignment of about 0.00075 or about 0.0005 inches per foot, and a distance of about 10 inches or about 8.5 inches between a spreader roller and a nip point.

Each element defining the ends of the tension zones comprises a nip roller as seen in FIGS. 8 and 9 adjacent a driven roll or drum. Further, with the exception of the roll 25, a spreader roller such as the one shown in FIG. 11 and/or as described above is disposed upstream of each nip at the ends of the tension zones. Also, the web 24 is supported at the spacings described above within each tension zone by idler rollers similar or identical to the rollers 202, 208.

The system 200 may also incorporate a printhead gap control system. Further, while the foregoing is effective to minimize the incidence of wrinkle formation, wrinkling might still occur and/or splices may need to be accommodated. Thus, provision is made as described below to control printhead gapping and prevent damage to one or more ink jet printheads. While the control system 222 described below is shown in connection with the imager unit 70, identical or substantially similar control systems are used in connection with the remaining imager units 30, 44, 60, and/or 82, as should be evident. If desired, elements of the various control systems may be combined and/or shared and/or the systems may be completely separate. Inasmuch as the control system 222 controls the position of sixteen printheads, and the remaining imager units use fewer heads and operate potentially at different resolutions and/or drop sizes, the control systems other than that described hereinafter must be modified to take these differences into account, as should be evident to one of ordinary skill in the art. In the illustrated embodiment, first portions of the imager units 30, 44, 60, 70, and 82 print on the first side 24a of the web 24 and second portions of the imager units 30, 44, 60, 70, and 82 print on the second side 24b of the web 24.

Figure 12:
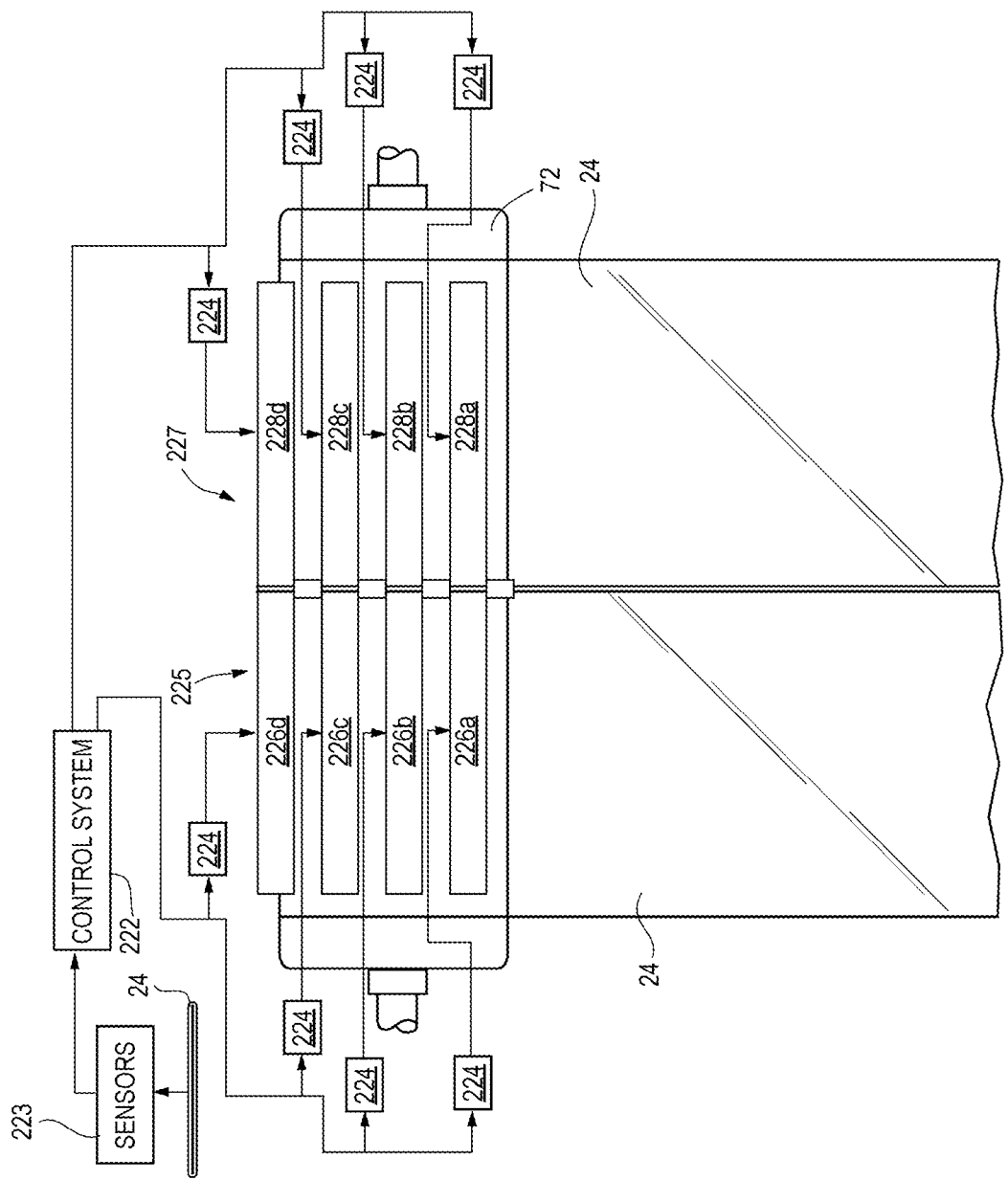
FIG. 12 is a combined fragmentary side elevational and block view of a further portion of the imager unit and control system with associated components taken generally along the lines 12-12 of FIG. 4.

As seen in FIGS. 4 and 12, a plurality of thickness sensors 223 of any suitable type senses one or more thicknesses of the web 24, for example, at spaced points along the length or width thereof. The multiple sensors 223 may instead be replaced by a single sensor, such as a CCD camera that extends across the full or partial width of the web 24, if desired. The control system 222 is responsive to the output(s) of the sensors 223 and comprises and controls a plurality of actuators 224 that control the distance of the faces of various printheads of two imager portions each comprising one or two printheads, wherein a printhead 226 and 228 of each portion are shown in generalized form in FIG. 4, eight of which 228a-228h are shown in FIG. 3, and eight of which 226a-226d and 228a-228d are shown in FIG. 12, it being understood that there are sixteen printheads in total comprising two for each of the colors CMYK and OVG and the spot color S (in the event that each imager portion includes a single printhead). Specifically, with reference to FIG. 12, the printheads 226a, 228a are independently operable and disposed in side-by-side relationship to apply cyan up to the full width of the web 24, the printheads 226b, 228b are disposed in side-by-side relationship and are independently operable to apply magenta up to the full width of the web 24, and so on for the remaining printheads (as seen in FIG. 3 the printheads 226, 228 are disposed about the periphery of the drum 72 and the printheads 226, 228 for the colors OVGS are disposed behind the drum 72 of FIG. 12 and are thus not visible in such FIG.). The printhead 226 for each color is laterally directly adjacent the printhead 228 for the same color (i.e., the innermost ejection orifices or ports of the printheads 226, 228 are spaced substantially equal to the spacing between the remaining adjacent orifices or ports of the printheads 226, 228) so that a full-width web may be imaged without creating a lateral gap between the portions imaged by the printheads 226, 228 on the web 24. Further, each of the printheads 226, 228 (as well as each of the printheads in the imager units 30, 44, 60, and 82) is stationary in the process direction and the lateral direction and is radially movable, preferably independently from one another, toward and away from the drum 72, and thus, from the web 24, by the actuators 224 responsive to the sensors 223 and remainder of the control system 222. The positions of the printheads 226, 228 may be determined by sensors, such as the position sensor 229 for one or the printheads 226 (like sensors are provided to sense the positions of the remaining printheads) and the actuators 224 may be controlled in a closed-loop fashion to obtain precise positioning. The system 222 thus allows for dynamic closed-loop printhead gapping from each printhead face to the drum 72 depending on the substrate thickness based on feedback developed by the sensors 223. In this regard, a web position encoder 230, which may be an optical device, (and which may comprise the position encoder 160 or may be separate therefrom) senses the web position and/or speed, for example by detecting sense marks printed on the web 24, during movement thereof so that the printheads 226 and/or 228 are properly positioned for optimal imaging as the web thickness changes at the drum 72. If desired, the gapping of one printhead may be the same as or different than the gapping of other printhead(s). In the preferred embodiment a printhead gapping distance of about 0.0405 to about 0.052 inches for substrate thicknesses ranging from about 0.0005 to about 0.012 inches can be accommodated, although a different gapping range, and hence, substrate thickness range, might alternatively be accommodated.

The thickness sensors 223 are also capable of detecting a splice and/or wrinkles in the web 24. Alternatively, a dedicated splice/wrinkle sensor 231 (FIGS. 4 and 13) of a conventional optical or other suitable variety may be provided at any suitable point of the web travel. For example, one may sense opacity increases or ultrasonic signal attenuation from multiple layers or splicing tape. In the event that a splice or wrinkle is detected, the control system 222, in response to a signal from the sensors 223 or 231, senses the output of the web position encoder 230 and, at the appropriate time just before the splice or wrinkle reaches the drum 72, temporarily retracts all of the printheads 226, 228 so that the splice or wrinkle does not damage any of the printheads. The control system 222 moves the printheads 226, 228 back to their appropriate gapping distances once the splice or wrinkle has passed the printheads.

The control system 222 also comprises a tension control that is responsive to one or more strain gauges disposed in one or more of the rollers 202, 208 (such as a strain gauge 202c-1 in the roller 202c of FIGS. 4 and 13) and/or other rollers in other tension zones and controls the speed of one or more driven rollers in the system 20, such as a drive motor 73 (FIG. 13) that controls the movement of the drum 72 and a drive motor 233 in the third imager unit 60 that supplies motive power to a driven roller 235, to control tension in the web 24 at each tension zone, such as the sixth tension zone.

Figure 13:
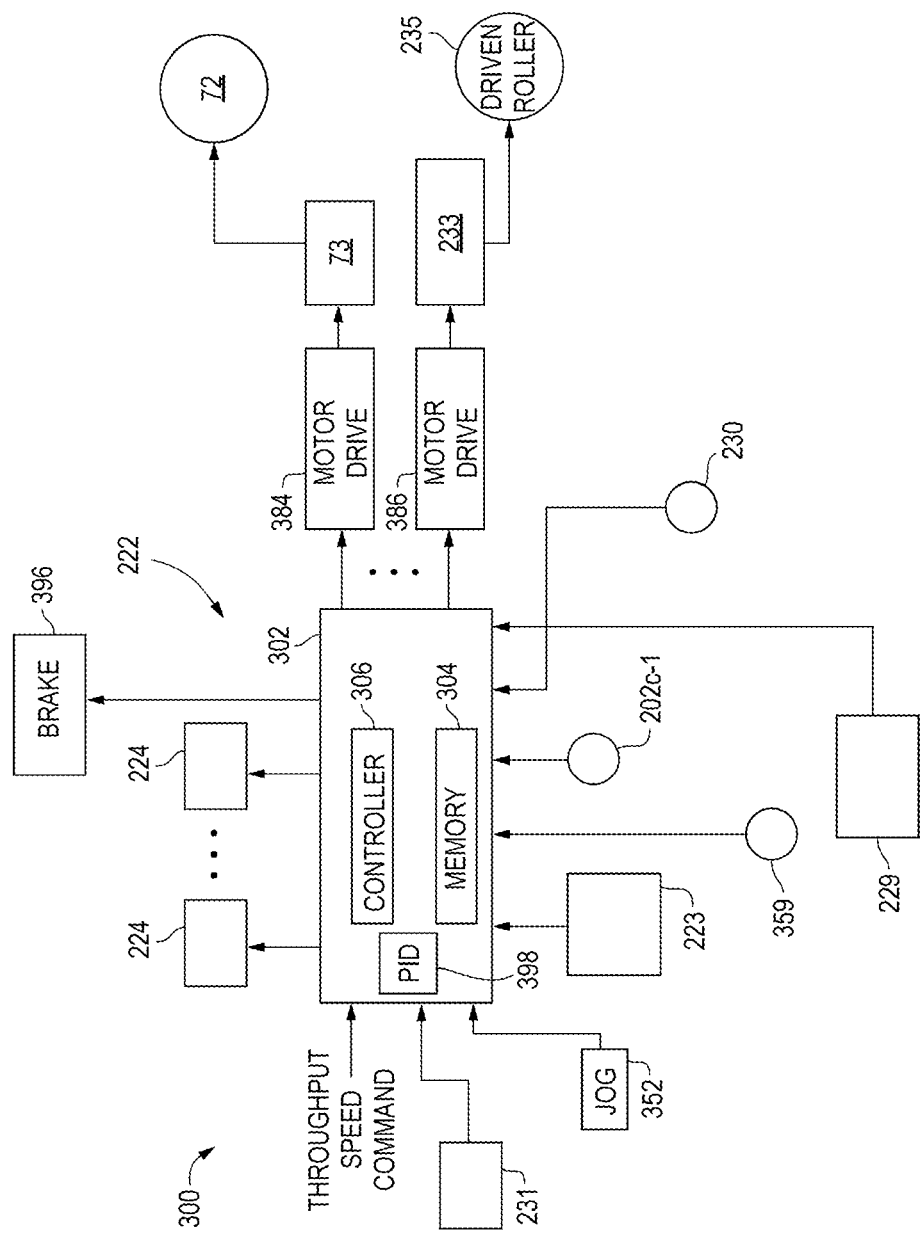
FIG. 13 is a block diagram of a computer system for implementing the control system of FIG. 4.

FIG. 13 illustrates a computer system 300 especially adapted to implement the control system 222, it being understood that any or all of the control systems disclosed herein, such as one or more of the control systems 120, 130, and/or the dryer control system(s), may be implemented by like computer systems or by the computer system 300. Thus, for example, the computer system 300 may also comprise the processing unit 152 and may implement the control system 222. The computer system 300 comprises a personal computer, server, or other programmable device 302 having a memory 304 that, among other things, stores programming executed by a processing module or controller 306 to implement the control system 222. The device 302 receives signals from the strain gauges including the strain gauge 202c-1, the web position encoder 230, and the sensors 223, 229, and 231 and controls the actuators 224 and the various drive motors, such as the drive motor 73 and drive motor 233 as noted below.

Figure 14:
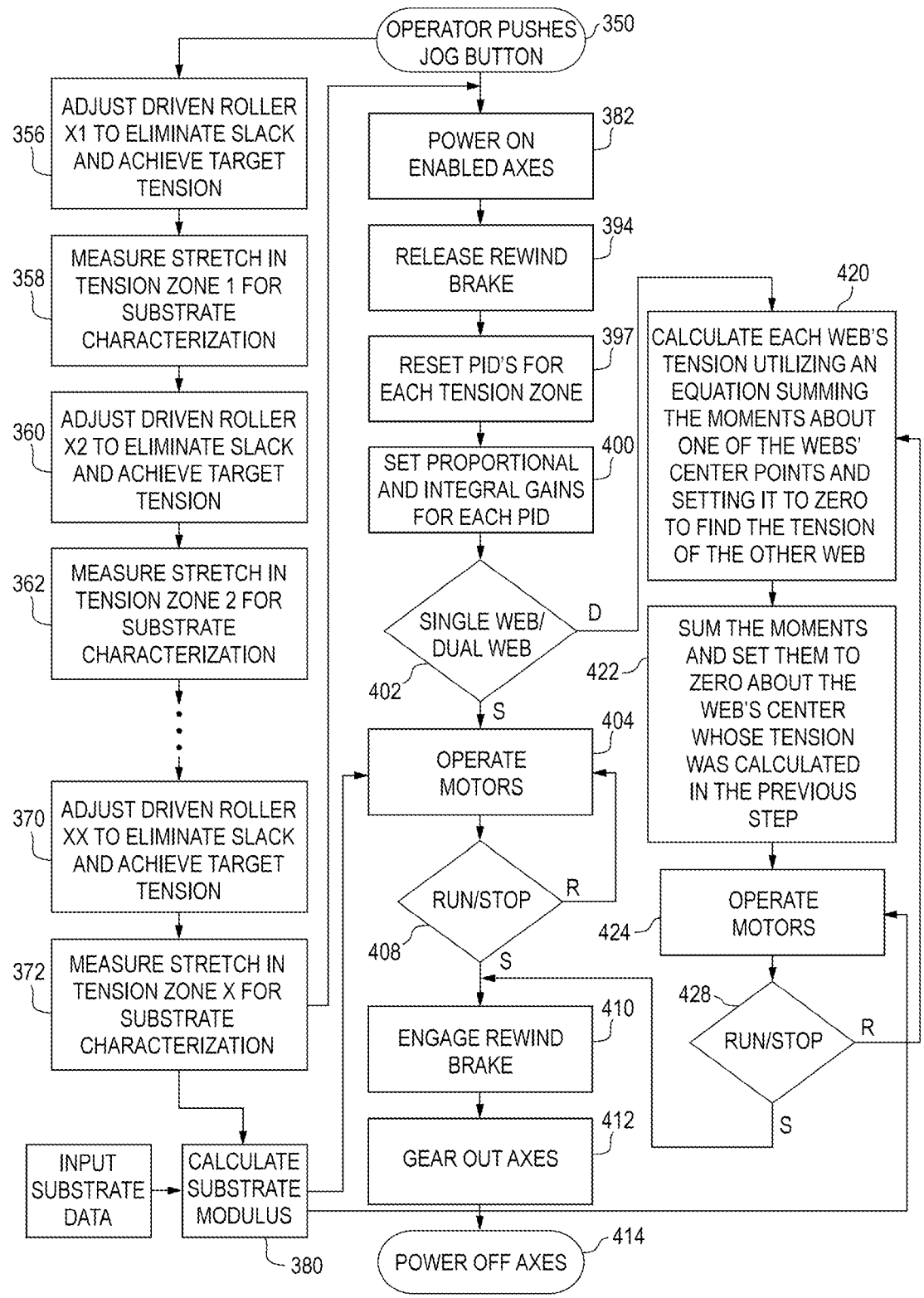
FIG. 14 is a flowchart of programming executed by the computer system of FIG. 13.

The programming illustrated in FIG. 14 is executed by the device 302 to implement the control system 222. The programming begins at a block 350 that detects when an operator has pushed a "jog" button 352 (FIG. 13) after first preloading the system 20 with the material of the web 24. In the latter regard, the web 24 is preferably loaded only through those system components that are to be active, and therefore enabled, during the pass(es) through the system 20, thereby bypassing unused system components.

Once the block 350 determines that the operator has pressed the jog button 352, control passes to a series of blocks that execute a pre-tensioning and web characterization sequence. A block 356 commands a driven roller in the first tension zone to eliminate slack in the first tension zone. Referring again also to FIG. 1, assuming that all of the components of the system 20 are enabled for use, the block 356 commands the driven roller in the pull module 22 to rotate until a target tension in the first tension zone is achieved, at which point the driven roller is maintained at such position. A block 358 then measures the stretch in the first tension zone so as to obtain a characterization of the substrate in the first tension zone. The stretch is calculated by the block 358 (and by subsequent blocks) using roller encoders disposed in idler rollers, such as a roller encoder 359 in the roller 202c of FIGS. 4 and 13, together with the tension sensed by one or more strain gauges in the respective tension zone, wherein the strain gauge(s) may be similar or identical to the strain gauge 202c-1 described above.

A block 360 identical to the block 356 commands the driven roller in the second tension zone comprising the driven roller in the first imager unit 30 to rotate and remove slack in the second tension zone until a target tension for the second tension zone is achieved. A block 362 identical to the block 358 then measures the stretching of the web 24 in the second tension zone so as to characterize the portion of the web 24 in such zone. Subsequent blocks identical to the blocks 356 and 358, such as blocks 370, 372, sequentially remove slack in the third through eighth remaining tension zones, tension the web 24 to target values, and measure stretch in each of the zones to characterize the web 24 in each of the third through eighth tension zones.

Following the block 372, a block 380 receives data concerning the substrate web 24 and calculates the modulus of elasticity of the material of the web 24. The data, which may be supplied by the operator, another person, or by indicia, such as a sensed barcode, may comprise information concerning the material of the web 24. The modulus of elasticity, the web characterization undertaken by the blocks 358, 362, 372 and corresponding blocks for other web tension zones, or both, may be used at a subsequent point in the programming as noted in greater detail hereinafter to establish PID controller parameters. Also, if the web characterization undertaken by the blocks 358, 362, 372 and corresponding blocks for other web tension zones indicates that there is a significant discrepancy between the measured characterization and the substrate data and/or the calculated substrate modulus of elasticity, action may be undertaken, such as immediately disabling the system 20, energizing a light and/or audible alarm, etc.

Also following the block 372 control pauses until the operator again presses the jog button 352 whereupon execution passes to a block 382 that initiates a production run. The block 382 supplies electrical power to the various motors and associated motor drives, such as the motor drives 384, 386 of FIG. 13.

Following the block 382, a block 394 releases a rewind brake 396 (FIG. 13) associated with the take-up roll 100 (FIG. 1). A block 397 thereafter resets proportional-integral-differential (PID) controllers 398 (FIG. 13) two of which are associated with one of the enabled tension zones. The PID controllers are implemented by the device 302. A block 400 then sets proportional and integral gains for each PID controller 398 to predetermined values.

Following the block 400, a block 402 checks to determine whether the web 24 is to be simplex printed or duplex printed. If the web is to be printed only on one side, control passes to a block 404 described in greater detail hereinafter that operates the various driven rollers for the enabled units so that a commanded system throughput is achieved. A block 408 checks to determine whether the operator has commanded that the system 20 be stopped. If not, control returns to the block 404, and control remains with the block 404 until the operator has commanded that the system 200 be stopped, whereupon control passes to a block 410.

The block 410 engages the rewind brake 396, a block 412 then slowly and in a controlled fashion reduces the speed commands for the various driven rollers in the enabled units, and a block 414 powers off the various motors to bring the web 24 to a controlled stop.

If the block 402 determines that the web is to be printed on both sides, control passes to a block 420 that sums multiple moments of inertia about a lateral centerline of a roller, such as an idler roller 202 or 208, in order to obtain an indication of the total tension developed by both webs in the tension zone in which the roller is disposed. The block 420 further sums multiple moments of inertia about a lateral centerline of a first one of the web portions supported by the roller 202 or 208 and the tension developed by a second one of the web portions is obtained by setting the latter sum of the moments calculated by the block 420 equal to zero in the determination of total tension.

A block 422 then calculates the tension in the first web by summing the moments of inertia about a lateral centerline of the second web and setting such summed moments to zero in the determination of total tension. A block 424 that is preferably identical to the block 404 operates the various driven rollers for the enabled units at proper speeds for a commanded throughput while also controlling tension in the tension zones. A block 408 then checks to determine whether the operator has commanded that the system 20 be stopped. If not, control returns to the block 420, and control remains in the loop comprising the blocks 420, 422, and 424 until the operator has commanded that the system 200 be stopped, whereupon control passes to the blocks 410, 412, and 414 so that the system 20 is brought to a controlled stop.

Figure 15:
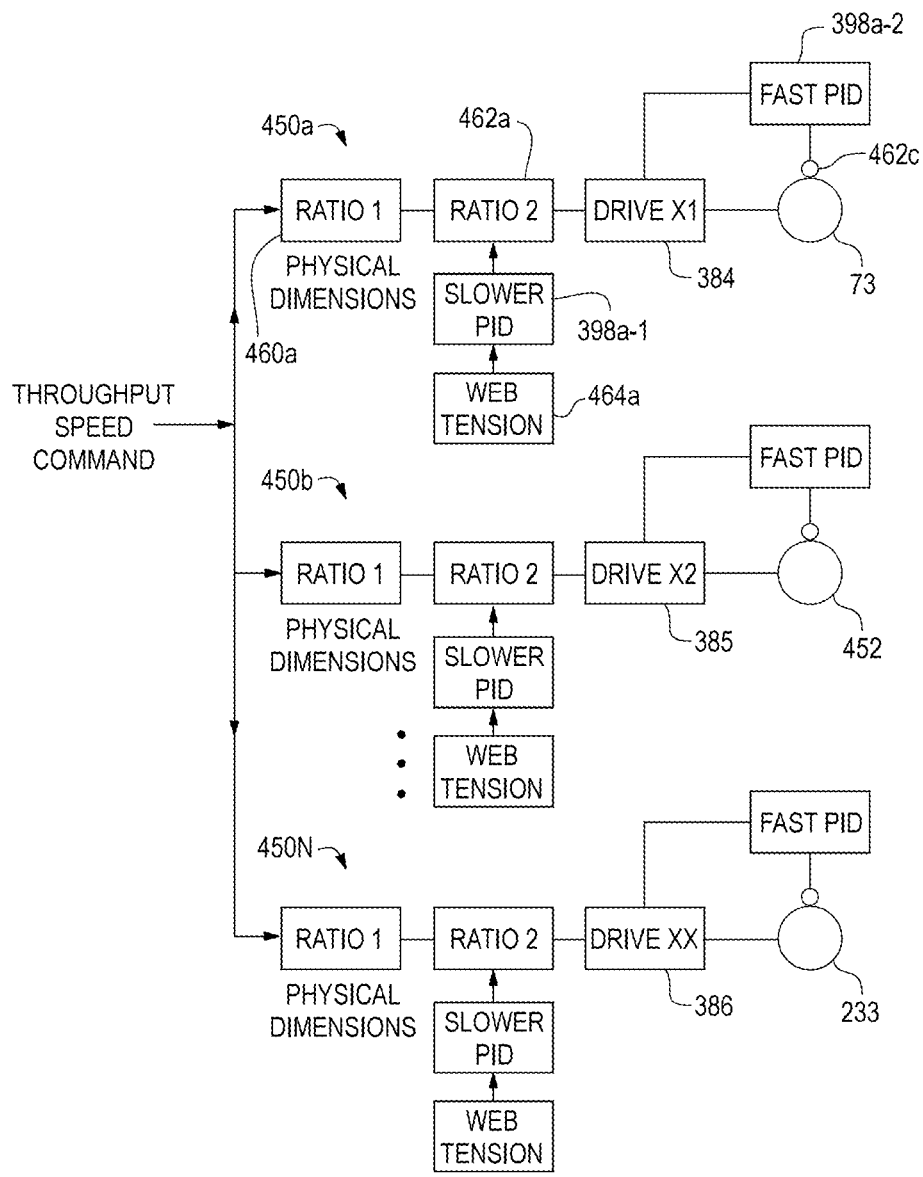
FIG. 15 is a flowchart of programming executed by the computer system together with hardware both as shown in FIG. 13 to implement each of the blocks 404 and 424 of FIG. 14.

FIG. 15 illustrates a combination of programming and hardware to implement each of the blocks 404 and 424 of FIG. 14. The programming is responsive to a throughput speed command entered by an operator (FIG. 13) to the computer system 300. The programming includes execution branches 450*a*, 450*b*, . . . , 450N that are preferably identical or similar to one another. The branch 450*a* controls, for example, the motor 73, the branch 450*b* controls a motor 452 that provides motive power to a driven roller in another tension zone, such as a driven roller in the imager unit 82 disposed in the seventh tension zone. The branch 450 N may control the drive motor 233 in the third imager unit 60. Other driven rollers are controlled by identical or similar execution branches 450.

Inasmuch as the execution branches 450 are identical or similar, only the execution branch 450*a* will be described in detail. The branch 450*a* begins at a block 460*a* that adjusts the throughput speed command by a first ratio that takes into account the diameter of the drum 72 so that the surface of the drum 72 moves at a commanded tangential speed to control web tension and system throughput. Next, a block 462*a* further modifies the speed command by a second ratio based upon a tension feedback signal developed by a tension sensor 464*a*, which may comprise one or more of the strain gauges such as the strain gauge 202*c*-1 (FIGS. 4 and 13) disposed in one or more of the rollers 202, 208, in this case, of the sixth tension zone, wherein the tension feedback signal is modified by a first one 398*a*-1 of the PID controllers 398. The resulting command signal is supplied to the motor drive 384 to operate the motor 73. A second one 398*a*-2 of the PID controllers 398 is responsive to a motor position feedback signal developed by a motor position sensor 462*c* and provides a modified feedback signal to the motor drive 384 so that the latter operates as a closed-loop controller. Significantly, the PID controller 398*a*-1 is a relatively slow controller so that tension is controlled over a relatively wide range by adjusting driven roller positions slowly.

On the other hand, the PID controller 398*a*-2 is a relatively fast-acting controller that maintains synchronized operation of the driven rollers.

Figure 16:
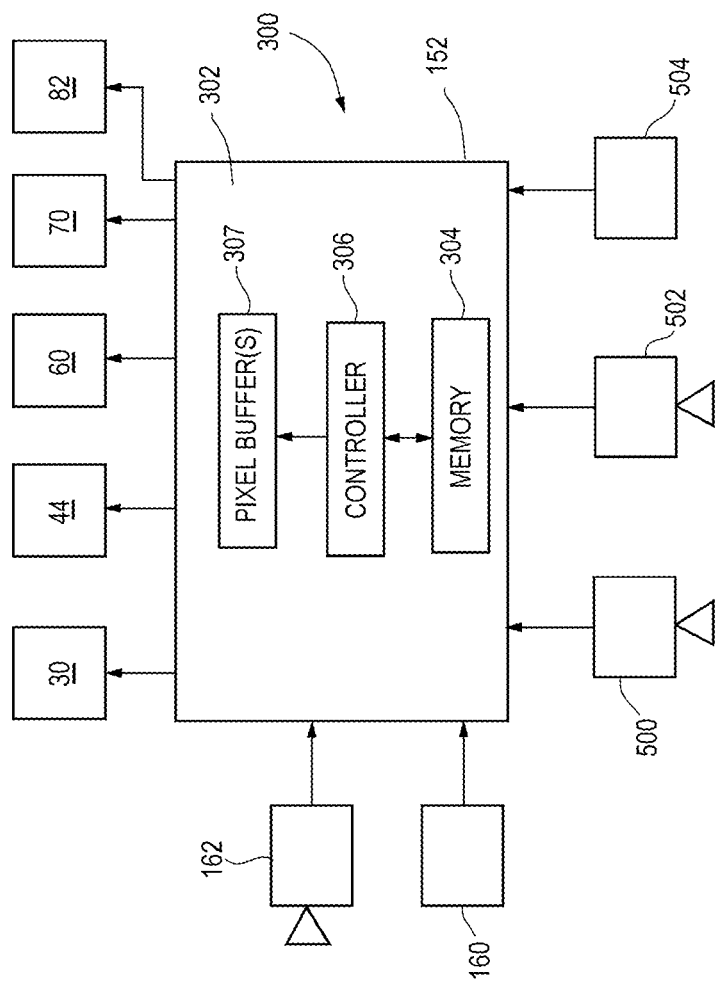
FIG. 16 is a block diagram of a computer system for implementing the print management system of FIG. 1.
Figure 17:
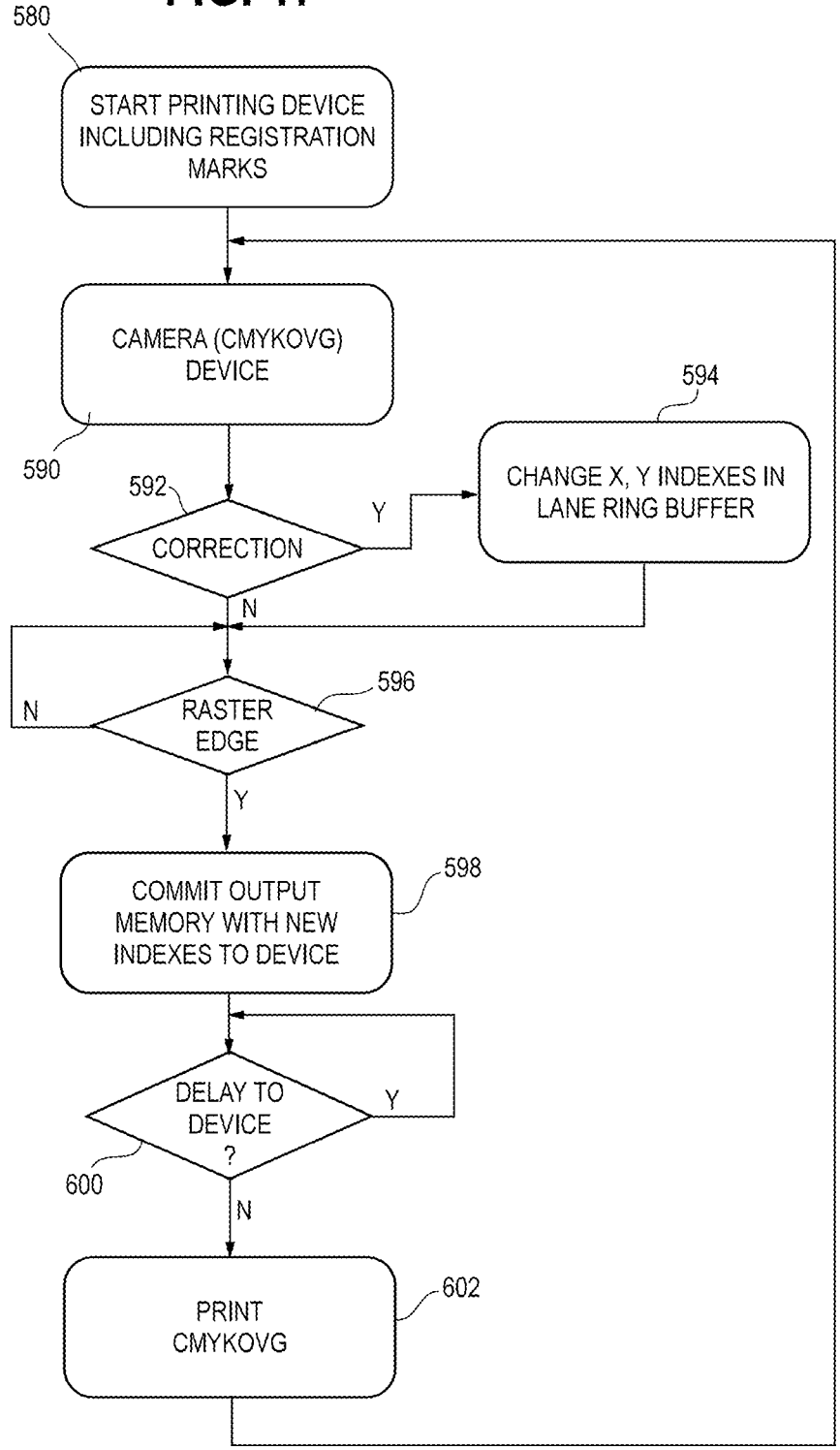
FIG. 17 is a flowchart of programming executed by the print management system of FIG. 16.

FIG. 16 illustrates a computer system 300 especially adapted to implement the print management control system 130 in a digital fashion, it being understood that any or all of the control systems disclosed herein, such as one or more of the control system 120 and/or the dryer control system(s), may be implemented by like computer systems or by the computer system 300. Thus, for example, the system 300 may comprise the processing unit 152 and, if desired, may implement the control system 120. The computer system 300 comprises a personal computer, server, or other programmable device 302 having a memory 304 that, among other things, stores programming as seen in FIG. 17 that is executed by a processing module or controller 306 to implement the print management control system 130. The device 302 receives signals from various sensors, which may comprise cameras and/or other devices. Specifically, in the illustrated embodiment the device 302 is responsive to one or more image sensors, such as cameras 500, 502 located upstream from the imager unit 70 and a further image sensor 504, which may comprise a camera or a conventional sense mark device, which is adapted to sense a registration mark through the back side 24*b* of the web 24. The device 302 may also be responsive to a web position signal developed by the position encoder 160 and, optionally, the camera 162. The camera 162, when used, images the entire width of the web 24 (54 inches in the illustrated embodiment) and allows the print management control system 130 (or any of the other control systems of the system 20) to stitch together images printed by printheads, undertake color-to-color registration and color calibration, detect missing pixel(s), and undertake printhead normalization across the web.

The device 302 is also responsive to other cameras (not shown) each located upstream of other imager units 30, 44, 60, and 82 and includes one or more pixel buffers 307 that store data to control the first though fifth imager units in the manner described below in connection with the fourth imager unit 70.

As is conventional, a repeating series of content portions separated by blank areas are printed along the length of the web 24. Each content portion may comprise an image, text, or both. Thus, for example, in the illustrated embodiment of FIG. 20, the web 24 is to be printed on the first side 24a in two laterally-spaced lanes 556, 558 with repeating sets of images 560, 562 wherein the images 560, 562 are offset along the process direction perpendicular to the lateral direction so that the content portions are separated by blank areas (only one set of images 560, 562 is illustrated in FIG. 20, it being understood that other equally-spaced (or non-equally-spaced) sets are printed on and along the web 24 in the process direction). It should be noted that the web 24 may be printed simplex or duplex in a different number of lane(s) and that printed content may or may not be offset relative to one another along the process direction. Also in the illustrated embodiment, the images 560, 562 are identical, or substantially so, although the system 20 may print image(s) and/or text comprising printed content of any kind and the printed content in the lanes may be substantially or completely different.

As seen in FIG. 21 each printed content portion, such as the content portion 560, has an X-direction along the lateral direction and a Y-direction along the process direction. In the illustrated embodiment each content portion has an X-direction equal to the Y-direction wherein both are n units (such as inches) in width and length, respectively. Also, an origin point 563 is located at upper left-hand corner of the image 560.

Figure 18:
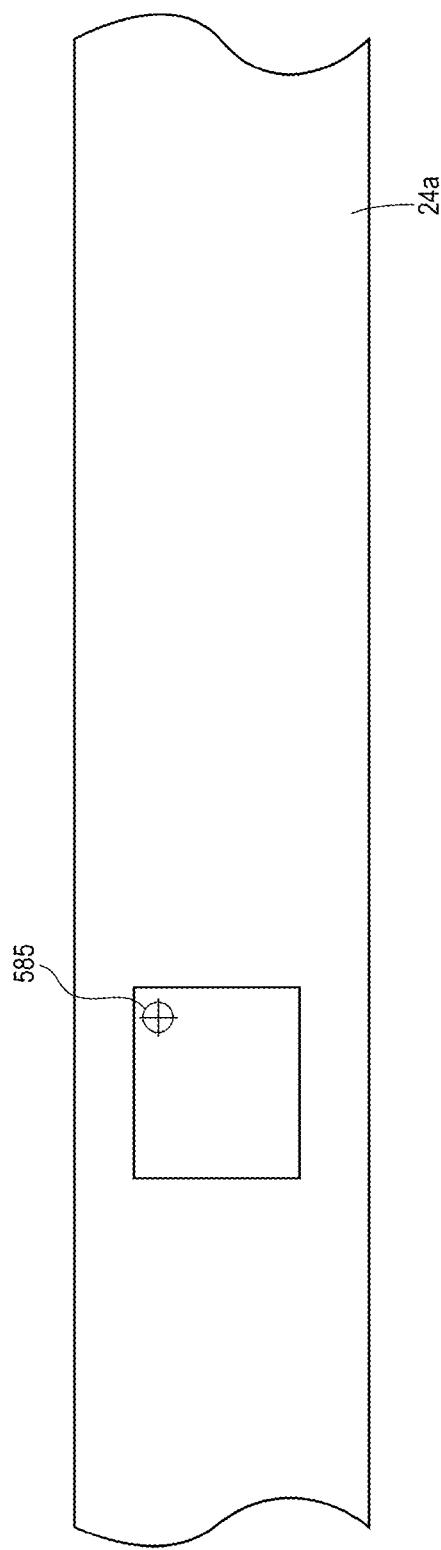
FIG. 18 is simplified plan view of a portion of the web of FIG. 1 illustrating application of a registration mark thereon.
Figure 19:
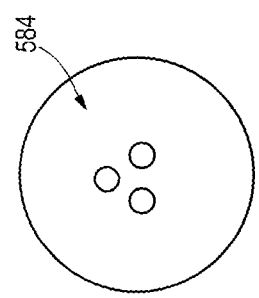
FIG. 19 is an enlarged fragmentary view of the registration mark of FIG. 18.

The programming of FIG. 17 is executed independently for each lane 556, 558. The programming begins at a block 580 that instructs a first printing device comprising a portion of the system 20, such as the second imager unit 44, to print registration marks or fiducials 584 (one of which is shown in FIG. 15 and another is shown in FIG. 20) on the first side 24a of the web 24, wherein each registration mark is printed together with one of the repeating printed content portions laid down by the unit 44 and is disposed at a controlled position 585 (one of which is seen in FIG. 18) with respect to and adjacent such printed content portion. Specifically, as seen in the embodiment of FIGS. 19 and 20, each registration mark 584 may be of any suitable design, such as, for example, three white dots arranged in a triangular configuration wherein a center of the three dots is disposed upstream and to the left at precise distances along the process direction and the lateral direction, respectively, from the origin point 563 of what will become, when fully printed, an associated content portion, such as the image 560a as shown in FIG. 20. The registration marks 584 are, therefore, preferably printed outside of the web areas that are to be imaged.

Referring again to FIG. 17, the programming continues at a block 590 that senses the output of the camera 500 of FIG. 16 downstream of the imager unit 60 and upstream of the imager unit 70. In the illustrated embodiment, the camera 500 comprises a CCD device or other suitable optical device that develops an optical reproduction of either the entire web 24, an entire web portion 24a and/or 24b, or only a portion of each web portion 24a or 24b. Thus, in the illustrated embodiment, for example, the system 300 includes separate cameras 500 and 502, although these cameras may be replaced by a single camera that simultaneously captures images of the laterally offset web sides 24a and 24b. In any event at least one camera is provided to sense each registration mark on each side of the web 24. When the camera 500 detects a center point of a registration mark, a block 592 determines any physical offset of the center point in the X-direction and the Y-direction from an expected position. The pixel buffer(s) 307, which may include one or more output lane ring buffers, are prestored with the raster-image processed (RIP) data for several content portions to be next imaged and intervening blank portions in the associated lane. In this regard it may be noted that the output lane ring buffer(s) continuously output data on a sequential raster-by-raster basis for the content portions and the intervening blank portions. If the block 592 determines that position corrections are necessary, a block 594 sequentially offsets pointers ("X, Y indexes") associated with the RIP data in a first raster for the next content portion to be imaged by the imager unit 70. A block 596 monitors the offset process, and when the offset process for the last of the RIP data of the first raster has been completed, the pointers for the first raster are used by a block 598 to deliver the RIP data for the first raster at the required offset, which is determined by counting pulses developed by the position encoder 160, to an output buffer of the pixel buffers 307. The blocks 594, 596, and 598 continually operate to offset the pointers for subsequent rasters of RIP data and deliver such data to the output buffer. Next, a block 600 delays the delivery of the RIP data to the imager unit 70 by a time that takes into account the distance of the registration mark from the leading edge of the content portion to be next printed by the imager unit 70 and the speed of the web as detected by the position encoder 160 and a block 602 transmits the RIP data to the unit 70 at the proper time so that the content portion is printed accurately on the web 24.

Control from the block 602 returns to the block 590 to await the sensing of the next registration mark.

As noted previously, the programming to reproduce content portions in the lane 558 is identical to that shown and described above and such programming is executed independently from the programming of FIG. 17. In fact, as shown in FIG. 23, more lanes, such as lanes 610, 612, 614, 616, and 618 may each be printed by an instance of the programming of FIG. 17 wherein the programming instances operate independently.

FIG. 10 illustrates an embodiment in which registration is undertaken for both sides of the web 24a, 24b. Once the first side 24a is imaged as noted above, the web in turned upside down as noted previously and traverses a second, laterally offset path during the second pass. In one embodiment the sensor 504 detects the registration mark 584 through the transparent web 24. Alternatively, the sensor 504 may be disposed below the web 24 and directly detect the registration mark 584. In either case, an instance of the programming of FIG. 17 operates the imager unit 44 to print white content portion in a registered position on the web side 24b together with another registration mark 589 similar or identical to the registration mark 584 both in terms of the configuration and placement relative to the content portion printed by the imager unit 44 this time on the second side of the web 24. The camera 502 thereafter detects the registration mark 589 to operate the imager unit 70 in register with the white printed content applied by the imager unit 44.

If desired each lateral portion of each of the remaining imager units 30, 60, and 82 may be operated by independent instances of the programming of FIG. 5 so that overall imager unit to imager unit registration is achieved, whether simplex printing or duplex printing.

The pull module 22, the web guides 42, 48, 66, and 81, and the rollers described above provide a web transport that conveys the web 24 past the imager units 44, 60, 70, and 82. In some embodiments, each of imager units 44, 60, and 82 comprises a inkjet print unit 1184, 1186, and 1188, respectively, and a print unit controller 1190, 1192, and 1194, respectively. Each inkjet print unit 1184, 1186, and 1188 is adapted to selectively deposit a particular material substantially along the width of the web 24. In particular, each inkjet print unit 1184, 1186, and 1188 includes a sufficient number inkjet printheads so that the ejection nozzles of such inkjet printheads substantially span a width of the web 24. In some embodiments, if the inkjet print unit 1184, 1186, or 1188 includes a plurality of inkjet printheads (rather than just one web-wide inkjet printhead), such plurality of inkjet printheads are disposed abutting one another end-to-end in linear fashion to span the web 24. In other embodiments, such plurality of inkjet printheads may be disposed in a carrier (not shown) in a two-dimensional array of inkjet printheads so that the ejection nozzles of the inkjet printheads (and of the inkjet print unit 1184, 1186, or 1188 comprising such inkjet printheads) span the width of the web 24.

Further, the imager unit 70 includes a plurality of inkjet printing units 228a-228h disposed around a circumference of the drum 72. Each inkjet printing unit 228a-228h includes a sufficient number of inkjet printheads such that the ejection nozzles of the inkjet printheads substantially span the width of the web 24. The inkjet printhead(s) that comprise(s) each inkjet printing unit 228a-228h is/are adapted deposit a particular material along substantially along the width of the web 24. For example, the inkjet printhead(s) that comprise(s) the inkjet print unit 228a are disposed so that such inkjet printhead(s) may deposit a cyan ink substantially along the width of the web 24. Similarly, the inkjet printhead(s) that comprise(s) the inkjet print unit 228b-228h are disposed such inkjet printhead(s) may deposit magenta, yellow, black, orange, violet, green, and a spot color ink, respectively.

Similar to the arrangement of the inkjet printheads of the inkjet print units 1184, 1186, and 1188, the inkjet printheads that comprise each inkjet print unit 228a-228h may be disposed abutting one another end-to-end in linear fashion or in a two dimensional array such that the ejection nozzles of the inkjet printheads of each inkjet print group 228 span the width of the web 24.

Each inkjet print unit 1184, 1186, 1188, and 228a-228h is associated with a print unit controller 1190, 1192, 1194, and 1196a-1196h, respectively. Each print unit controller 1190, 1192, and 1194 receives, from the print management control system 130, layer data 150a, 150b and 150d to be printed by the print unit 1184, 1186, and 1188, respectively, associated therewith and position information of where such layer data 150a, 150b, and 150d should be printed. Each print unit controller 1190, 1192, and 1194 controls the inkjet print units 1184, 1186, and 1188, respectively, to cause the nozzles of such print unit to eject ink (or other material) onto the web 24 in accordance with such layer data 150a, 150b, and 150d and position data.

Further, the print management control system 130 provides layer data 150c, representing all of the color bitmaps to be printed using process color inks to the print unit controllers 1196a-1196h and position information of where on the web 24 to print such layer data 150c. In some embodiments, the layer data 150c is provided in its entirety to all of the print unit controllers 1196a-1196h. In response, the print unit controller 1196 selects the color bitmap from the layer data 150c that is associated with the color of ink to be printed by the inkjet print unit 228, and generates signals to cause the inkjet printheads of such print unit 228 to deposit drops of such color of ink in accordance with the selected bitmap and position data. In other embodiments, the print management control system 130 provides the bitmap from the layer data 150c that is associated with the color of ink that is printed by the inkjet print unit 228 to the print unit controller 1196 associated with such inkjet print unit.

In some embodiments, to support printing at high speeds, the positions of all of the inkjet print units (and the inkjet printheads) that comprises the imager units 44, 60, 70, and 82 are fixed (i.e., stationary) during printing as the web 24 is transported thereby.

As discussed above, the imager units 44, 60, 70, 82, and thus the inkjet print units 1184, 1186, and 1188, respectively, thereof, may be operated to deposit drops of ink or other material having different volumes and at different resolutions.

In one embodiment, the imager unit 44 deposits a white (or other) colorant onto the clear web 24 to create a backing (or silhouette) onto which subsequent colorants may be deposited. Because the white colorant includes particles such as titanium dioxide, a relatively large drop volume (e.g., between about 5 pL and 12 pL/drop) is required to accommodate such particles. Further, because the silhouette comprises an image that has a substantially identical intensity level throughout, the silhouette may be formed at a relatively low resolution, for example, 600 dpi. Such large drop size and low resolution may also allow the drops of the material to coalesce and form a consistent layer of colorant to form the silhouette.

As discussed above, the imager unit 60 deposits a metallic ink on top of the colorant deposited by the imager unit 44. Like the colorant deposited by the imager unit 44, the metallic ink typically includes colorants and other materials having a relatively large particle size and the metallic ink is deposited to form a printed image that has little variability in intensity. Thus, the image using the metallic ink may be formed using drops of relatively large volume (e.g., from about 5 pL/drop to 12 pL/drop) and at a relatively low resolution (e.g., about 600 dpi).

The imager unit 70 forms a high-resolution color image on the web. Therefore, the imager unit 70 forms an image using each print unit 228 with drops of ink having a relatively low volume (e.g., between about 3 pL/drop and about 6 pL/drop) and at a high resolution (e.g., 1200 or more dpi). Such low drop volume and high resolution form an image that has intensity variability throughout to reproduce the page 150 with fine detail therein.

In some embodiments, the layer data 150a-150d generated by the ripping and color correction process (block 154) is screened bitmap data and the inkjet print units 1184, 1186, 228, and 1188 are controlled by the print unit controllers 1190, 1192, 1196, and 1194, respectively, to place drops of material on the web 24 in accordance with such screened bitmap data. In other embodiments, the bitmap data generated by the ripping and color correction process (block 154) is not screened and the print unit controllers 1190, 1192, 1196, and 1194 screen the bitmap data provided by the ripping and color correction process (block 154) and drive the print units 1190, 1192, 1196, and 1194 to deposit drops of material on the web 24 in accordance with the screened data developed by the print unit controllers 1190, 1192, 1196, and 1194.

In some embodiments, the data used to drive the low-resolution inkjet print units 1184 and 1186 is screened in accordance with a conventional halftone (e.g., amplitude modulated) screening pattern. Further, the data used to drive the high-resolution inkjet print units 228 and 1188 is screened in accordance with a frequency modulated screening pattern. It would be appreciated by one who has ordinary skill in the art that using the frequency modulated screening pattern allows reproduction of greater detail printed using such pattern. Other screening methods apparent to one who has ordinary skill in the art may be also be used.

In some embodiments, the print unit controllers 1190, 1192, 1196, and 1194 operated on one or more computer processors separate from computer processors used to implement the print management control system 130. In other embodiments, one or more of the print unit controllers 1190, 1192, 1196, and 1194 may operate as processes on the computer processors used to implement the print management control system 130.

As noted above, in some embodiments, the imager unit 82 is used to deposit a coating material onto the image printed by the imager unit 70. To ensure that a thin layer of coating is deposited, such imager unit also prints at high resolution using a relatively small drop volume.

It should be apparent to one who has ordinary skill in the art that using inkjet printheads that print at a relatively low resolution using large drop sizes when possible may be more cost effective than using inkjet printheads that print at high resolution with small drop sizes. Further, one having ordinary skill in the art would appreciate that the amount of data that has to be transmitted between the print unit controllers 1190 and 1192 and the inkjet print unit 1184 and 1186, respectively, that print at low resolution/large drop size may be substantially less than the amount of data that has to be transmitted from the inkjet print controller 228 and the inkjet print unit 1196 that prints at high-resolution/small drop size, and thus the costs of implementing the print unit controllers 1190 and 1192 may be less than the cost of implementing the inkjet print controller 228.

Referring once again to FIG. 3, a camera 162 may be disposed following the image unit 82 that, when used, images the entire width of the web 24 (54 inches in the illustrated embodiment) and allows the print management control system 130 (or any of the other control systems of the system 20) undertake color-to-color registration and color calibration, detect and correct for missing pixel(s) and stitching errors (gaps or alignment errors between portions of an image printed by adjacent heads), and undertake printhead normalization across the web.

In some embodiments, the print management control system 130 undertakes a distortion correction process (block 1200) prior to undertaking the ripping and color correction process (block 154). As described in greater detail below, the distortion correction process (block 1200) adjusts the dimensions of the page 150 (or elements thereof) to compensate for shrinking of the portion of the web 24 on which such page 150 is printed when the portion of the web 24 is used in a shrink wrap application.

Figure 24A:
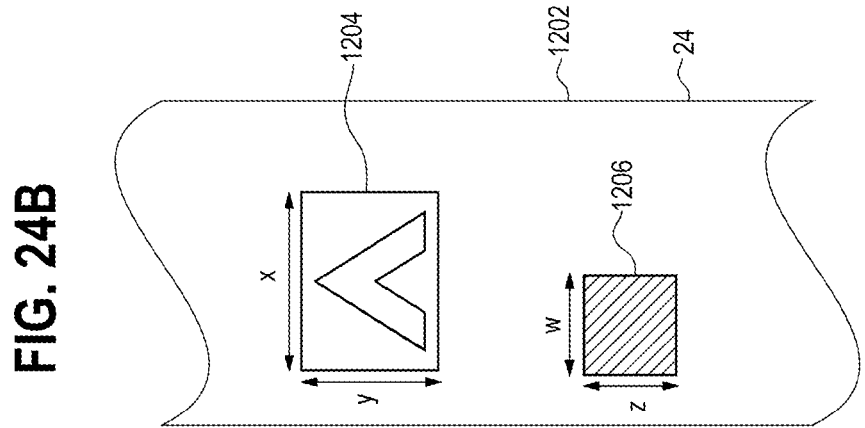
FIGS. 24A and 24B illustrates the effects of shrinking a web on images printed thereon.
Figure 24B:
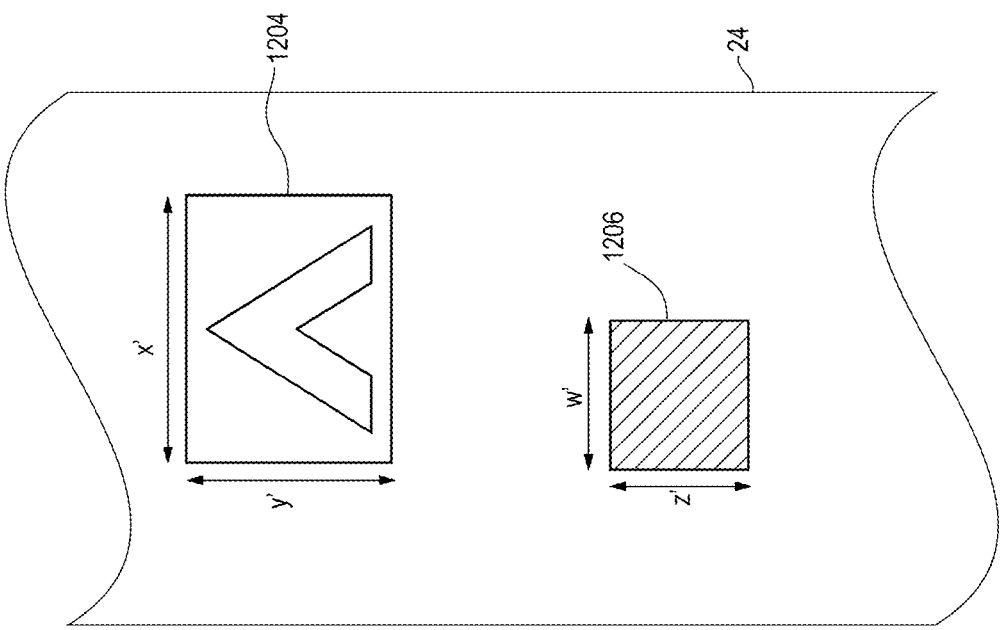

FIGS. 24A and 24B illustrates the dimensional compensation performed by the distortion correction process (block 1200) undertaken of the print management control system 130. In the example shown in FIG. 24B, assume that after printing, the web 24 is to be used to produce a shrink-wrapped package 1202 (i.e., after the web 24 is shrunk) having a first image 1204 having dimensions (x, y) and a second image 1206 having dimensions (w, z) printed thereon. The print management control system 130 undertakes distortion correction (block 1200) and determines that to compensate for the shrinking of the film, the first image 1204 should be printed having dimensions (x', y') and the second image should be printed having dimensions (w', z').

The distortion correction process (block 1200) also determines dot gain changes that may result in each of the images 1204 and 1206 as a result shrinking the portions of the web 24, where such images are printed for example, because the distance between the dried drops of ink on the web decreases when such portions are shrunk. Thereafter, the distortion correction process (block 1200) adjusts the image data to be printed to compensate for such dot gain changes prior to providing such image data to the ripping and color correction process (block 154).

Figure 25:
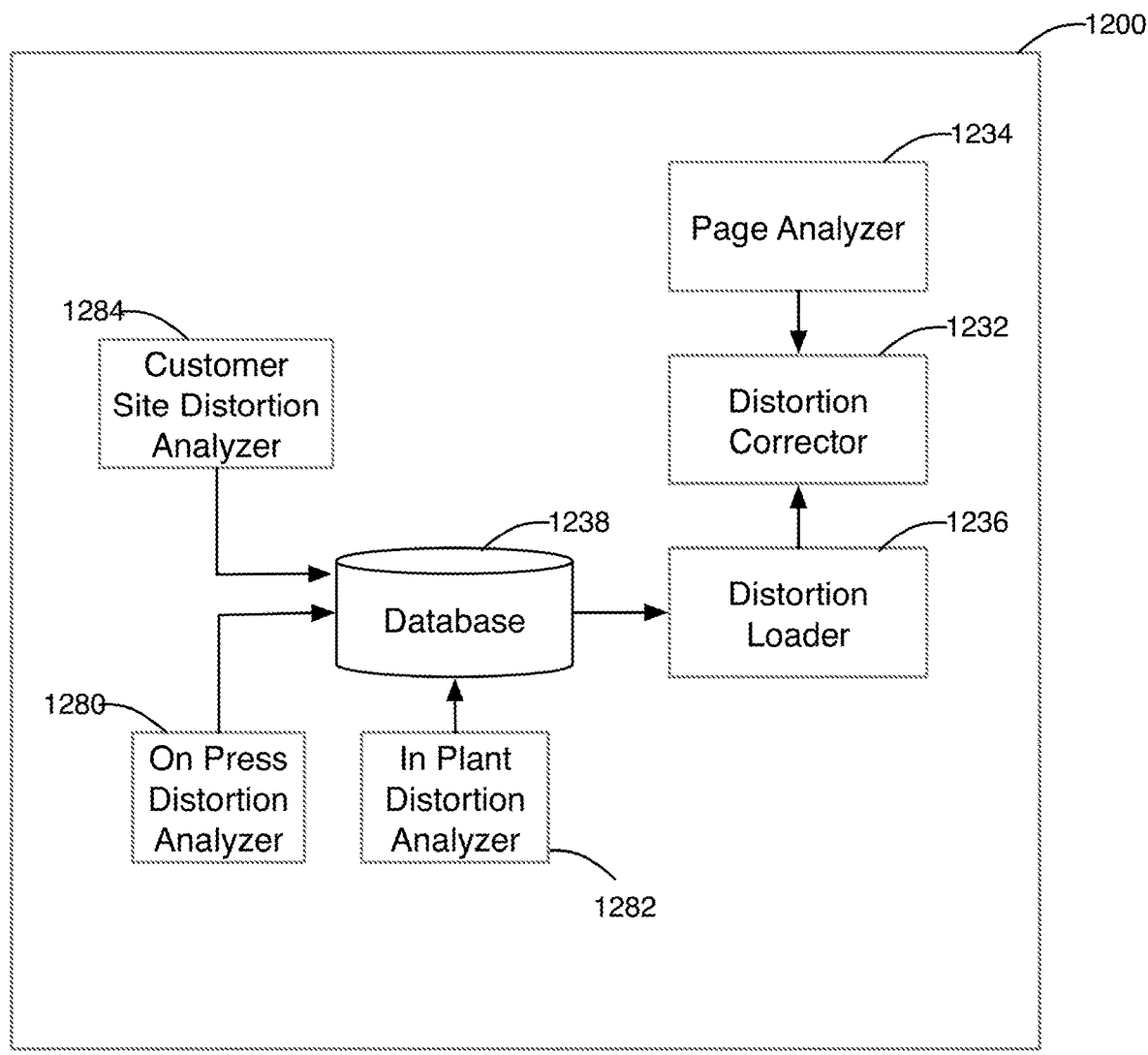
FIG. 25 is a block diagram of a distortion correction process of the print management system of FIG. 3.
Figure 26:
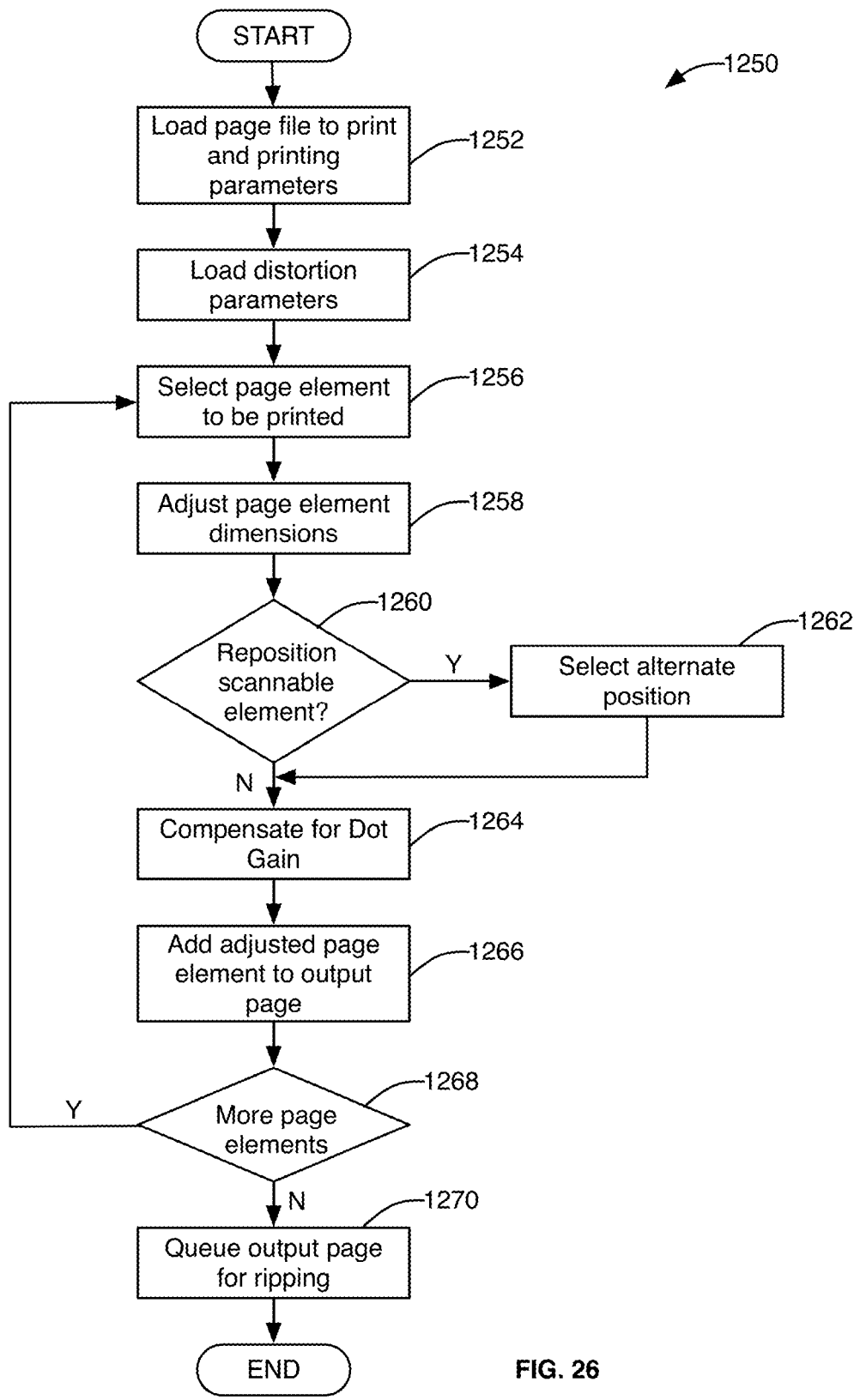
FIG. 26 is a flowchart of steps undertaken by the distortion corrector process of the distortion correction process of FIG. 25.

Referring also to FIG. 25, the distortion correction process (block 1200) comprises a distortion corrector process (block 1232), a page analyzer process (block 1234), a distortion loader process (block 1236), and a database 1238. FIG. 26 shows a flowchart 1250 of the steps undertaken by the distortion correction process (block 1200). Referring to FIGS. 3 and 24-26, at step 1252, the distortion corrector process (block 1232) loads a page file to print and printing parameters including the inks (or other materials) to be deposited by the imager units 44, 60, 70, and 82, the material of the web 24 to be printed on, a final product that the web 24 will be formed into (by shrinking), and the like.

At step 1254, the distortion loader process (block 1236) queries the database 1238 for distortion information data in accordance with the job parameters. In particular, such distortion information data includes information regarding dimensional changes different portions of the material of the web 24 undergoes when shrunk. For example, a portion of the web 24 proximate an outer edge of the web may shrink more (or less) compared to a portion of the web 24 proximate a central portion of the web. In some embodiments, such dimensional change information includes changes that occur when the web is shrunk to positions of a grid of equally spaced horizontal and vertical lines on an unshrunk web 24. The equally spaced horizontal and vertical lines define a two-dimensional array of cells that comprise the grid. Each cell of the grid is associated with a portion of the web 24 on which an image may be printed and represents a predetermined area of contiguous pixels of such image. For example, each cell of the grid may represent a portion of an image that is 32 pixels wide by 32 pixels high. It should be apparent to one who has ordinary skill in the art that each cell may represent portions of the image having other dimensions. Each cell of the grid is associated with distortion information that includes how a portion of an image that is to be printed on the portion of the web 24 associated with the cell is to be modified to compensate for distortion that may occur to such printed portion of the image due to shrinkage of the web after printing.

The distortion information associated with each cell includes horizontal vertical scale factors by which the dimensions of the portion of the image to be printed on the portion of the web 24 associated with cell should be adjusted. In addition, the distortion information associated with each cell also includes information regarding adjustments that should be made to color values of pixels of the portion of the image associated with the cell to compensate for dot gain changes that may result from shrinking of the web 24 to dried drops of each type of ink (or other material) deposited on the web 24.

Further, the distortion information data may identify portions of the web 24 on which scannable elements (e.g., barcodes, QR codes, and the like) should not be printed because, for example, such portions may become too distorted or even occluded when the web 24 is shrunk around a product disposed therein. The distortion information may also identify alternate locations of the web 24 where such scannable elements should be repositioned if they happen to fall on a portion of the web 24 on which scannable elements should not be printed.

At step 1256, the page analyzer process (block 1234) selects from the page file loaded at step 1252 a page element that is to be printed. Such page element may include an image, a scannable element, a text block, and the like. At step 1258, the distortion corrector process (block 1232) determines the position on the web 24 the selected page element is to be printed, uses the distortion information loaded at step 1254 and such position to determine dimensional changes to apply to the selected page element, and adjusts the dimensions (e.g., by resampling an image, adjusting font metrics, and the like) of the selected page element to develop an adjusted page element. The distortion corrector process (block 1232) may also, at step 1258, adjust the start position where adjusted page element is to be printed on the unshrunk web 24 in accordance with the distortion data.

At step 1260, the distortion corrector process (block 1232) checks if the selected page element is a scannable element and the adjusted start position would place the printed scannable element on a portion of the web 24 where such scannable element should not be printed. If so, the distortion corrector process (block 1232) proceeds to step 1262, otherwise the distortion corrector proceeds to step 1264.

At step 1262, the distortion corrector process (block 1232) adjusts the position of scannable element (as adjusted at step 1258) to an alternate location (e.g., as identified in the distortion data loaded as step 1254) and proceeds to step 1264.

At step 1264, the distortion corrector process (block 1232) adjusts values of pixels of the adjusted page element to compensate for dot gain changes that may occur because of shrinking the web 24. Alternately, for example, if the page element is not an image, the distortion corrector process (block 1232) adjusts color values specified by print commands in the page file associated with the page element, as would be apparent to one who has ordinary skill in the art.

At step 1266, the distortion corrector process (block 1232) adds the adjusted page element that results from dot gain compensation applied at step 1260 to an output page file and printing commands to cause the page element to be printed at a position on the web 24 determined at steps 1258 or 1262.

At step 1268, the page analyzer process (block 1234) determines if there any additional page elements that have not been processed and, if so, returns to step 1256 to select another page element. Otherwise, at step 1270, the distortion loader process (block 1232) adds the output page file to an input queue associated with the ripping and color correction process (block 154, FIG. 3) or otherwise provides the output page file to such process. Thereafter, the distortion correction block 1200 exits.

Referring once again to FIGS. 3 and 25, the distortion correction process (block 1200) includes an on-press distortion analyzer process (block 1280), an in-plant distortion analyzer process (block 1282), and a customer site distortion analyzer process (block 1284) that develop and adjust the distortion information stored in the database 1238.

Figure 27:
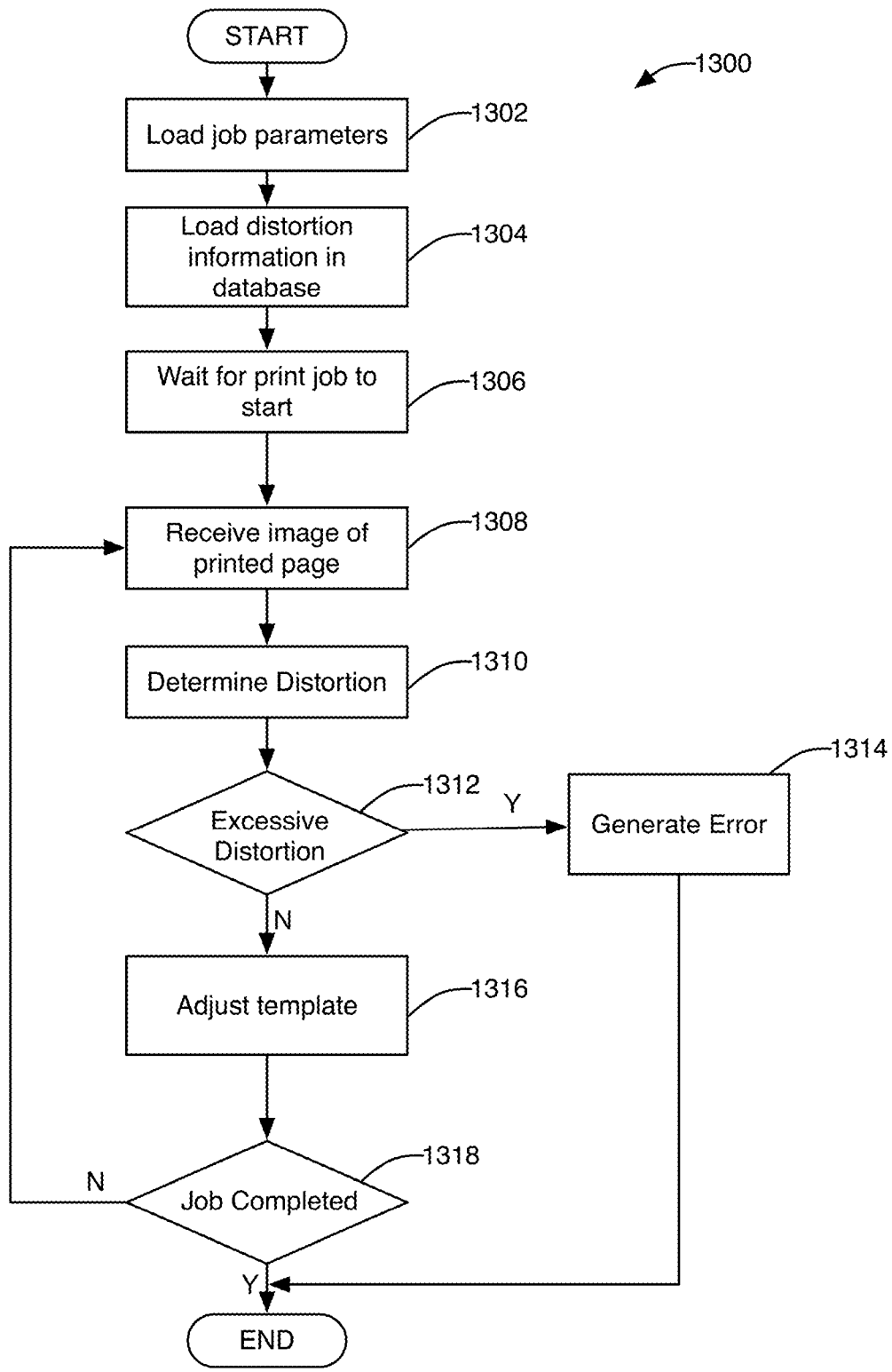
FIG. 27 is a flowchart of steps undertaken by an on-press distortion analyzer of the distortion correction process of FIG. 25.

FIG. 27 is a flowchart 1300 of steps undertaken by the on-press distortion analyzer process (block 1280) to monitor distortion during a production run.

Referring to FIG. 27, the on-press distortion analyzer process (block 1280), at step 1302, loads parameters of a production job including the page 150 to be printed on the web 24, the material that comprises the web 24, and the like.

At step 1304 the on-press distortion analyzer process (block 1280) selects from the database 1238 the distortion information in accordance with the parameters of the production job.

At step 1306, the on-press distortion analyzer process (block 1280) waits for the production job to begin.

At step 1308, the on-press distortion analyzer process (block 1280) receives from a camera (not shown) disposed along a path of the web 24 between the dryer unit 84 and the take up roll 100 an image of a page printed on the web 24. In some embodiments, the on-press distortion analyzer on-press distortion analyzer process (block 1280) determines when a page will be in the field of view of the camera and directs the camera to acquire the image. In other embodiments, the camera acquires images of all pages printed on the web at a predetermined rate in accordance with the web speed and page size being printed. Other ways of operating the camera to acquire the image of the printed page apparent to one who has ordinary skill in the art may be used.

At step 1310, the on-press distortion analyzer on-press distortion analyzer process (block 1280) analyzes the image of the printed page relative to the page data 150 (FIG. 3) used to generate the printed page to estimate distortion that has occurred during printing.

At step 1312, the on-press distortion analyzer on-press distortion analyzer process (block 1280) determines if the amount of distortion (either in dimensions of the printed page or in dot gain) determined at step 1310 exceeds a predetermined acceptable level of distortion, and, if so, the on-press distortion analyzer on-press distortion analyzer process (block 1280), at step 1314, generates an error to the print management control system 130 to stop the production run because of excessive distortion and exits.

Otherwise, at step 1316, the on-press distortion analyzer on-press distortion analyzer process (block 1280) adjusts the distortion information in the database 1238 associated with the parameters of the production run in accordance with the distortion determined at step 1310.

At step 1318, the on-press distortion analyzer on-press distortion analyzer process (block 1280) determines if the production run has completed, and if so exits. Otherwise, the on-press distortion analyzer on-press distortion analyzer process (block 1280) proceeds to step 1308 to receive another image.

Figure 28:
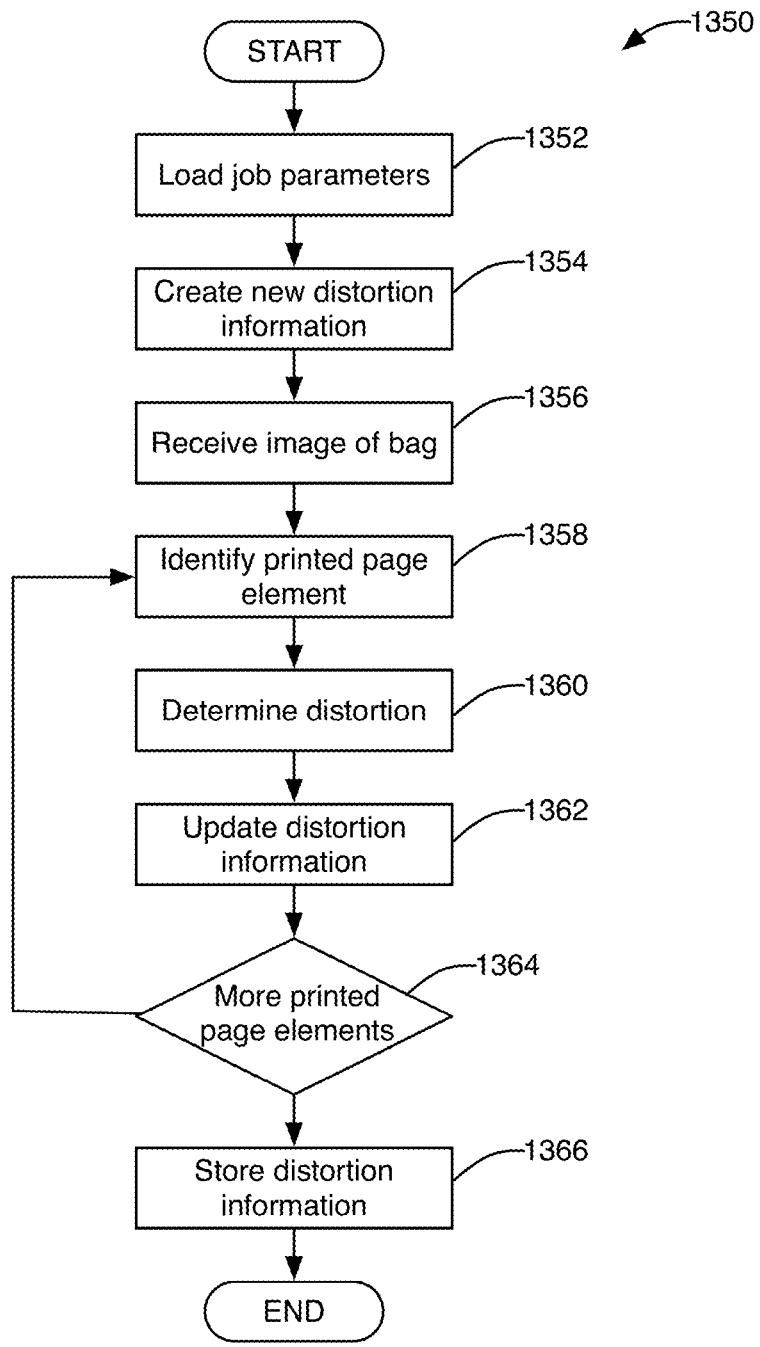
FIG. 28 is a flowchart of steps undertaken by an in-plant distortion analyzer of the distortion correction process of FIG. 25.

The in-plant distortion analyzer process (block 1282) analyzes an image of a representative bag formed from a web 24 to develop distortion information used by the distortion corrector process (block 1232) and the on-press distortion analyzer on-press distortion analyzer process (block 1280). In some embodiments, a model of a product that is to be placed in bags formed from web 24 may be placed in the representative bag and the representative bag may be shrunk therearound. FIG. 28 illustrates a flowchart 1350 of the steps undertaken by the in-plant distortion analyzer process (block 1282).

At step 1352, the in-plant distortion analyzer process (block 1282) loads the job parameters used to print the web 24 that was used to form the bag.

At step 1354, the in-plant distortion analyzer process (block 1282) initializes new distortion information that is associated with the job parameters.

At step 1356, the in-plant distortion analyzer process (block 1282) receives an image of the representative bag after the bag has been formed and heat shrunk.

At step 1358, the in-plant distortion analyzer process (block 1282) identifies in the received image a printed page element printed on the bag and selects a page element in the page 150 that corresponds to the printed page element, by for example, comparing the contents and position of the printed page element to the specification of the page element in the page 150. In addition, the in-plant distortion analyzer process (block 1282) undertakes image processing operations such as edge detection, thresholding, and the like to isolate in the received image the printed page element from other portions of the received image.

At step 1360, the in-plant distortion analyzer process (block 1282) determines the dimensional and position distortion between the printed page element identified at step 1356 and the page element in the page 150 corresponding thereto.

At step 1362, the in-plant distortion analyzer process (block 1282) updates the distortion information created at step 1354 with the dimensional and position distortion determined at step 1356 and associates such distortion with the position on the unshrunk web 24 where the page element was printed (as specified in the page 150).

At step 1364, the in-plant distortion analyzer process (block 1282) determines if all of the printed page elements in the image received at step 1356 have been analyzed, and, if so, proceeds to step 1366. Otherwise, the in-plant distortion analyzer process (block 1282) proceeds to step 1358 to identify another printed element.

At step 1366, the in-plant distortion analyzer process (block 1282) stores the distortion information developed in steps 1362 and 1364 in the database 1238, and then exits.

Referring once again to FIG. 25, the customer-site distortion analyzer process (block 1284) is used to update distortion information stored in the database 1238 in accordance with information received after a product has been place in the bag created from the web 24, and the bag is shrunk around the product.

Figure 29:
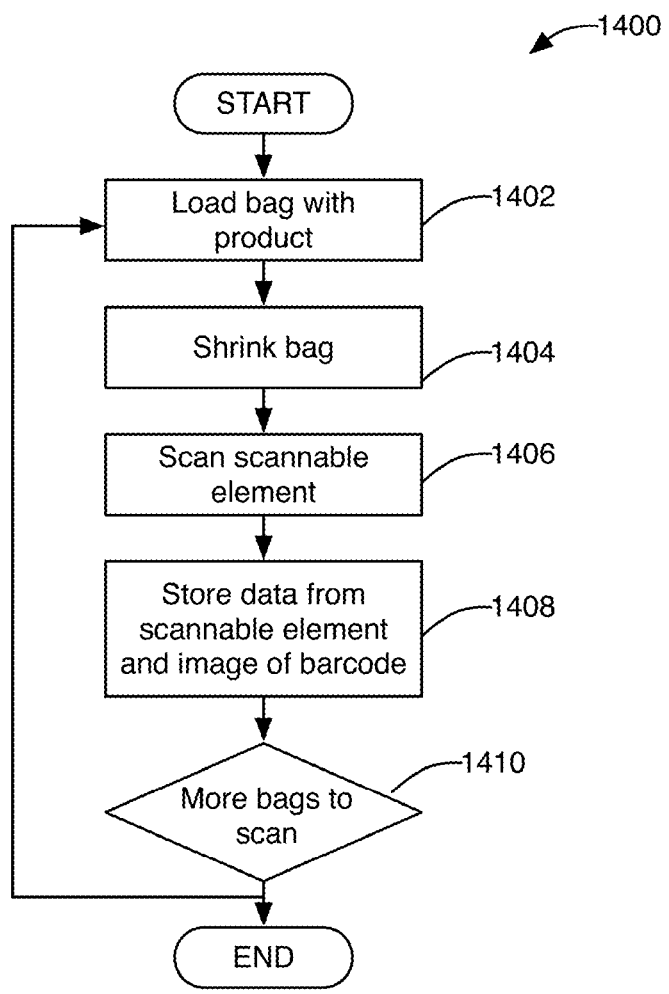
FIG. 29 is a flowchart of steps undertaken at a customer site to generate images of bags produced from the web printed on by the system of FIG. 1.

FIG. 29 shows a flowchart 1400 of steps undertaken by a bag loading system to prepare data for use by the customer-site distortion analyzer process (block 1284). At step 1402, a product is placed in a bag produced from the printed web 24.

At step 1404, the bag having the product therein in shrunk (e.g., in a heated water bath or other method apparent to one who has ordinary skill in the art).

At step 1406, a scannable print element on the shrunk bag is scanned.

At step 1408, data (e.g., a SKU or other identifying information) that results from scanning the scannable print element and an image of the scannable print element are stored on a computer (not shown). The computer may be at the production facility where the customer-site distortion analyzer process (block 1284) operates, on a computer in the cloud, or at any other location accessible to the customer-site distortion analyzer process (block 1284).

At step 1410, a bag loading system determines if additional bags remain to be loaded with product and scanned, and if so, proceeds to step 1402. Otherwise, the bag loading system exits.

Periodically, for example, after a predetermined number of production runs to produce bags in which a particular type of product is to be disposed, the customer-site distortion analyzer process (block 1284) operates to determine if distortion errors are causing scanning errors at step 1408 (FIG. 29).

Figure 30:
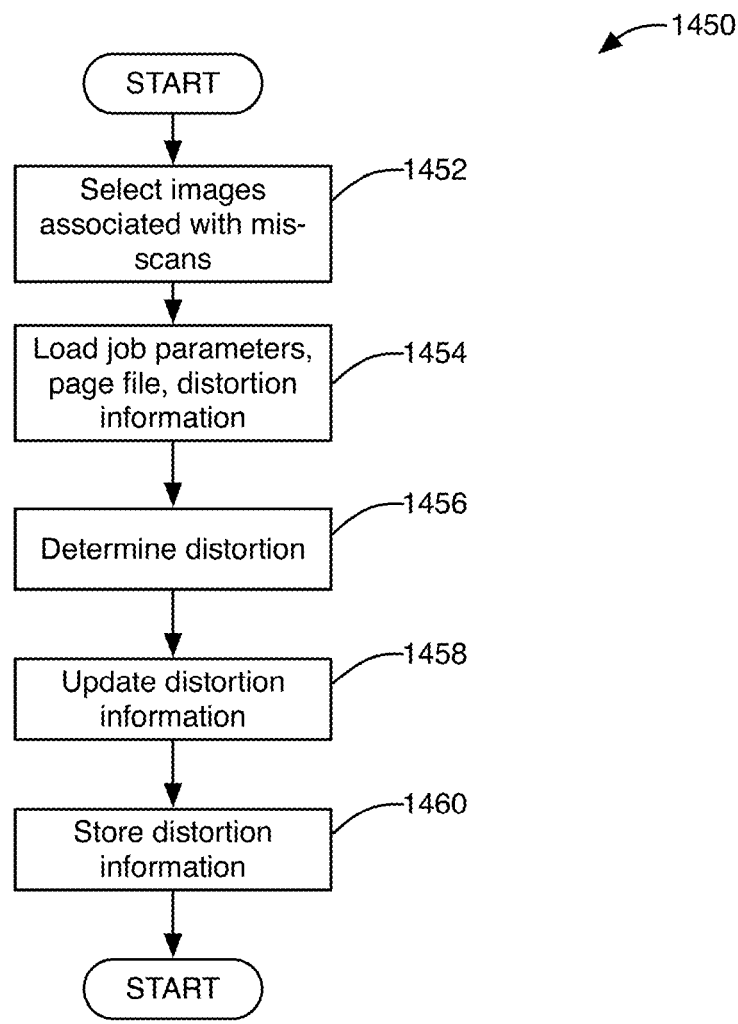
FIG. 30 is a flowchart of a customer site distortion analyzer of the distortion correction process of FIG. 25.

FIG. 30 is a flowchart 1450 of steps undertaken by the customer-site distortion analyzer process (block 1284) to update distortion information to reduce scanning errors. At step 1452, the customer-site distortion analyzer process (block 1284) selects images of scannable page elements that are associated with mis-scans. Such scannable page elements may have encoded therein information regarding when and where the web 24 from the bag imprinted was printed with the scannable page element, a sequence code, and the other production information.

At step 1454, the customer-site distortion analyzer process (block 1284) loads the job parameters, the page 150, and the distortion information associated with the job during which the printed scannable item that resulted in the mis-scan was printed on the web 24.

At step 1456, the customer-site distortion analyzer process (block 1284) analyzes each image selected at step 1452 with respect to the scannable page element in the page 150 to determine the distortion present in the selected image.

At step 1458, the customer-site distortion analyzer process (block 1284) updates the distortion information loaded at step 1454 and associated with the job parameters in accordance with the distortion determined at step 1456. At step 1460, the customer-site distortion analyzer process (block 1284) stores the updated distortion in the database 1238 for use with subsequent jobs having job parameters identical to those loaded at step 1454.

Thereafter, the customer-site distortion analyzer process (block 1284) exits.

Figure 31A:
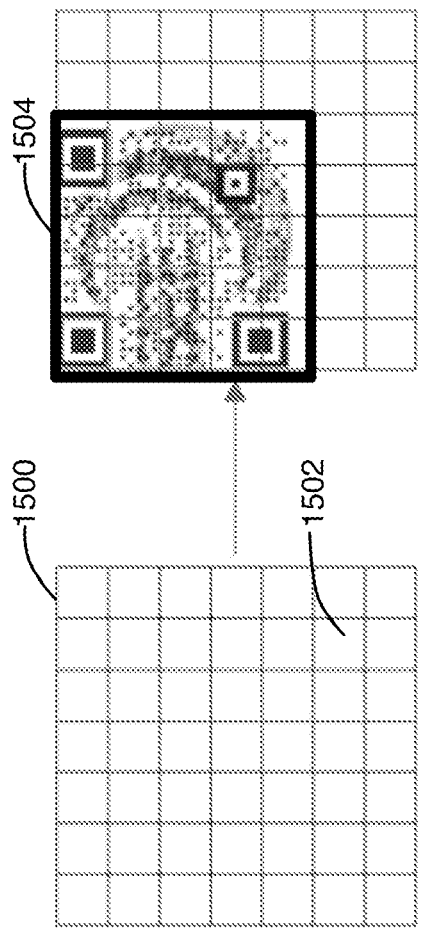
FIGS. 31A and 31B graphically illustrate determining the distortion to an image printed on a web by the system of FIG. 1.
Figure 31B:
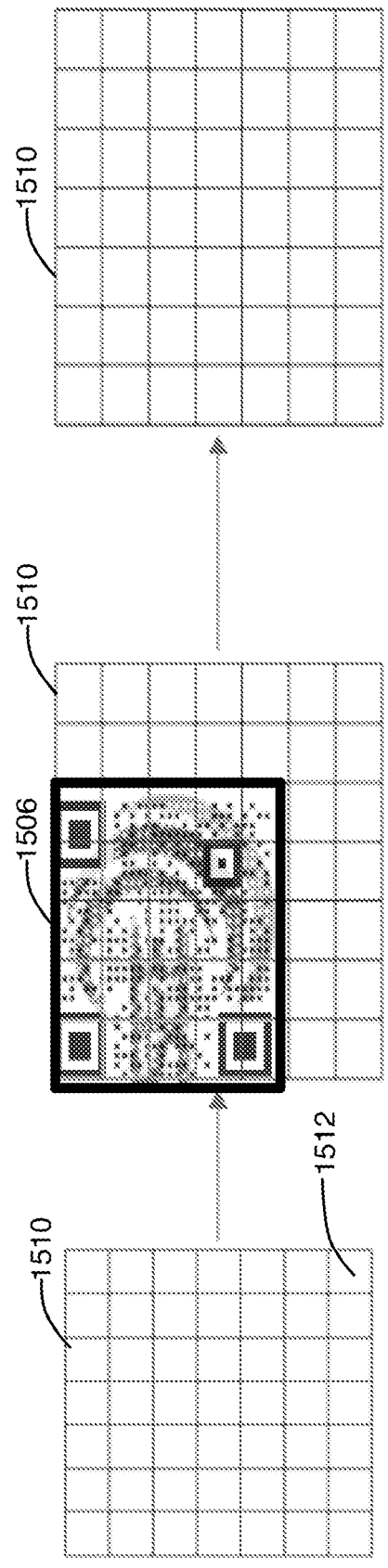

FIGS. 31A and 31B graphically illustrates an example of how dimensional distortion information may be developed at step 1310 (FIG. 27), step 1360 (FIG. 28), and step 1456 (FIG. 30).

Referring to FIG. 31A, a first two-dimensional array 1500 of cells 1502 is created wherein each cell spans a predetermined number of pixels of an element to be printed. For clarity, the reference number 1502 associated with each cell of grid is shown in FIG. 31A with only a few such cells.

Preferably, each cell 1502 of the first two-dimensional array 1500 spans an equal number of pixels horizontally and vertically. An image element 1504 in the page 150 to be printed is associated with the two-dimensional array of cells 1502 to determine the number of cells 1502 spanned by the image element 1504. In the example shown in FIG. 31A, the image 1504 spans an area of 5 cells horizontally and 5 cells vertically.

Referring to FIG. 31B, after the image element 1504 is printed on the web 24, an image 1506 of the printed page element is acquired after the web 24 has been shrunk and formed into a bag. The acquired image is aligned with a second two-dimensional array 1510 of cells 1512. Initially, the dimensions of each cell 1512 is identical to the dimension of each cell 1510.

Thereafter, the dimensions of the cells 1512 are adjusted so that the acquired image 1506 spans an identical number of cells 1502 spanned by the image 1504 (i.e., 5×5). The number of horizontal pixels spanned by the adjusted cell 1512 divided by the number of horizontal pixels spanned by the cell 1502 provides a horizontal scaling factor. Similarly, the number of vertical pixels spanned by the adjust cell 1512 divided by the number of vertical pixels spanned by the cell 1502 provides a vertical scaling factor. Such horizontal and vertical scaling factors are stored in the distortion information in the database 1238.

As discussed above, each cell 1502 is associated with a predetermined area of pixels of a portion of the image 1504. The changes to such portion of the image associated with each cell may be analyzed as described above to determine the dimensions of each adjusted cell 1512. Horizontal and vertical scale factors may be calculated from such determined dimensions to and stored as distortion information associated with each cell 1502. Similarly, changes to image density (i.e., dot-gain) due to shrinking of the web 24 may be analyzed to determine the dot-gain adjustment needed to compensate for such changes and also stored as distortion information associated with each cell 1502.

Figure 32:
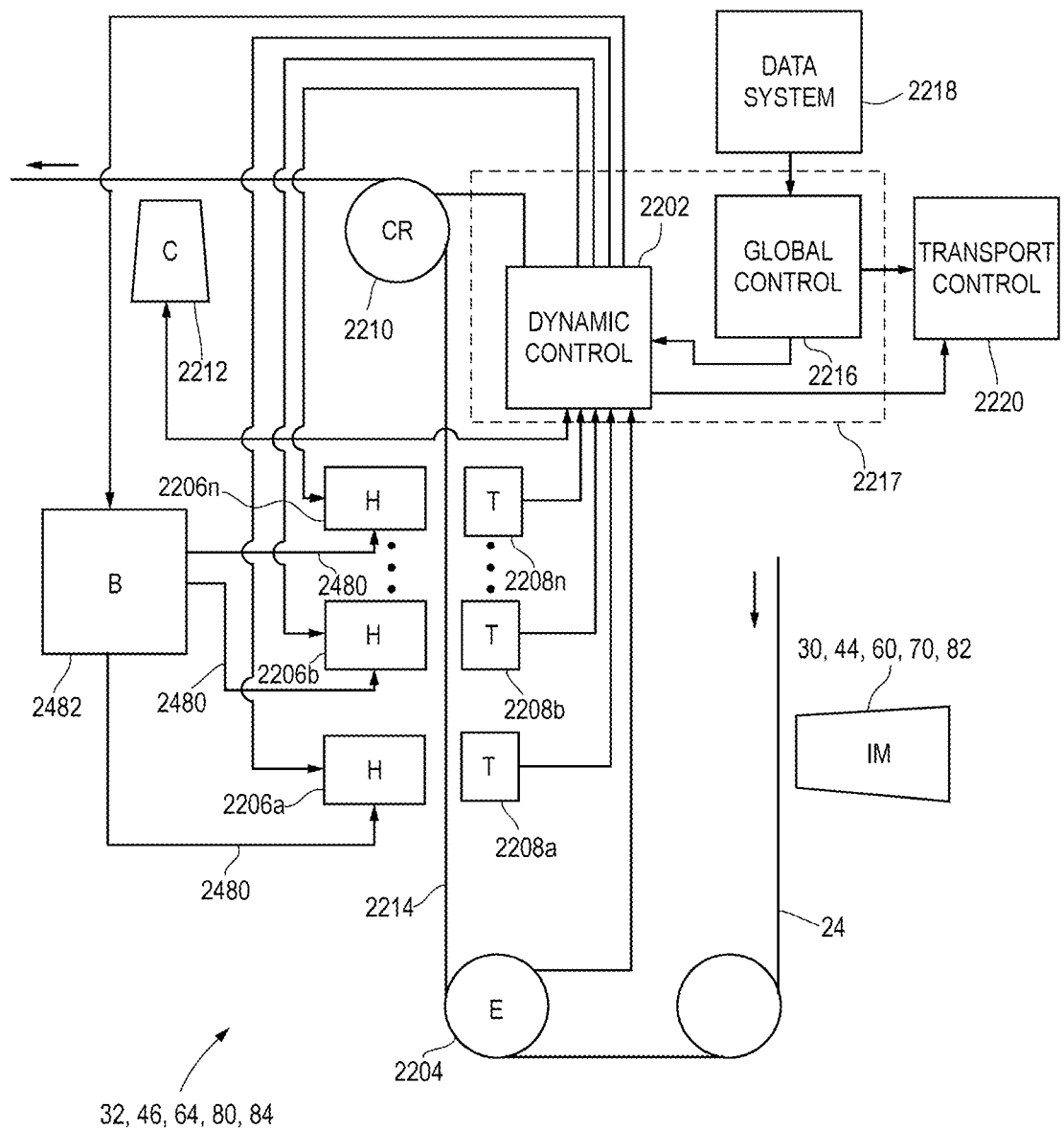
FIG. 32 is a simplified block diagram of a dryer unit of the system of FIG. 1.

Referring to FIG. 32, each dryer unit 32, 46, 64, 80, and 84 associated with an imager unit 30, 44, 60, 70, and 82, respectively, comprises a closed-loop dryer controller 2202, an encoder roller 2204, one or more heater unit(s) 2206a-2206n, one or more temperature sensing devices 2208a-2208n, a roller 2210, and a camera 2212.

After the web 24 is printed on by the imager unit 30, 44, 60, 70, or 82, as described above, the web 24 is conveyed past the encoder roller 2204 that generates a plurality of signals, one such signal for each revolution undertaken thereby. The imager unit 70 includes a plurality of printheads 228a-228h that, for example, deposit process and/or spot color inks onto the web 24.

Each heater unit 2206a-2206n is associated with a temperature sensing device 2208a-2208n, respectively, and the heater unit(s) 2206a-2206n and the temperature sensing device 2208a-2208n are disposed such that the web 24 is conveyed therebetween. Further, each heater unit 2206 generates a flow of heated air that is blown toward a side 2214 of the web 24 having material deposited thereon by the imager unit 30, 44, 62, or 68. In a preferred embodiment, the direction of the flow of heated air is perpendicular to the side 2214 of the web 24. However, the flow of heated air may be directed toward the web at other angles or even transverse to the web to heat the web.

The closed-loop dryer controller 2202 monitors the drying of the material on the web 24 and an indication of a temperature of the web 24 developed by the temperature sensing device 2208 to ensure that the material is sufficiently dried and that the temperature of the web 24 does not become so great as to damage the web (e.g., cause the web to shrink.) All of closed-loop dryer controllers 2202 of the system 20 are configured prior to a production run by a global dryer control system 2216 in accordance with parameters of the production run. The global dryer control system 2216 and the closed-loop dryer controller 2202 comprise the closed-loop dryer management system 2217 noted above.

After the web 24 passes between the heater unit(s) 2206a-2206n and the temperature sensing device(s) 2208, the web is conveyed past the roller 2210 and the camera 2212. The roller 2210 is the first roller (or any other component of the dryer unit 32, 46, 64, 80, 84) that contacts the side 2214 of the web 24, and thus any material deposited on such side 2214. The roller 2210 may be an idler roller that supports the web 24, a chiller roller that facilitates cooling of the web, or any other type of roller or component that first contacts the side 2214 after the web 24 has been conveyed past the heater unit(s) 2206a-2206n. The camera 2212 is positioned to capture one or more image(s) of the side 2214 as the web 24 is conveyed thereby.

At the beginning of a production run (or print job), the global dryer control system 2216 receives information regarding the production run from a data system 2218 and configures the closed-loop dryer controller 2202 with a minimum temperature the web 24 must reach to dry material deposited thereon by the imager unit 30, 44, 60, 70, or 82 associated with the dryer unit 32, 46, 64, 80, or 84, respectively, and a maximum temperature that a temperature of the web cannot exceed to ensure the web does not undergo undesired shrinking or other damage. The global dryer control system 2216 also determines a maximum speed at which the web 24 may be conveyed to ensure that the web 24 has sufficient heater dwell time (i.e., exposure to the flow(s) of heated air generated by heater unit(s) 2206a-2206n) to dry the deposited material and configures a transport control 2220 to set the conveyance speed of the web 24.

Figure 32A:
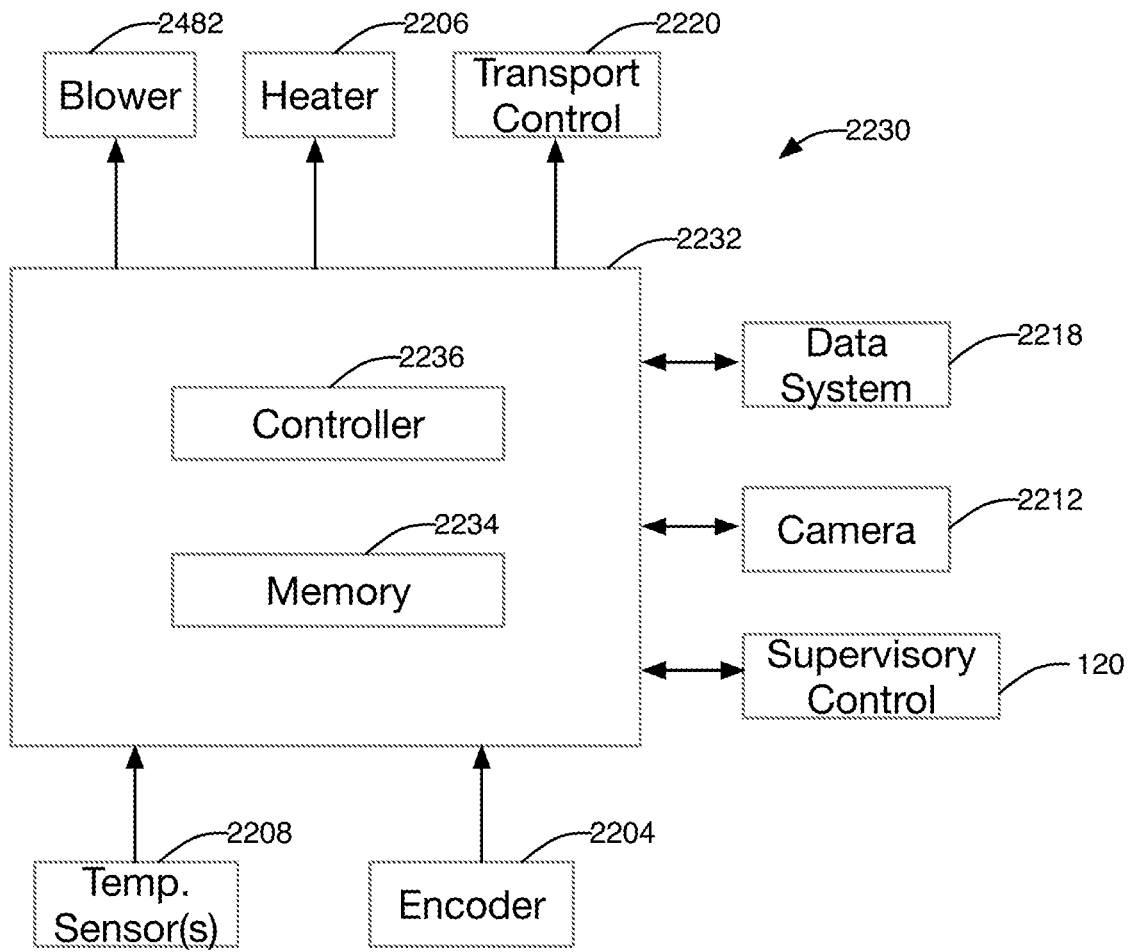
FIG. 32A is a block diagram of a computer system for implementing a closed-loop dryer management system of FIG. 32.

FIG. 32A illustrates a computer system 2230 especially adapted to implement the closed-loop dryer management system 2217, it being understood that any or all of the control systems disclosed herein, such as one or more of the control systems 120, 130, 2218, and/or 2220, may be implemented by like computer systems or by the computer system 2230. Thus, for example, the computer system 2230 may also comprise one or more processing unit(s) 2232 and may implement the closed-loop dryer management system 2217. Each processing unit 2232 comprises a personal computer, server, or other programmable device having a memory 2234 that, among other things, stores programming executed by one or more processing module(s) or controller(s) 2236 to implement the closed-loop dryer management system 2217. One or more of the processing unit(s) 2232 receive(s) signals from the temperature sensing device(s) 2208 and other sensors, receive(s) signals from the web position encoder 2204, controls operation of heater units 2206 and/or a blower 2482 of the dryer units 32, 46, 64, 80, or 84 and the camera 2212, and communicates with the supervisory control 120, the data system 2218, and transport control 2220.

Figure 33:
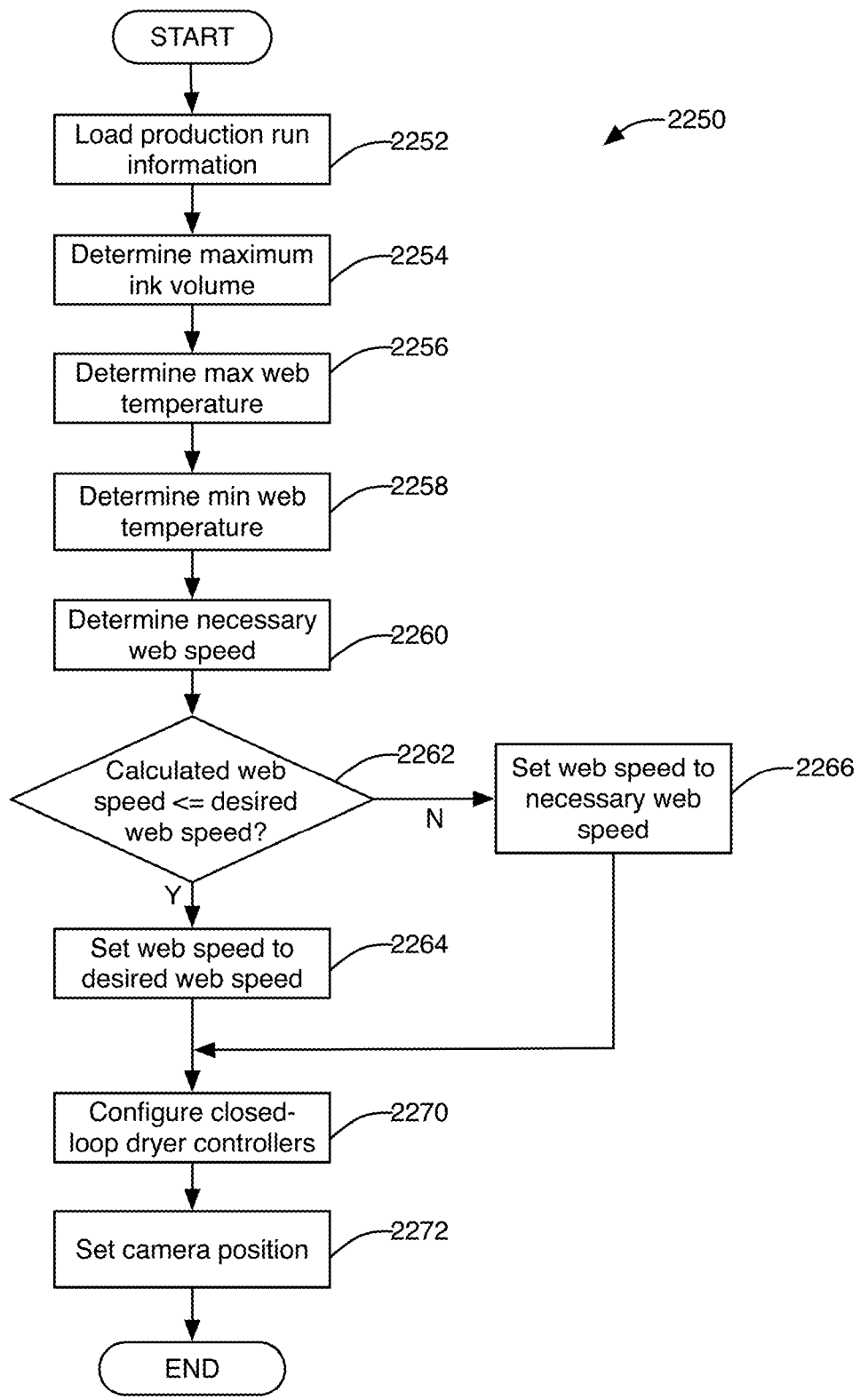
FIG. 33 is a flowchart of steps undertaken by a global dryer control system of the system of FIG. 1 to configure operating parameters of the dryer unit of FIG. 32.

FIG. 33 is a flowchart 2250, of the steps undertaken by the global dryer control system 2216 to configure the closed-loop dryer controller 2202 and the transport control 2220. Specifically, at step 2252, the global dryer control system 2216 receives, from the data system 2218, information regarding the production run including, for example, characteristics of the substrate that comprises the web 24, a desired web conveyance speed, characteristics of the material deposited by each imager unit 30, 44, 62, and 68, resolution and drop sizes each imager unit 30, 44, 62, and 68 is to deposit, and the content to be printed.

At step 2254, the global dryer control system 2216 analyzes the content to be printed, the resolution to be printed by each imager unit 30, 44, 62, and 68, and the drop sizes that such imager units are configured to deposit to develop an estimate of a maximum material volume on any portion of the web 24 that is to be deposited by any of the imager units 30, 44, 62, and 68. Such maximum material volume may be represented as a dot-percent of material, a volume of material per area of the web, or another metric apparent to one who has ordinary skill in the art.

In some embodiments, the maximum material volume per area of the web 24 is calculated by another system (not shown) when the content is prepared for printing and stored in the data system 2218. In such embodiments, the global dryer control system 2216 receives the maximum material volume per area from the data system, at step 2254.

At step 2256, the global dryer control system 2216 determines, based on the characteristics of the substrate that comprises the web 24, a maximum temperature such substrate may reach without being damaged. In some embodiments, the data system 2218 includes such maximum temperature information for each type of substrate and the global dryer control system 2216 retrieves such information.

In a preferred embodiment, the maximum web temperature determined at step 2256 is less than a temperature that would cause shrinkage or other harm to the web 24. For example, if a particular substrate that comprises the web 24 begins to shrink at a temperature of 130° F. (about 54° C.), the maximum web temperature may be set to 125° F. (about 52° C.).

Referring once again to FIG. 33, at step 2258, the global dryer control system 2216 determines the minimum web temperature the web 24 will have to reach in order to sufficiently dry the maximum material volume per area determined at step 2254. In some embodiments, the data system 2218 includes information, for each type of material, the temperature a particular volume of such material must reach to be dried. In such embodiments, the global dryer control system 2216 uses such material information and maximum material volume per area to determine the minimum web temperature the web will have to reach.

In a preferred embodiment, the minimum web temperature determined at step 2258 is greater than the temperature at which the maximum volume of material per area that is to be deposited during the production run would dry completely. For example, if the maximum volume of material per area to be deposited for the production run would dry completely at a temperature of 115° F., the minimum web temperature may be set to 120° F.

In other embodiments, the global dryer control system 2216 may calculate the minimum web temperature in accordance with the maximum web temperature determined at step 2256 by, for example, multiplying the maximum web by a predetermined value greater than zero and less than 1. In some embodiments, such predetermined value between is about 0.90 to about 0.98. In other embodiments, such predetermined value is between about 0.85 and about 0.98, and still other embodiments, such predetermined value is between about 0.95 and about 0.97.

In some embodiments, the global dryer control system 2216 calculates one minimum web temperature in accordance with the maximum volume of material per area that is deposited by all of the imager units 30, 44, 60, 70, and 82. In other embodiments, the global dryer control system 2216 calculates a minimum web temperature for each dryer unit 32, 46, 64, 80, or 84 in accordance with a maximum volume of material per area that is expected to be deposited by the imager unit 30, 44, 60, 70, or 82, respectively, associated with such heater unit 2206.

At step 2260, the global dryer control system 2216 calculates a necessary web speed that will provide sufficient heater dwell time for the web to reach the minimum web temperature estimated at step 2258. In some embodiments, the data system 2218 provides information regarding the dwell time and temperature necessary for the material on the web 24 to sufficiently dry and the data system 2218 or global dryer control system 2216 determines the necessary web speed to provide such dwell time based on the material comprising the web 24 and the heating characteristics of the heater units 2206.

At step 2262, the global dryer control system 2216 determines if the web speed calculated at step 2260 is less than or equal to the desired web conveyance speed loaded at step 2252. If so, the global dryer control system 2216 configures the transport control 2220 to set the web speed for the production run to the desired web conveyance speed, at step 2264. Otherwise, at step 2266, the global dryer control system 2216 configures the transport control 2220 to set the web speed for the production run to the necessary web speed calculated at step 2260.

At step 2270, the global dryer control system 2216 configures the closed-loop dryer controller 2202 of each dryer unit 32, 46, 64, 80, and 84 in accordance the minimum and maximum web temperatures determined at steps 2258 and 2256, respectively.

At step 2272, the global dryer control system 2216 determines a location along the width of the web 24 that is to receive the maximum material volume per area calculated in step 2254. In some embodiments, the global dryer control system 2216 operates a camera 2212 positioning apparatus (not shown) to automatically position the camera 2212 so that the camera 2212 is able to capture such determined location. In other embodiments, the global dryer control system 2216 informs an operator to manually position the camera 2212 so the camera 2212 can capture the determined location. Thereafter, the global dryer control system 2216 exits.

Referring once again to FIG. 32, after the closed-loop dryer controller 2202 and the transport control 2220 have been configured by the global dryer control system 2216, and the production run started, each closed-loop dryer controller 2202 operates the heating unit(s) 2206 associated therewith to maintain the temperature of the web 24 between the minimum and maximum temperatures. In addition, the closed-loop dryer controller 2202 detects if the material deposited on the web 24 is not being dried sufficiently and, for example, pick off is occurring and, in response, adjusts the heating unit(s) 2206 associated therewith and/or the transport control 2220 accordingly.

Figure 34:
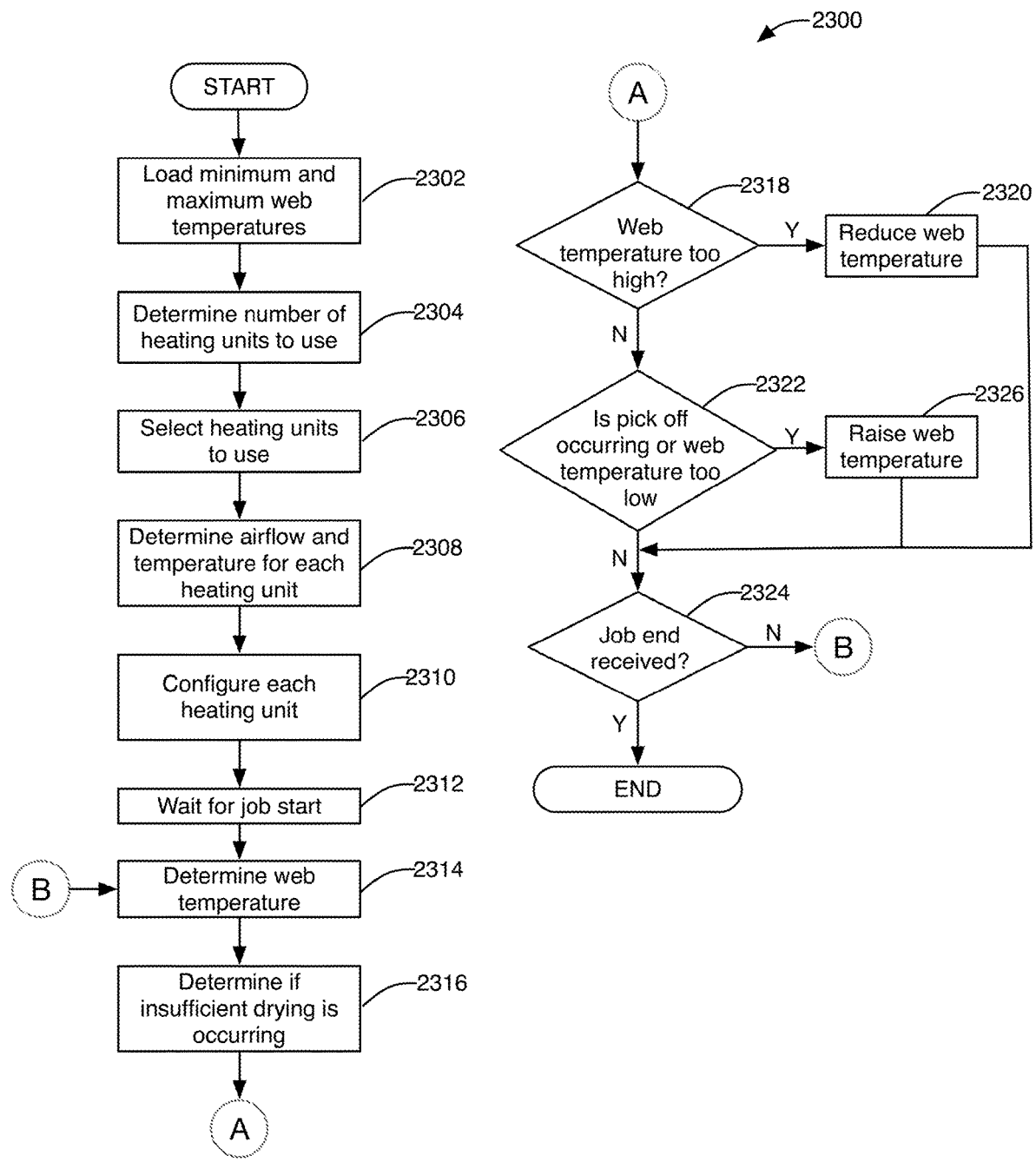
FIG. 34 is a flowchart of steps undertaken by a closed-loop dryer controller to control the dryer unit of FIG. 32.

FIG. 34 shows a flowchart 2300 of the steps undertaken by the closed-loop dryer controller 2202 to maintain the temperature of the web 24 and to detect and prevent insufficient drying. Referring to FIG. 34, at step 2302, the closed-loop dryer controller 2202 loads the minimum and maximum temperature information determined by the global dryer control system 2216 at steps 2256 and 2258 (FIG. 33).

At step 2304, the closed-loop dryer controller 2202 selects which ones of the heating unit(s) 2206a-2206n available in the drying unit 32, 46, 64, 80, or 84 will be operated to maintain the temperature of the web 24 at least at the minimum temperature during the production run. In some embodiments, the dryer unit 32, 46, 64, 80, 84 may be configured with only one heater unit 2206. In other embodiments, the dryer unit 32, 46, 64, 80, 84 may be configured with as many as 18 (or more) heater units 2206 and only a subset of such heater units may be used during the production run. In situations, where heavy material coverage is expected or a slow drying material is deposited on the web 24, all of the available heater units 2206 may be used. In some embodiments, all of the heater units 2206 may be used when the production run is started and the number of heater units 2206 may be adjusted during the production run in response to monitoring of the temperature of the web 24.

At step 2308, the closed-loop dryer controller 2202 determines a temperature and a speed of the flow of heated air generated by each selected heater unit 2206 during the production run. For example, a first one of the selected heater units (e.g., heater unit 2206a) that the web 24 passes after having been printed on may be configured to direct the flow of heated air toward the side 2214 of the web 24 at a lower speed and higher temperature than a subsequent heater unit 2206. It should be apparent to one of ordinary skill the art that the material deposited on the web 24 is relatively fluid when the web 24 reaches the first heater unit 2206a and that directing the flow of heated air at a high speed may disturb such material. As the material dries, the flow of heated air may be directed at the web at higher speeds without disturbing the material.

In some embodiments, the closed-loop dryer controller 2202 sets the speed of the heated air generated by the first heater unit 2206a to be between about 0.1 and about 0.2 cubic feet per minute per linear inch of the width of the web 24. Such air flow speed may be incrementally increased at one or more subsequent heater units 2206b through 2206n until the speed of the heated air generated by the heater unit 2206 that is operated and is most distal from the imager unit 30, 44, 60, 70, or 82 is approximately 2 cubic per minute per linear inch of a width the web 24.

Further, it should be apparent to one who has ordinary skill in the art, that evaporation of solvent in the material as the web 24 passes past the heater units 2206 facilitates cooling of the web 24. Thus, the flow of heated air generated by the first heater unit 2206a toward the web 24 may have a higher temperature because the solvent content of the material exposed to such flow of heated air is highest relative to when the material is exposed to air from subsequent heater unit(s) 2206b-2206n.

In some embodiments, the flow of heated air generated by the first heater unit 2206a exceeds the temperature at which the web 24 begins to shrink (i.e., a shrink temperature). For example, if the shrink temperature of the web is 130° F. (about 54° C.), the temperature of the flow of heated air generated by the first heater unit 2206a may be set to about 190° F. (about 88° C.). Further, the temperature of the airflow generated by subsequent heater unit(s) 2206b-2206n may ramp downward so that the airflow generated by the heater unit 2206 most distal from the imager unit 30, 44, 60, 70, or 82 is near the shrink temperature of the web (or less).

At step 2310, the closed-loop dryer controller 2202 configures each heater unit 2206 selected at step 2306 to generate the flow of heated air in accordance with the speed and temperature determined at step 2308 for that heater unit 2206.

At step 2312, the closed-loop dryer controller 2202 waits to receive a job start signal, for example, from the supervisory control system 120 (FIG. 1), that indicates that the production run is to begin. Also at step 2312, the closed-loop dryer controller 2202 directs the heater unit(s) 2206 selected at step 2306 to begin generating the flow of heated air.

At step 2314, the closed-loop dryer controller 2202 polls the temperature sensing devices 2208 associated with the heater units 2206 being used for the production run to acquire a temperature of the web 24 sensed by each temperature sensing device 2208.

At step 2316, the closed-loop dryer controller 2202 determines whether insufficient drying of the material may be occurring, as described in greater detail below.

At step 2318, the closed-loop dryer controller 2202 determines if the web temperature sensed by any of the temperature sensing devices polled at step 315 exceeds the maximum web temperature loaded at step 2302 and, if so, proceeds to step 2320. Otherwise, the closed-loop dryer controller 2202 proceeds to step 2322.

At step 2320, the closed-loop dryer controller 2202 adjusts operation of the heater unit(s) 2206 to facilitate reducing the temperature of the web 24 and then proceeds to step 2324.

At step 2322, the closed-loop dryer controller 2202 checks if the temperature of the web 24 determined at step 2314 is too low for the material deposited thereon to dry or if insufficient drying of the material was determined at step 2316 and, if so, the closed-loop dryer controller 2202 proceeds to step 2324. Otherwise, the closed-loop dryer controller 2202 proceeds to step 2326. In particular, the closed-loop dryer controller 2202 analyzes the temperatures of the web 24 sensed by all of the temperature sensing device 2208 and if none of the sensed temperatures of the web 24 exceed the minimum web temperature, the closed-loop dryer controller 2202 determines that web temperature is too low.

At step 2324, the closed-loop dryer controller 2202 adjusts operation of the heater unit(s) 2206 to facilitate raising the temperature of the web 24, and then proceeds to step 2326.

At step 2326, the closed-loop dryer controller 2202 determines if a job send signal has been received from the supervisory control system 120. If such signal has not been received, the closed-loop dryer controller 2202 returns to step 2314. Otherwise, the closed-loop dryer controller 2202 initiates a shutdown process for the heater units 2206 and exits.

Figure 35:
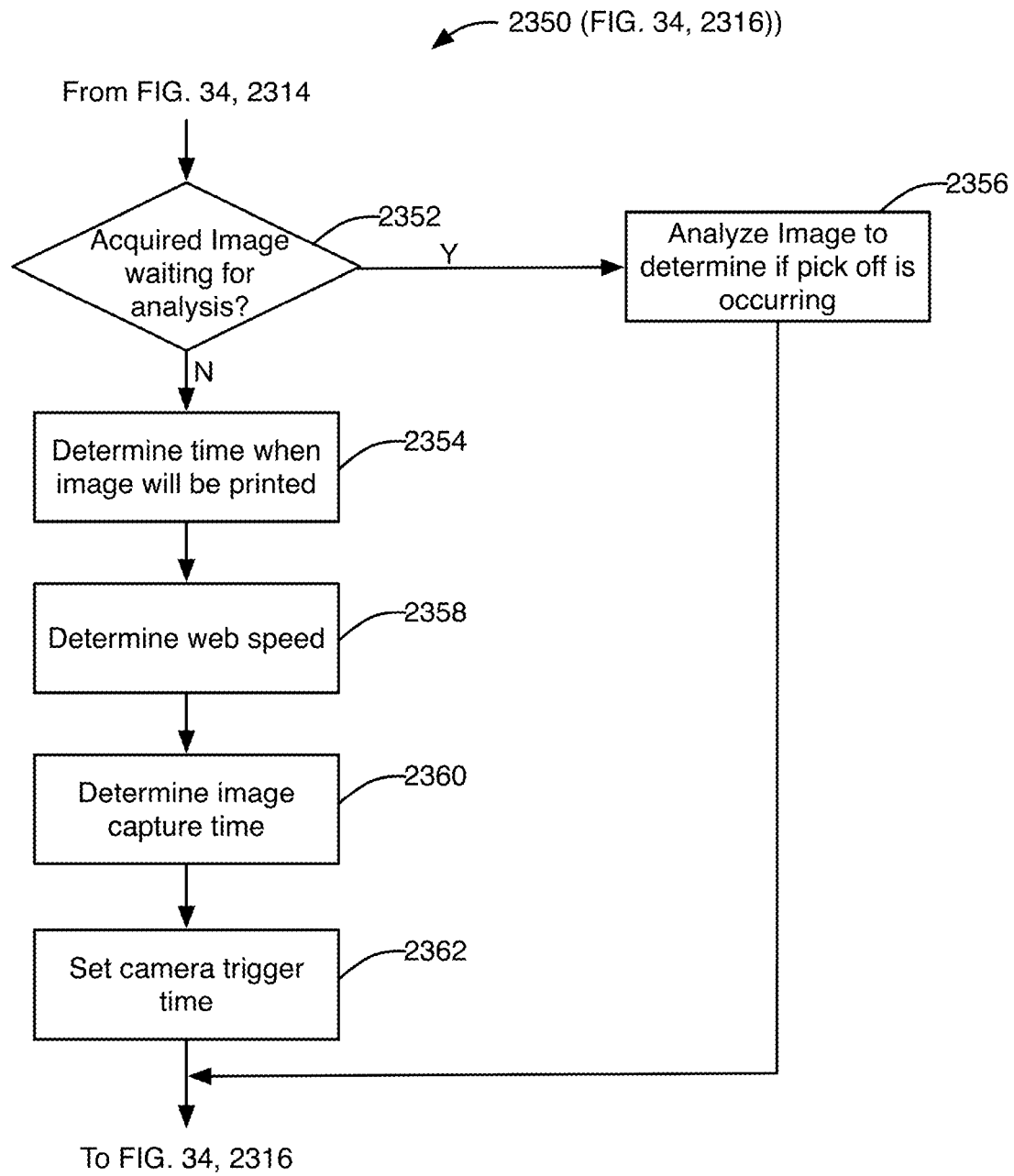
FIG. 35 is a flowchart of steps undertaken by the closed-loop dryer controller to determine if drying of material is insufficient.

FIG. 35 shows a flowchart 2350 of steps undertaken at step 2316 (FIG. 34) by the closed-loop dryer controller 2202 to determine if the material on the web 24 is insufficiently dried. Referring to FIGS. 32 and 35, as described above, insufficient drying of the web may be detected when the material deposited on the side 2214 of the web 24 contacts a roller, e.g. roller 2210, before such material is fully dried. A portion of the undried material is transferred to the roller 2210, and then from the roller 2210 to a subsequent portion of the side 2214 of the web 24.

Referring to FIG. 35, at step 2352, the closed-loop dryer controller 2202 determines if the camera 2212 has acquired an image of the web 24 is available for analysis. If no such image has been acquired, the closed-loop dryer controller 2202 proceeds to step 2354, otherwise the closed-loop dryer controller 2202 proceeds to step 2356.

At step 2354, the closed-loop dryer controller 2202 analyzes the content that is to be printed to determine a first time in the future when an image will be printed by the imager unit 30, 44, 62, 68 on a first portion of the web 24 and that will in the field of view of the camera 2212. At step 2358, the closed-loop dryer controller 2202 uses the frequency of the signals generated by the encoder roller 2204 (FIG. 32) and a predefined circumference of the encoder roller 2204 to determine the speed of the web 24.

At step 2360, the closed-loop dryer controller 2202 determines in accordance with the first time and the web speed, a second time when a second portion of the web 24 immediately following the first portion of the web 24 and that is supposed to be free of material will be in the field of view of the camera 2212.

At step 2362, the closed-loop dryer controller 2202 set a trigger to cause the camera 2212 to acquire an image of the second portion of the web 24 at the second time and store such image in a memory location accessible by closed-loop dryer controller 2202 and the camera 2212. In one embodiment, at step 2362, the closed-loop dryer controller 2202 sets a timer that causes an interrupt to be generated at the second time. In addition, the closed-loop dryer controller 2202 associates an image capture process to be initiated when such interrupt is generated. Such image capture process directs the camera 2212 to acquire the image, receives the acquired image, and stores the acquired image in the shared memory. Other ways of triggering the camera 2212 to capture an image at particular time apparent to one who has ordinary skill in the art may be used.

After the trigger has been set at step 2362, the closed-loop dryer controller 2202 proceeds to step 2316 of FIG. 34.

If, at step 2352, the closed-loop dryer controller 2202 determines that an image is available for analysis (i.e., an image acquired in response to the trigger set at step 2362 being actuated), the closed-loop dryer controller 2202, at step 2356, analyzes the acquired image. As described above, the captured image is of the second portion of the web 24 that is expected to be free of any material. The closed-loop dryer controller 2202 analyzes the captured image to determine if any pixels thereof have a value that indicates that material has been transferred to the second portion of the web 24. For example, the closed-loop dryer controller 2202 may apply a threshold operation to the acquired image that selects pixels having intensity values greater than a predetermined intensity value. If at least a predetermined number of pixels are selected as a result of such threshold operation, then the closed-loop dryer controller 2202 determines that material transfer from the roller 2210 to the second portion has occurred. Otherwise, the closed-loop dryer controller 2202 determines that no such material transfer has occurred. It should be apparent that other ways of analyzing the captured image to determine whether material transfer has occurred apparent to one who has ordinary skill in the art may be used. After undertaking step 2356, the closed-loop dryer controller 2202 proceeds to step 2316 of FIG. 34.

Figure 36:
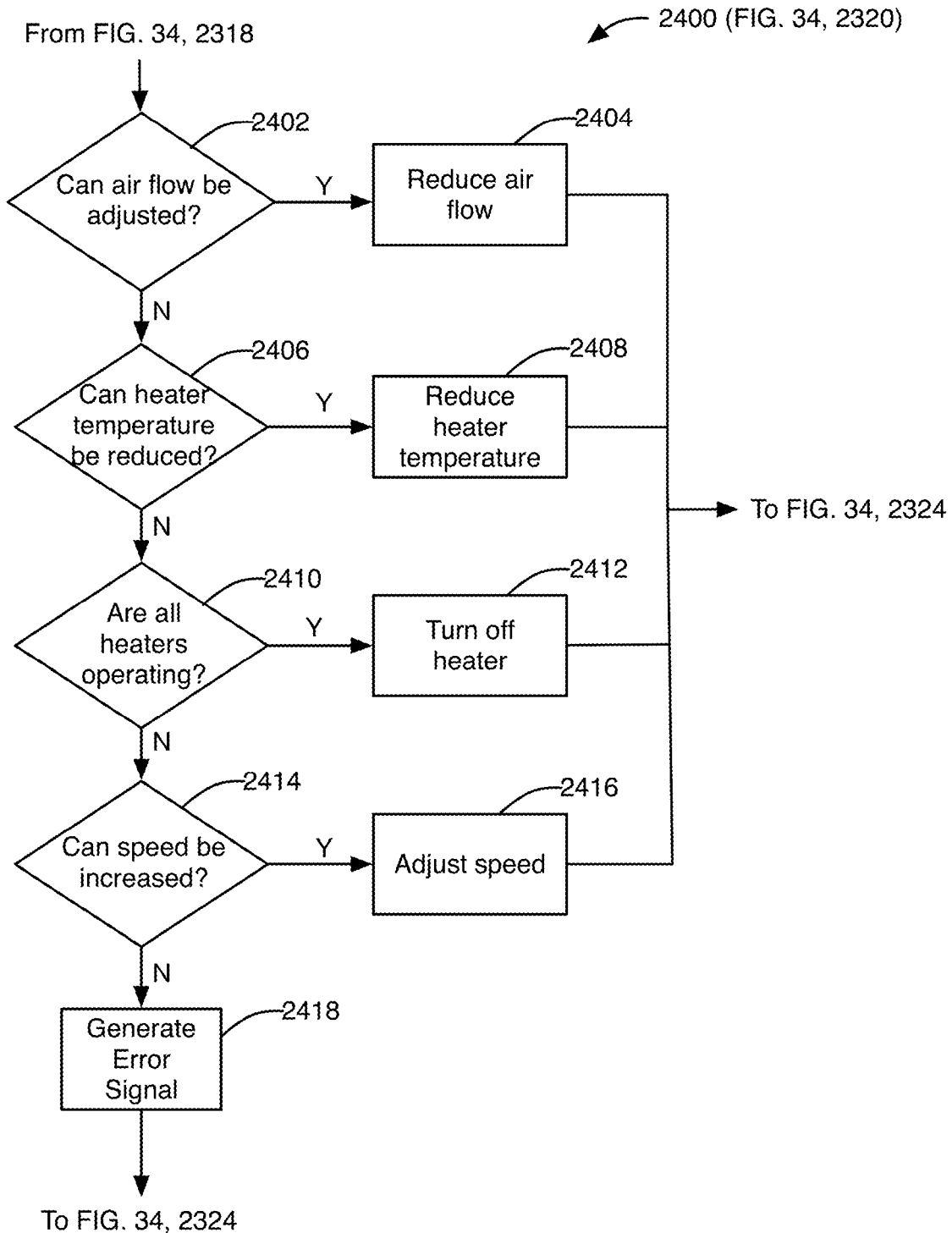
FIG. 36 is a flowchart of steps undertaken by the closed-loop dryer controller to reduce a temperature of a web printed on by the system of FIG. 1.

FIG. 36 is a flowchart 2400 of the steps undertaken by the closed-loop dryer controller 2202 to reduce the temperature of the web 24. Referring to FIG. 36, the closed-loop dryer controller 2202, determines, at step 2402, if the speed of the flow of heated air can be adjusted to reduce the temperature of the web 24. If so, then at step 2404, the closed-loop dryer controller 2202 directs the one or more of the heater units 2206a-2206n to reduce the speed of the flow of heated air of generated thereby, and thus reduce the convection of heat from the such heater units 2206 to the web 24. After undertaking step 2404, the closed-loop dryer controller 2202 proceeds to step 2324 (FIG. 34).

If at step 2402, the closed-loop dryer controller 2202 determines that the speed of the flow of heated air cannot be adjusted, then, at step 2406, the closed-loop dryer controller 2202 determines if the temperature of the heated air generated by one or more heater unit(s) 2206a-2206n can be reduced. For example, if the all of the heater unit(s) 2206a-2206n are operating at their minimum operating temperature, then such temperature cannot be reduced.

If the temperature of the flow of heated air can be reduced, then at step 408, the closed-loop dryer controller 2202 selects a heater unit 2206 and directs such heater unit 2206 to generate the flow of heated air at a lower temperature. In one embodiment, the closed-loop dryer controller 2202 selects the heater unit 2206 operating at the highest temperature and reduces the temperature of such heater unit 2206 by a predetermined amount (e.g., 5° F.) or by a percentage of the current setting of the temperature of the flow of heated air (e.g., 10%). In other embodiments, the closed-loop dryer controller 2202 selects and reduces the temperature of the flow of heated air generated by the heater unit 2206 most distal to the imager unit 30, 44, 62, or 68. After undertaking step 2408, the closed-loop dryer controller 2202 proceeds to step 2324 (FIG. 34). It should be that other ways to select the heater unit 2206 to adjust in this manner and/or amount of such adjustment apparent to one who has ordinary skill in the art may be used.

If at step 2406, the closed-loop dryer controller 2202 determines that the temperature of one of the heater unit(s) 2206a-2206n cannot be reduced, the closed-loop dryer controller 2202 determines, at step 2410, if more than one heater unit 2206a-2206n is operating and, if so, whether one such heater unit 2206 can be turned off. If so, then at step 2412, the closed-loop dryer controller 2202 turns off the heater unit 2206 most distal, most proximal, or intermediate the most distal and most proximal from the imager unit 30, 44, 62, or 68. After undertaking step 2412, the closed-loop dryer controller 2202 proceeds to step 2324 (FIG. 34). In an exemplary embodiment the closed-loop dryer controller 2202 turns off the heater unit 2206 that is operating and is most distal from the image unit 30, 44, 62, or 68.

If at step 2410, the closed-loop dryer controller 2202 determines that one of the heater unit(s) 2206a-2206n cannot be turned off, the closed-loop dryer controller 2202, at step 2414 determines if the conveyance speed of the web 24 can be increased (e.g., if the web 24 is not being conveyed at maximum speed) to reduce the heater dwell time of the web 24. If so, the closed-loop dryer controller 2202 directs the transport control 2220 to increase the web speed, at step 2416. After undertaking step 2416, the closed-loop dryer controller 2202 proceeds to step 2324 (FIG. 34).

If at step 2414, the closed-loop dryer controller 2202 determines that the web speed cannot be increased, then, in some embodiments, the closed-loop dryer controller 2202, at step 2418, generates an error signal to, for example, the supervisory control system 120 that the temperature of the web 24 cannot be reduced and an operator should be alerted and/or a shutdown procedure started. Thereafter, the closed-loop dryer controller 2202 proceeds to step 2324 (FIG. 34).

Figure 37:
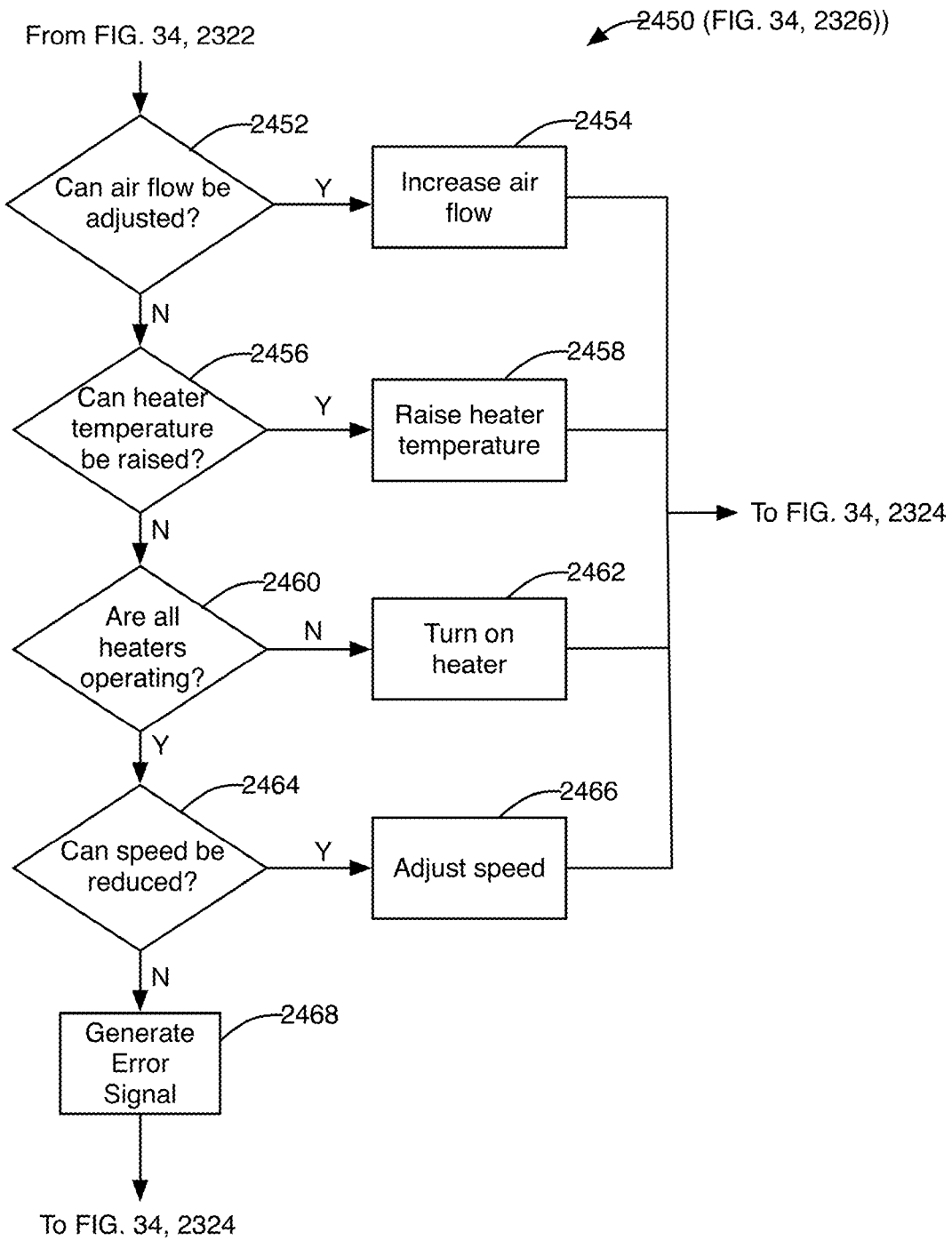
FIG. 37 is a flowchart of steps undertaken by the closed-loop dryer controller to raise a temperature of a web printed on by the system of FIG. 1.

FIG. 37 is a flowchart 2450 of the steps undertaken by the closed-loop dryer controller 2202 to raise the temperature of the web 24. Referring to FIG. 37, the closed-loop dryer controller 2202, at step 2452, determines if the speed of the flow of heated air can be adjusted to raise the temperature of the web 24. If so, then at step 2454, the closed-loop dryer controller 2202 increases the speed of the flow of heated air of one or more of the heater unit(s) 2206a-2206n to increase the convection of heat from the such heater unit(s) 2206. After undertaking step 2454, the closed-loop dryer controller 2202 proceeds to step 2324 (FIG. 34).

Otherwise, at step 2456, the closed-loop dryer controller 2202 determines if the temperature of the flow of heated air generated by one or more heater units 2206a-2206n can be increased. For example, if the all of the heater unit(s) 2206a-2206n are operating at their maximum operating temperature, then such temperature cannot be increased.

If the temperature of the flow of heated air can be increased, then at step 2458, the closed-loop dryer controller 2202 selects a heater unit 2206 and directs such heater unit 2206 to generate the flow of heated air at a higher temperature. In one embodiment, the closed-loop dryer controller 2202 selects the heater unit 2206 operating at the lowest temperature and increases the temperature of such heater unit 2206 by a predetermined amount (e.g., 5° F.) or by a percentage of the current setting of the temperature of the flow of heated air (e.g., 10%). In other embodiments, the closed-loop dryer controller 2202 selects and increases the temperature of the flow of heated air generated by the heater unit 2206 most proximal to the imager unit 30, 44, 62, or 68. After undertaking step 2454, the closed-loop dryer controller 2202 proceeds to step 2324 (FIG. 34). Other ways to select a heater unit 2206 to adjust in this manner and/or amount of such adjustment apparent to one who has ordinary skill in the art may be used.

If at step 2456, the closed-loop dryer controller 2202 determines that the temperature of the flow of air generated by any of the heater unit(s) 2206a-2206n cannot be raised to increase the temperature of the web 24, the closed-loop dryer controller 2202 determines, at step 2460 if all of the heater units 2206a-2206n are operating or if an additional heater unit 2206 can be turned on. If an additional heater unit 2206 can be turned on, then at step 2462, the closed-loop dryer controller 2202 turns on an additional heater unit 2206. After undertaking step 2462, the closed-loop dryer controller 2202 proceeds to step 2324 (FIG. 34). In some embodiments, the closed-loop dryer controller 2202 turns on the heater unit 2206 that is not operating and that is most distal, most proximate, or intermediate from the imager unit 30, 44, 62, or 68. In an exemplary embodiment, the closed-loop dryer controller 2202 turns on the heater unit 2206 that is not operating and that is most proximate the imager unit 30, 44, 62, or 68.

If at step 2460, if the closed-loop dryer controller 2202 determines that all of the heater units 2206a-2206n are operating, the closed-loop dryer controller 2202, at step 2464 determines if the conveyance speed of the web 24 can be decreased to increase the heater dwell time of the web 24. If so, the closed-loop dryer controller 2202 directs the transport control 2220 to reduce the web speed, at step 2466. After undertaking step 2466, the closed-loop dryer controller 2202 proceeds to step 2324 (FIG. 34).

If, at step 2464, the closed-loop dryer controller 2202 determines that the web speed cannot be reduced, then, in some embodiments, the closed-loop dryer controller 2202, at step 2468, generates an error signal to, for example, the supervisory control system 120 that the temperature of the web 24 cannot be increased and an operator should be alerted and/or a shutdown procedure started. Thereafter, the closed-loop dryer controller 2202 proceeds to step 2324 (FIG. 34).

Referring once again to FIG. 32, in some embodiments each heater unit 2206 is coupled by a corresponding air duct to a turbo-blower unit 2482. The turbo-blower unit 2482 supplies a flow of unheated air to all of the heater unit(s) 2206a-2206n, which in turn heat such flow of unheated air and to create the flow of heated air directed toward the web 24. In some embodiments, the closed-loop dryer controller 2202 adjusts the speed of the flow of unheated air generated by turbo-blower unit 2482 to increase or decrease the speed of the flow of heated air generated by all of the heater unit(s) 2206a-2206n. In addition, the closed-loop dryer controller 2202 may individually adjust a heater unit 2206 to increase or decrease the speed of the flow of heated air generated thereby independently of the other heater units 2206.

Figure 38A:
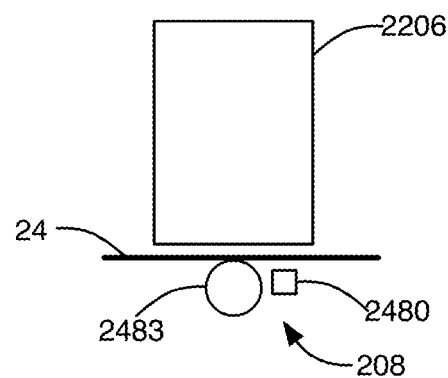
FIGS. 38A and 38B are a simplified block diagram showing a temperature sensor of the dryer unit of FIG. 32.
Figure 38B:
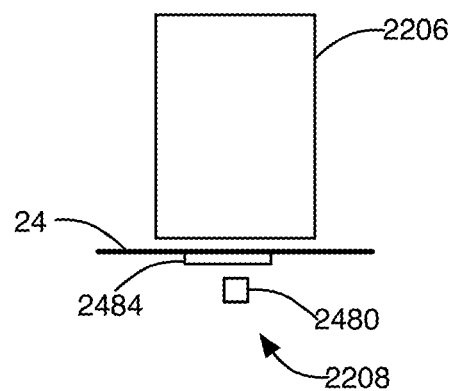

In some embodiments, the temperature sensing device 2208 may be a temperature sensor that directly senses the temperature of the web 24 to develop an indication of the temperature of the web 24. However, in some cases it may not always be feasible to directly sense the temperature of the web 24. For example, a contact temperature sensor may interfere with conveyance of the web 24. However, a contactless temperature sensor, e.g., an infrared temperature sensor, may not accurately sense the temperature of the web 24 because, for example, the web 24 has portions that are clear or has material disposed thereon that is of varying colors and/or comprises one or more metallic component(s). FIGS. 38A and 38B illustrate two embodiments of temperature sensing devices 2208 that use a contact less temperature sensor 2480 to develop an indication of the temperature of the web 24.

Referring to FIG. 38A, the temperature sensing device 2208 includes a heat-conductive roller 2483, such as an idler roller, disposed opposite the heater unit 2206 and the web rides on such heat-conductive roller 2483. The heat-conductive roller 2483 is heated by the web 24 and the temperature sensor 2480 monitors the temperature of the heat-conductive roller 2483 to develop an indication of the temperature of the web 24.

Alternately, referring to FIG. 38B, instead of the roller 2483, the temperature sensing device 2208 includes a heat-conductive plate 2484 disposed opposite the heater unit 2206 and the web 24 is conveyed past such plate 2484. The heat-conductive plate 2484 is heated by the web 24 and the temperature sensor 2480 monitors the temperature of the heat-conductive plate 2484 to develop an indication of the temperature of the web 24. It should be apparent that in such embodiments, the temperature sensor 2480 may be a contact less sensor or may be a contact sensor attached to the plate 2484.

Other configurations and ways of operating the temperature sensing device 2208 to develop an indication of the temperature of the web 24 apparent to those who have ordinary skill in the art may be used.

In some embodiments, additional sensors may be disposed in or proximate the dryer unit 32, 46, 64, 80, or 84 to sense the ambient conditions proximate thereto. For example, a humidity sensor (not shown) may be disposed proximate the dryer unit 32, 46, 64, 80, or 84 to sense the humidity proximate thereto and the global dryer control system 2216 and/or the closed-loop dryer controller 2202 may use information from such additional sensors to adjust the speed and/or temperature of the airflow generated by the heater unit(s) 2206.

Referring to FIG. 32, the dryer unit 32, 46, 64, 80, or 84 may include additional components including for example one or more roller(s) (e.g., roller 490) or other components (not shown) to guide and/or support the web 24 as it is conveyed through such dryer unit.

In some embodiments, the global dryer control system 2216 may receive information from the closed-loop dryer controller 2202 regarding whether the initial necessary web speed and minimum temperature developed at the start of a particular production run did not result in material deposited on the web 24 being sufficiently dried. The global dryer control system 2216 may adjust the information in the data system 2218 that a slower web speed and/or higher temperature should be used for other production runs that have characteristics similar to the particular production run.

In some embodiments, the global dryer control system 2216 may monitor the content that is going to printed by the imager unit 30, 44, 60, 70, or 82 during a production run. If the global dryer control system 2216 determines that the characteristics of such content will result in a substantially more or less volume of the material being deposited on the web 24, the global dryer control system 2216 may develop an updated necessary web speed and/or minimum temperature the web 24 should reach and reconfigure the closed-loop dryer system in accordance with such updated web speed and temperature.

It should be apparent to those who have skill in the art that any combination of hardware and/or software may be used to implement any or all of the system or components thereof described herein. It will be understood and appreciated that one or more of the processes, sub-processes, and process steps described in connection with the FIGS. may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in the FIGS. The software memory, for example the memory 304, may include an ordered listing of executable instructions for implementing logical functions (that is, "logic" that may be implemented in digital form such as digital circuitry or source code, or in analog form such as analog source such as an analog electrical, sound, or video signal). The instructions may be executed within the processing module or controller 306 that includes, for example, one or more microprocessors, general purpose processors, combinations of processors, digital signal processors (DSPs), field programmable gate arrays (FPGAs), or application-specific integrated circuits (ASICs). Further, the block diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

As should be evident from the foregoing, a printing composition such as a primer formulation may be applied directly to the surface of the web 24 or may be applied atop a coated surface, such as a white ink and/or metallic ink printed on the web 24, so as to simultaneously enable the adherence of a printed image to the web 24, and provide a chemical interaction with the overprinted inks optimizing color fidelity and overall image quality. Additionally, a printing composition such as an ink formulation may be applied directly to the surface of the web 24 or may be applied atop a coated surface, such as a primer and/or metallic ink, printed on the web 24 so as to simultaneously enable the adherence of a printed image to the web 24, and provide a chemical interaction with the printed compositions optimizing color fidelity and overall image quality. An optional printing composition such as an overprint varnish may be applied to modify the surface finish and appearance of the final imaged web 24.

The printing composition may be a water-based primer applied by a flexographic or flood coating fashion to the web 24 by the first imager unit 30. The printing composition comprises a pigment opacifier, for example, a dispersion of white colorant such as titanium dioxide, and therefore provides both a backing for the subsequently printed color ink jet image as well as opacity for preventing light pass-through on the reverse side of the web 24. The printing composition also includes one or more polymers or one or more polymer dispersion, a surfactant, a defoamer agent or a defoamer agent dispersion, a surface treatment agent, and water. In an exemplary embodiment, a carrier of the pigment opacifier dispersion, polymer dispersion, and/or defoamer agent dispersion comprises water, preferably deionized water.

Printing Composition 1

In an exemplary embodiment, the printing composition includes from about 10.00% to about 30.00% by weight of a polymer or an equal weight in a polymer dispersion, more preferably from about 15.00% to about 25.00% by weight, and most preferably about 20.00% by weight of a polymer or an equal weight in a polymer dispersion of the total printing composition percentage. The printing composition also includes from about 0.25% to about 2.00% by weight of a surfactant, more preferably from about 0.50% to about 1.50% by weight, and most preferably about 1.00% by weight of a surfactant of the total printing composition percentage. The printing composition further includes from about 0.05% to about 0.25% by weight of a defoamer agent or an equal weight in a defoamer agent dispersion, more preferably from about 0.10% to about 0.20% by weight, and most preferably about 0.15% by weight of a defoamer agent or an equal weight in a defoamer agent dispersion. The printing composition also includes up to about 5.00% by weight of a surface treatment agent, more preferably up to about 3.00%, and most preferably up to about 1.00% of a surface treatment agent by weight of the total printing composition percentage. The printing composition further includes up to about 35.00% by weight a pigment opacifier or an equal weight in a pigment opacifier dispersion of the total printing composition percentage. The printing composition also includes water, such as deionized water, in addition to any water apart of any dispersion, in an amount by weight to sum to 100.00%.

In an exemplary embodiment, the polymer or polymer dispersion, particularly for flexographic use is cationic, preferably a cationic acrylic colloidal dispersion that enables adherence of the printing composition and ink jet ink(s) to the substrate while simultaneously providing a chemical interaction with the variably printed ink jet ink optimizing print dot formation, size, color fidelity, and overall image quality.

In an exemplary embodiment, an alkali resistant cationic acrylic copolymer emulsion, such as Ottopol K-23, available from Gellner Industrial of Tamaqua, Pennsylvania, may be mixed with water to create a cationic acrylic colloidal dispersion. The polymer dispersion acts as a binder to stabilize pigment in variably printed ink while providing long-term durability to the final product.

In alternative embodiments, the polymer or polymer dispersion may be Ottopol K-362 or Ottopol K-633, or may be nonionic, such as Ottopol K-502, Takelac™ WS-635, available from Mitsui Chemicals of Tokyo, Japan, or Takelac™ WS-6355. In alternative embodiments, the polymer or polymer dispersion may be any other cationic or nonionic polymer or polymer dispersion, such as a food packaging compliant cationic or nonionic polymer or polymer dispersion.

In an exemplary embodiment, the surfactant comprises a web wetting agent, preferably Surfynol® 465, available from Evonik Industries of Essen, Germany.

In alternative embodiments, the surfactant may instead be another ethoxylated acetylenediol based surfactant such as Surfynol® 420, 440, or 485. Other surfactants, such as ethoxylated alcohol-based surfactants may instead be used. Alternate embodiments may instead comprise Surfynol® 104 PG 50, or any other cationic or nonionic surfactant, such as a food packaging compliant cationic or nonionic surfactant.

In an exemplary embodiment, the defoamer agent or defoamer agent dispersion comprises an emulsion of polysiloxanes, hydrophobic solids, and emulsifiers such as BYK®-023, available from BYK-Chemie GmbH of Wesel, Germany.

In alternative embodiments, the defoamer agent or defoamer agent dispersion may instead be any other cationic or nonionic defoamer agent or defoamer agent dispersion, such as food packaging compliant cationic or nonionic defoamer agent or defoamer agent dispersion.

In an exemplary embodiment, the surface treatment agent may comprise one or more soluble salts, such as multivalent salts or salts wherein the cation is selected from $Mg^{2+}$, $Ca^{2+}$, $Ba^{2+}$, $Zn^{2+}$, and $Al^{3+}$, more preferably $Ca^{2+}$ or $Mg^{2+}$, and most preferably $Ca^{2+}$ in combination with suitable counter ions. In this embodiment, calcium chloride is the surface treatment agent, since calcium chloride enhances the chemical neutralization and placement of the pigment solids contained in ink in contact with the printing composition.

In an alternative embodiment, the surface treatment agent may comprise of any other soluble salts, such as a food packaging compliant multivalent salt.

In an exemplary embodiment, the pigment opacifier or pigment opacifier dispersion, particularly for flexographic use comprises Ti-Pure™ R-900, available from the Chemours Company of Wilmington, Delaware, and Disperbyk®-190, available from BYK-Chemie GmbH.

In an alternative embodiment, the pigment opacifier or pigment opacifier dispersion may instead comprise any other pigment opacifier, such as a food packaging compliant pigment opacifier.

In an embodiment, the printing composition may further comprise a high surface area solid, such as silica or alumina colloidal particles. In this embodiment the amount of water by weight is reduced so as to have the addition of the high surface area solid with the other components to sum to 100.00%.

The overall viscosity of the printing composition deposited via flexographic printing technologies will vary depending upon the configuration of the system 20. In an exemplary embodiment, the viscosity is from about 40 centipoise ("cP") to about 200 cP, more preferably from about 55 cP to about 150 cP, and most preferably from about 70 cP to about 120 cP.

In another embodiment, the printing composition may be deposited using ink jet printer head(s) to the web 24 via the first imager unit 30. Thereinafter, the second imager unit 44 may deposit metallic ink(s) onto at least portions of the web 24 that received the primer via the first imager unit 30. A third imager unit 60 may deposit one or more primary process and/or secondary process color ink(s) on at least portions of the web that received the printing composition via the first imager unit 30.

Printing Composition 2

In another embodiment, the printing composition may be deposited using ink jet printer head(s) to the web 24 using the third imager unit 60. In this embodiment, a white pigmented ink is deposited via the first imager unit 30, and one or more metallic ink(s) is/are deposited by the second imager unit 44 on at least portions of the web 24 that received the white pigmented ink from the first imager unit 30. Then the water-based printing composition is deposited using the third imager unit 60 on at least portions of the web 24 that received the white pigmented ink from the first imager unit 30.

A water-based printing composition applied via ink jet as noted above is transparent and comprises a viscosity modifier, viscosity modifier dispersion, or viscosity modifier solution, a polymer, polymer dispersion, or polymer solution, a surfactant, a defoamer agent, defoamer agent dispersion, or defoamer agent solution, an antimicrobial agent, antimicrobial agent dispersion, or an antimicrobial agent solution, a surface treatment agent, and water. In an exemplary embodiment, a carrier of the viscosity modifier dispersion or viscosity modifier solution, polymer dispersion or polymer solution, defoamer agent dispersion, and/or antimicrobial agent dispersion or antimicrobial agent solution comprises water, preferably deionized water. In an exemplary embodiment, the printing composition includes from about 1.75% to about 3.25% by weight of a viscosity modifier or an equal weight in a viscosity modifier dispersion or viscosity modifier solution, preferably from about 2.00% to about 3.00%, and most preferably from about 2.25% to about 2.75% by weight of a viscosity modifier or an equal weight in a viscosity modifier dispersion or viscosity modifier solution of the total printing composition percentage. The printing composition includes from about 1.00% to about 4.00% by weight of a polymer or an equal weight in a polymer dispersion or polymer solution, more preferably from about 1.50% to about 30.50%, and most preferably from about 20.00% to about 30.00% by weight of a polymer or an equal weight in a polymer dispersion or polymer solution of the total printing composition percentage. The printing composition includes from about 0.25% to about 2.00% by weight of a surfactant, more preferably from about 0.50% to about 1.75%, and most preferably from about 0.75% about 1.50% by weight of a surfactant of the total printing composition percentage. The printing composition includes up to about 0.01% by weight of a defoamer agent or an equal weight in a defoamer agent dispersion of the total printing composition percentage. The printing composition includes up to about 0.02% by weight of an antimicrobial agent or an equal weight in an antimicrobial agent dispersion or antimicrobial agent solution of the total printing composition percentage. The printing composition includes up to about 70.50% by weight of a surface treatment agent, more preferably up to about 6.50% by weight, and most preferably up to about 5.00% by weight of a surface treatment agent of the total printing component percentage. The printing composition also includes water, such as deionized water, in addition to any water apart of any dispersion, in an amount by weight to sum to 100.00%.

In an exemplary embodiment printing composition, particularly for use with ink jet printing, the viscosity modifier comprises a polyether polyol solution. A polyether polyol solution may be non-ionic, such as Rheolate® 350 D, available from Elementis of London, United Kingdom, and may be mixed in equal parts with water to create a VOC-free polyether polyol based associative rheology modifier for water-based compositions.

In an alternative embodiment, the viscosity modifier may instead comprise any other cationic or nonionic viscosity modifier, such as a food packaging compliant cationic or nonionic polyether polyol solution.

Also in an exemplary embodiment, the polymer or polymer dispersion or polymer solution comprises a cationic acrylic resin solution. An alkali resistant cationic acrylic resin solution, preferably Ottopol K-633, may be mixed with water to create a cationic low molecular weight acrylic resin solution.

In alternative embodiments, the polymer or polymer dispersion or polymer solution may be Ottopol K-362, Ottopol K-23 or may be nonionic, such as Ottopol K-502, or any other cationic or nonionic polymer or polymer dispersion or polymer solution, such as a food packaging compliant cationic or nonionic polymer or polymer dispersion or polymer solution.

In an exemplary embodiment, the surfactant comprises a web wetting agent, preferably Surfynol® 465.

In alternative embodiments, the surfactant may be another ethoxylated acetylenediol based surfactant such as Surfynol® 420, 440, or 485. Other surfactants, such as ethoxylated alcohol based surfactants may instead be used. Alternate embodiments may instead comprise Surfynol® 104 PG 50, or any cationic or nonionic surfactant, such as a food packaging compliant surfactant.

In an exemplary embodiment, the defoamer agent may be a nonionic defoamer, preferably Surfynol® DF 110L.

In alternative embodiments, the defoamer agent, defoamer agent dispersion, or defoamer agent solution may instead be any other defoamer agent or defoamer agent dispersion that comprises at least one of acetylenic diol and ethylene glycol. In alternative embodiments, the defoamer agent or defoamer agent dispersion may instead be any other cationic or nonionic defoamer agent or defoamer agent dispersion, such as a food packaging compliant cationic or nonionic defoamer agent or dispersion of a defoamer agent.

In an exemplary embodiment, the antimicrobial agent may comprise of a biocide, preferably Proxel GXL, available from Arch Chemicals, Inc. of Norwalk, Connecticut, wherein the preservation of water-based products is achieved against microbial organisms.

In alternative embodiments, the antimicrobial agent, antimicrobial agent dispersion or antimicrobial solution may instead be any other antimicrobial agent, antimicrobial agent dispersion, or antimicrobial solution, such as a food packaging compliant antimicrobial agent, antimicrobial agent dispersion, or antimicrobial solution.

In an exemplary embodiment, the surface treatment agent may comprise one or more of soluble salts, such as multivalent salts or salts wherein the cation is selected from $Mg^{2+}$, $Ca^{2+}$, $Ba^{2+}$, $Zn^{2+}$, and $Al^{3+}$, preferably $Ca^{2+}$ or $Mg^{2+}$, and most preferably $Ca^{2+}$ in combination with suitable counter ions. In this embodiment, calcium chloride is the surface treatment agent, since calcium chloride enhances the chemical neutralization and placement of the pigment solids contained in ink deposited on the printing composition.

In an alternative embodiment, the surface treatment agent may comprise any other soluble salts, such as a food packaging compliant multivalent salt.

In an alternative embodiment, the printing composition may further comprise a high surface area solid, such as silica or alumina colloidal particles. In this embodiment the amount of water by weight is reduced so as to have the addition of the high surface area solid with the other components to sum to 100.00%.

The overall viscosity of the primer composition deposited via ink jet printing technologies will vary depending upon the print heads of the system 20. For instance the print head(s) that deposit(s) the color ink(s), such as primary process color inks, may have a viscosity range from about 3 cP to about 5 cP. The print head(s) that deposit(s) the white pigment ink may have a viscosity range from about 5 cP to about 6 cP. In an exemplary embodiment the print heads used in the system 20 are piezoelectric, and have an exemplary viscosity from about 2 cP to about 10 cP, more preferably from about 3 cP to about 10 cP, and most preferably from about 5 cP to about 6 cP. A color index of white (white color index) is the lightest color and is achromatic (i.e. having no hue). Furthermore, white color index has a hue angle of about 0 degrees, a saturation of about 0%, and a brightness of about 100%. A color index of non-white (non-white color index) is any color that is not the lightest color and is not achromatic (i.e. having a hue). Additionally, non-white color index has a hue angle greater than about 0 degrees, a saturation greater than about 0%, and a brightness of less than about 100%.

Whether deposited via flexographic, ink jet or other, the printing compositions disclosed above are suitable for use in the printing system 20 because it is a single composition containing both adhesive bonding and ink receptive properties thereby consolidating multi-part coatings, such as a tie/adhesive layer and an ink jet primer layer into a single treatment that can be applied to the web 24 using multiple different printing technologies such as jettable (i.e. ink jet) or conventional (i.e. flexographic anilox flood coating, flexographic spot coating), and other known printing technologies in the field of printing.

In general, the printing composition being either cationic and/or nonionic are "opposite" in chemical charge/pH to the anionic ink jet inks, and generally will interact with the pigments of the ink jet inks to fix them on the web 24.

Furthermore, such printing compositions are suitable for use on a web 24 subject to dimensional modification, such as heat-shrinkable film, due to the exemplary ability to dry and/or cure at low drying temperatures up to the threshold for dimensional integrity of the web 24 while the web 24 maintains integrity and dimensions. For example, the threshold for dimensional integrity of the web 24 may be 120° F. Additionally, the optimal drying and/or curing at such low drying temperatures allow the primer formulations to be used for variable ink jet printing with a high throughput. The throughput varies the from run to run or within a single run in the range from about 0 fpm to about 1000 fpm, most preferably about 500 fpm. The ability to use such printing compositions at varying throughput makes short-run printing operation and market-segment targeting more economically feasible.

Furthermore, once the printing compositions are applied, an optional printing composition, such as an overprint varnish, may be applied to modify the surface finish and appearance of the final imaged web.

Printing Composition 3

The printing composition may be a water-based white ink applied by ink jet to the web 24 by the first imager unit 30. The printing composition comprises a pigment or pigment dispersion, a polymer or polymer dispersion, a co-solvent, a surfactant, and water. In an exemplary embodiment, a carrier of the pigment dispersion and/or the polymer dispersion comprises water, preferably deionized water. In an exemplary embodiment, the co-solvent is water miscible and is a solvent or a carrier. In an exemplary embodiment, the printing composition includes from about 10.00% to about 14.00% by weight of a pigment or an equal weight in a pigment dispersion, preferably from about 10.50% to about 13.50% by weight, and most preferably from about 11.00% to about 13.00% by weight of a pigment or an equal weight in a pigment dispersion of the total printing composition percentage. The printing composition further includes from about 3.00% to about 7.00% by weight of a polymer or an equal weight in a polymer dispersion, preferably from about 3.50% to about 6.50% by weight, and most preferably from about 4.00% to about 6.00% by weight of a polymer or an equal weight in a polymer dispersion of the total printing composition percentage. The printing composition also includes from about 15.00% to about 19.00% by weight of a co-solvent, preferably from about 15.50% to about 18.50% by weight, and most preferably from about 16.00% to about 18.00% by weight of a co-solvent of the total printing composition percentage. The printing composition includes from about 0.20% to about 0.40% by weight of a surfactant, preferably from about 0.25% to about 0.35% by weight, and most preferably about 0.30% by weight of a surfactant of the total printing composition percentage. The printing composition also includes water, such as deionized water, in addition to any water apart of any dispersion, in an amount by weight to sum to 100.00%.

In an exemplary embodiment, the pigment or pigment dispersion comprises a titanium dioxide pigment, preferably Jetsperse® AQ White (AQD-PWHT), available from Sun Chemical of Parsippany, New Jersey.

In alternative embodiments, the pigment or pigment dispersion may be any other anionic pigment or pigment dispersion, such as a food packaging compliant anionic pigment or pigment dispersion.

In an exemplary embodiment, the polymer or polymer dispersion is anionic and comprises a waterborne polyurethane dispersion ("PUD"), preferably Takelac™ WPB-341, available from Mitsui Chemicals of Tokyo, Japan.

In alternative embodiments, the polymer or polymer dispersion may be any other nonionic or anionic polymer or polymer dispersion, such as a food packaging compliant nonionic or anionic polymer or polymer dispersion.

In an exemplary embodiment, the co-solvent comprises an alcohol-based co-solvent, preferably 3-methoxy-3-methyl-1-butanol, available from Kuraray of Okayama, Japan.

In alternative embodiments, the co-solvent may be any other co-solvent, such as a food packaging compliant co-solvent.

In an exemplary embodiment, the surfactant comprises a web wetting agent that is solvent-free. The surfactant may be a polyether modified polysiloxane compound, preferably BYK® 345, available from BYK-Chemie GmbH of Wesel, Germany.

In alternative embodiments, the surfactant may instead be another BYK® surfactants, such as BYK® 347, BYK® 348, BYK® 349 or may be another surfactant such as Dynol™ 980, available from Evonik of Essen, Germany, or instead be any other surfactant, such as a food packaging compliant surfactant.

Printing Composition 4

The printing composition may be a water-based non-white ink applied by ink jet to the web 24 by the third imager unit 60. In this exemplary printing composition includes from about 3.00% to about 6.00% by weight of a pigment or an equal weight in a pigment dispersion, preferably from about 3.50% to about 5.50% by weight, and most preferably from about 4.00% to about 5.00% by weight of a pigment or an equal weight in a pigment dispersion of the total printing composition percentage. The printing composition includes from about 7.00% to about 11.00% by weight a polymer or an equal weight in a polymer dispersion or polymer solution, preferably from about 7.50% to about 10.50% by weight, and most preferably from about 8.00% to about 10.00% by weight of a polymer or an equal weight in a polymer dispersion or polymer solution of the total printing composition percentage. The printing composition further includes from about 13.00% to about 17.00% by weight of a co-solvent, preferably from about 13.50% to about 16.50% by weight, most preferably from about 14.00% to about 16.00% by weight of a co-solvent of the total printing composition percentage. The printing composition also includes from about 0.25% to about 2.00% by weight of a surfactant, preferably from about 0.50% to about 1.50% by weight, and most preferably about 1.00% by weight of a surfactant of the total printing composition percentage. The printing composition also includes water, such as deionized water, in addition to any water apart of any dispersion, in an amount by weight to sum to 100.00%. In an exemplary embodiment, a carrier of the pigment dispersion, and/or the polymer dispersion or the polymer solution comprises water, preferably deionized water. In an exemplary embodiment, the co-solvent is water miscible and is a solvent or a carrier.

In an exemplary embodiment, the pigment or pigment dispersion comprises Pro-Jet™ pigment APD 1000, available from FujiFilm Imaging Colorants Inc. of New Castle, Delaware. The pigment dispersions may be primary process color inks such as APD 1000 Cyan dispersion, APD 1000 Magenta dispersion, APD 1000 LF Yellow dispersion, and APD 1000 Black.

In alternative embodiments, other pigment dispersions may instead be APD 1500 Black, APD 5000 Black, or any other primary process or secondary process color, or spot color pigment compositions, such as food packaging compliant primary process color or secondary process color, such as orange, violet, and green, or spot color compositions.

In an exemplary embodiment, the polymer, polymer solution, or polymer dispersion comprises a rosin adduct ester-based component, preferably a modified rosin solution derived from Lawter™ Filtrez™ 526A, available from Lawter Inc. of Chicago, Illinois. In the present application, a rosin derived from Lawter™ Filtrez™ 526A may be mixed with ammonium hydroxide and water to create a modified rosin solution that may be applied in composition via ink jet.

In alternative embodiments, the polymer, polymer solution, or polymer dispersion may be any other food packaging compliant nonionic or anionic polymer, polymer solution, or polymer dispersion.

In an exemplary embodiment, the co-solvent may be alcohol-based, preferably 3-methoxy-3-methyl-1-butanol.

In alternative embodiments, the co-solvent may be any other co-solvent, such as a food packaging compliant co-solvent.

In an exemplary embodiment, the surfactant comprises a web wetting agent that is solvent-free. The surfactant may be a polyether modified polysiloxane compound, preferably BYK® 345.

In alternative embodiments, the surfactant may instead be another BYK® surfactants, such as BYK® 347, BYK® 348, BYK® 349 or may be another surfactant such as Dynol™ 980, or instead be any other food packaging compliant surfactant.

The overall viscosity of the printing compositions disclosed above that may be deposited via ink jet printing technologies will vary depending upon the print head(s) of the system 20. For instance the print head(s) that deposit(s) the printing composition, such as primary process color compositions, may have a viscosity range from about 3 centipoise ("cP") to about 5 cP. The print head(s) that deposit(s) the printing composition with a color index of white may have a viscosity range from about 5 cP to about 6 cP. In an exemplary embodiment the print heads used in the system 20 are piezoelectric and have an exemplary viscosity from about 2 cP to about 10 cP, more preferably from about 3 cP to about 10 cP, and most preferably from about 5 cP to about 6 cP. A color index of white (white color index) is the lightest color and is achromatic (i.e. having no hue). Furthermore, white color index has a hue angle of about 0 degrees, a saturation of about 0%, and a brightness of about 100%. A color index of non-white (non-white color index) is any color that is not the lightest color and is not achromatic (i.e. having a hue). Additionally, non-white color index has a hue angle greater than about 0 degrees, a saturation greater than about 0%, and a brightness of less than about 100%.

Furthermore, the printing compositions disclosed above are suitable for use on a web 24 subject to dimensional modification, such as heat-shrinkable film, due to the exemplary ability to dry and/or cure at low drying temperatures up to the threshold for dimensional integrity of the web 24, while the web 24 maintains integrity and dimensions. For example, the threshold for dimensional integrity of the web 24 may be 120° F. Within the threshold for dimensional integrity of the web 24, the co-solvent in the above printing compositions is believed to have an evaporation profile that in combination with the other printing components allows for efficient drying and adherence of the printing components to the web 24. Additionally within the threshold for dimensional integrity of the web 24, the amount of polymer, polymer solution, or polymer dispersion in the above printing compositions is believed to be stable in a larger amount when added with the co-solvent and other components in the printing compositions. The high loading of the polymer, polymer solution, or polymer dispersion in the above printing compositions is believed to allow greater adherence of the printing composition to the web 24 or coated surface without diluting or decreasing the viscosity outside the viscosity range of the print head(s) of the system 20. Additionally, the optimal drying and/or curing at such low drying temperatures allow the printing compositions to be used for variable ink jet printing with a high throughput. The throughput varies the from run to run or within a single run in the range from about 0 fpm to about 1000 fpm, most preferably about 500 fpm. The ability to use such printing compositions at varying throughput makes short-run printing operation and market-segment targeting more economically feasible.

Furthermore, once the printing compositions are applied, an optional printing composition, such as an overprint varnish, may be applied to modify the surface finish and appearance of the final imaged web.

Printing Composition 5

The printing composition may be a water-based overprint varnish applied by a flexographic or flood coating fashion to the web 24 by the fifth imager unit 82. In an exemplary embodiment of an optional printing composition, particularly for use with flexographic technology, comprises a viscosity modifier or viscosity modifier dispersion, a polymer or polymer dispersion, a surfactant, a defoamer agent or defoamer agent dispersion, a surface additive, and water. In an exemplary embodiment, a carrier of the viscosity modifier dispersion, and/or the polymer dispersion comprises water, preferably deionized water.

In an embodiment, the printing composition includes from about 1.00% to about 2.00% by weight of a viscosity modifier or an equal weight in a viscosity modifier dispersion, preferably from about 1.25% to about 1.75% by weight, most preferably about 1.50% by weight of a viscosity modifier or an equal weight in a viscosity modifier dispersion of the total printing composition percentage. The printing composition includes from about 8.00% to about 12.00% by weight of a polymer or an equal weight in a polymer dispersion, preferably from about 8.5% to about 11.50% by weight, most preferably from about 9.00% to about 11.00% by weight of a polymer or an equal weight in a polymer dispersion of the total printing composition percentage. The printing composition also includes from about 0.25% to about 2.00% by weight of a surfactant, more preferably from about 0.50% to about 1.50% by weight, and most preferably about 1.00% by weight of a surfactant of the total printing composition percentage. The printing composition further includes from about 0.15% to about 0.45% by weight of a defoamer agent or an equal weight in a defoamer agent dispersion, more preferably from about 0.20% to about 0.40% by weight, and most preferably from about 0.25% to about 0.35% by weight of a defoamer agent or an equal weight in a defoamer agent dispersion of the total printing composition percentage. The printing composition includes from about 0.35% to 0.65% by weight of a surface additive, more preferably from about 0.40% to about 0.60% by weight, and most preferably from about 0.45% to about 0.55% by weight of a surface additive of the total printing composition percentage. The printing composition also includes water, such as deionized water, in addition to any water apart of any dispersion, in an amount by weight to sum to 100.00%.

In an exemplary embodiment, the viscosity modifier or viscosity modifier dispersion comprises methylcellulose, preferably Methocel™ A15LV, available from DuPont de Nemours, Inc. of Wilmington, Delaware.

In an alternative embodiment, the viscosity modifier or viscosity modifier dispersion may be any other viscosity modifier, such as a food packaging compliant viscosity modifier.

In an exemplary embodiment, the polymer or polymer dispersion comprises a waterborne dispersion based on vinyl acetate and ethylene, such as Vinnapas® 410, available from Wacker Chemie AG of Munich, Germany.

In an alternative embodiment, the polymer or polymer dispersion may be any other polymer or polymer dispersion, such as a food packaging compliant waterborne dispersion.

In an exemplary embodiment, the surfactant comprises a web wetting agent, preferably Surfynol® 465.

In alternative embodiments, the surfactant may be another ethoxylated acetylenediol based surfactant, or any other surfactant, such as a food packaging compliant surfactant.

In an exemplary embodiment, the defoamer agent comprises a nonionic defoamer, preferably Surfynol® DF 110L.

In alternative embodiments, the defoamer agent or defoamer agent dispersion may be any other cationic or nonionic defoamer agent or defoamer agent dispersion, such as a food packaging compliant cationic or nonionic defoamer agent or defoamer agent dispersion.

In an exemplary embodiment, the surface additive comprises a silicone containing surface additive, such as BYK®-333.

In alternative embodiments, the surface additive may be any other surface additive, such as a food packaging compliant surface additive.

Printing Composition 6

The printing composition may be a water-based overprint varnish applied by flexographic or flood coating fashion to the web 24 by the fifth imager unit 82. In an embodiment of an optional printing composition, the printing composition comprises a viscosity modifier or viscosity modifier dispersion, a polymer or polymer dispersion, a surfactant, a defoamer agent or defoamer agent dispersion, a wax additive or wax dispersion, a polymer modifier or polymer modifier dispersion, a polyether siloxane copolymer, and water. In an exemplary embodiment, a carrier of the viscosity modifier dispersion, polymer dispersion, defoamer agent dispersion, wax additive dispersion, and/or polymer modifier dispersion comprises water, preferably deionized water.

In an embodiment, the printing composition includes from about 1.00% to about 2.00% by weight of a viscosity modifier or an equal weight in a viscosity modifier dispersion, preferably from about 1.25% to about 1.75% by weight, most preferably about 1.50% by weight of a viscosity modifier or an equal weight in a viscosity modifier dispersion of the total printing composition percentage. The printing composition includes from about 9.00% to about 13.00% by weight of a polymer or an equal weight in a polymer dispersion, preferably from about 9.5% to about 12.50% by weight, most preferably from about 10.00% to about 12.00% by weight of a polymer or an equal weight in a polymer dispersion of the total printing composition percentage. The printing composition also includes from about 0.25% to about 20.00% by weight a surfactant, more preferably from about 0.50% to about 1.50% by weight, and most preferably about 1.00% by weight of a surfactant of the total printing composition percentage. The printing composition includes from about 0.05% to about 0.25% by weight of a defoamer agent or an equal weight in a defoamer agent dispersion, more preferably from about 0.10% to about 0.20% by weight, and most preferably about 0.15% by weight of a defoamer agent or an equal weight in a defoamer agent dispersion of the total printing composition percentage. The printing composition includes from about 1.00% to 2.50% by weight of a wax additive, more preferably from about 1.25% to about 20.25% by weight, and most preferably from about 1.50% to about 20.00% by weight of a wax additive of the total printing composition percentage. The printing composition includes from about 0.25% to 1.75% by weight of a polymer modifier, more preferably from about 0.50% to about 1.50% by weight, and most preferably from about 0.75% to about 1.25% by weight of a polymer modifier of the total printing composition percentage. The printing composition includes from about 0.25% to 1.75% by weight of a polyether siloxane copolymer, more preferably from about 0.50% to about 1.50% by weight, and most preferably from about 0.75% to about 1.25% by weight of a polyether siloxane copolymer of the total printing composition percentage. The printing composition also includes water, such as deionized water, in addition to any water apart of any dispersion, in an amount by weight to sum to 100.00%.

In an exemplary embodiment, the viscosity modifier or viscosity modifier dispersion comprises methylcellulose, preferably Methocel™ A15LV.

In an alternative embodiment, the viscosity modifier or viscosity modifier dispersion may be any other viscosity modifier or viscosity modifier dispersion, such as a food packaging compliant viscosity modifier.

In an exemplary embodiment, the polymer or polymer dispersion may be a waterborne dispersion based on vinyl acetate and ethylene, preferably Vinnapas® 410.

In an alternative embodiment, the polymer or polymer dispersion may be any other polymer or polymer dispersion, such as a food packaging compliant waterborne dispersion.

In an exemplary embodiment, the surfactant comprises a web wetting agent, preferably Surfynol® 465.

In alternative embodiments, the surfactant may be another ethoxylated acetylenediol based surfactant such as Surfynol® 420, 440, and 485. Other surfactants, such as ethoxylated alcohol based surfactants may instead be used. Alternate embodiments may instead comprise Surfynol® 104 PG 50, or any other cationic or nonionic surfactant, such as a food packaging compliant cationic or nonionic surfactant.

In an exemplary embodiment, the defoamer agent or defoamer agent dispersion comprises an emulsion of polysiloxanes, hydrophobic solids, and emulsifiers such as BYK®-023.

In alternative embodiments, the defoamer agent or defoamer agent dispersion may be any other cationic or nonionic defoamer agent or defoamer agent dispersion such as a food packaging compliant cationic or nonionic defoamer agent or a defoamer agent dispersion.

In an exemplary embodiment, the wax additive or wax additive dispersion comprises a wax additive of aqueous form, preferably Ultralube® E-912, available from Keim-Additec, of Kirchberg, Germany.

In alternative embodiments, the wax additive or wax additive dispersion may be any other wax additive or wax additive dispersion, such as a food packaging compliant wax additive or wax additive dispersion.

In an exemplary embodiment, the polymer modifier or polymer modifier dispersion comprises an associative rheological modifier, preferably Rheolate® 212.

In alternative embodiments, the polymer modifier or polymer modifier dispersion may be any other rheological modifier, such as a food packaging compliant associative rheological modifier.

In an exemplary embodiment, the polyether siloxane copolymer comprises TEGO® Glide 410, available from Evonik Industries.

In an alternative embodiment, the polyether siloxane copolymer may be any other polyether siloxane copolymer, such as a food packaging compliant polyether siloxane copolymer.

The following examples further illustrate the disclosure but should not be construed as in any way limiting its scope.

Example 1. A printing composition useful in the present disclosure for flexographic application comprises the following formulation by weight:
  a. 35.00% by weight of an opacifier dispersion (TiO2 dispersion including Ti-Pure™ R-900, Disperbyk®-190) (75% solids)

b. 50.00% by weight of a polymer dispersion (Ottopol K-23) (42% solids)
c. 1.00% by weight of a surfactant (Surfynol® 465)
d. 0.80% by weight of a defoamer agent dispersion (BYK®-023) (19% solids)
e. 1.00% by weight of a surface treatment agent (CaCl2))
f. 12.20% by weight of deionized water (DI H2O)

The 12.20% DI H2O is additional deionized water to the water already used for the dispersions, such as Ottopol K-23 dispersion. The total amount of deionized water throughout the printing composition is 50.67% (counting dispersion and other subcomponent water content).

Example 2. A printing composition according to the present disclosure for ink jet application comprises the following formulation by weight:
  a. 5.00% by weight of a viscosity modifier dispersion (Rheolate® 350 D) (50% solids)
  b. 10.00% by weight of a polymer dispersion (Ottopol K-633) (27% solids)
  c. 1.00% by weight of a surfactant (Surfynol® 465)
  d. 0.06% by weight of a defoamer agent dispersion (Surfynol® DF 110L) (20% solids)
  e. 0.10% by weight of an antimicrobial agent dispersion (Proxel GXL) (20% solids)
  f. 5.00% by weight of a surface treatment agent (CaCl2))
  g. 78.84% by weight of deionized water (DI H2O)

The 78.84% DI H2O is additional deionized water to the water already used for the dispersions, such as Ottopol K-633 dispersion. The total amount of deionized water throughout the primer formulation is 88.84% (counting dispersion and other subcomponent water content).

Example 3. A printing composition useful in the present disclosure for ink jet application comprises the following formulation by weight:
  a. 19.35% by weight of a pigment dispersion (Jetsperse® AQ White (AQD-PWHT)) (62% solids)
  b. 19.37% by weight of a polymer dispersion (Takelac™ WPB-341) (30% solids)
  c. 17.43% by weight of a co-solvent (3-methoxy-3-methyl-1-butanol)
  d. 0.30% by weight of a surfactant (BYK® 345)
  e. 43.55% by weight of deionized water (DI H2O)

The 43.55% DI H2O is additional deionized water to the water already used for The dispersions, such as Takelac™ WPB-341 dispersion. The total amount of deionized water throughout the printing composition is 57.12% (counting dispersion and other subcomponent water content).

Example 4. A printing composition according to the present disclosure via ink jet application has the following formulation by weight:
  a. 11.20% by weight of a pigment dispersion (FujiFilm APD 1000 Cyan) (15% solids)
  b. 35.00% by weight of a polymer solution (Lawter™ Filtrez™ 526A modified rosin ester) (32% solids)
  c. 15.00% by weight of a co-solvent (3-methoxy-3-methyl-1-butanol)
  d. 1.00% by weight of a surfactant (BYK® 345)
  e. 37.80% by weight of deionized water (DI H2O)

The 37.80% DI H2O is additional deionized water to the water already used for the dispersions. The Lawter™ Filtrez™ 526A modified rosin ester had a pH of 9.00. At 25° C., the printing composition has a viscosity of 4.57 cP, a surface tension of 31.0 dynes/cm, and pH of 8.92.

Example 5. A printing composition according to the present disclosure by ink jet application has the following formulation by weight:
  a. 30.00% by weight of a pigment dispersion (FujiFilm APD 1000 Magenta) (15% solids)
  b. 29.00% by weight of a polymer solution (Lawter™ Filtrez™ 526A modified rosin ester) (32% solids)
  c. 15.00% by weight of a co-solvent (3-methoxy-3-methyl-1-butanol)
  d. 1.00% by weight of a surfactant (BYK® 345)
  e. 25.00% by weight of deionized water (DI H2O)

The 25.00% DI H2O is additional deionized water to the water already used for the dispersions. The Lawter™ Filtrez™ 526A modified rosin ester had a pH of 9.00. At 25° C., the printing composition has a viscosity of 4.64 cP, a surface tension of 31.2 dynes/cm, and pH of 8.90.

Example 6. A printing composition according to the present disclosure by ink jet application has the following formulation by weight:
  a. 30.00% by weight of a pigment dispersion (FujiFilm APD 1000LF Yellow) (15% solids)
  b. 22.50% by weight of a polymer solution (Lawter™ Filtrez™ 526A modified rosin ester) (32% solids)
  c. 15.00% by weight of a co-solvent (3-methoxy-3-methyl-1-butanol)
  d. 1.00% by weight of a surfactant (BYK® 345)
  e. 31.50% by weight of deionized water (DI H2O)

The 31.50% DI H2O is additional deionized water to the water already used for the dispersions. The Lawter™ Filtrez™ 526A modified rosin ester had a pH of 9.00. At 25° C., the printing composition has a viscosity of 4.56 cP, a surface tension of 31.8 dynes/cm, and pH of 8.94.

Example 7. A printing composition according to the present disclosure by ink jet application has the following formulation by weight:
  a. 30.00% by weight of a pigment dispersion (FujiFilm APD 1500 Black) (15% solids)
  b. 25.50% by weight of a polymer solution (Lawter™ Filtrez™ 526A modified rosin ester) (32% solids)
  c. 15.00% by weight of a co-solvent (3-methoxy-3-methyl-1-butanol)
  d. 1.00% by weight of a surfactant (BYK 345)
  e. 28.50% by weight of deionized water (DI H2O)

The 28.50% DI H2O is additional deionized water to the water already used for the dispersions. The Lawter™ Filtrez™ 526A modified rosin ester had a pH of 9.00. At 25° C., the printing composition has a viscosity of 4.50 cP, a surface tension of 31.4 dynes/cm, and pH of 8.87.

Example 8. A printing composition useful in the present disclosure for flexographic application comprises the following formulation by weight:
  a. 30.00% by weight of a viscosity modifier dispersion (Methocel™ A15LV) (5% solids)
  b. 10.00% by weight of a polymer dispersion (Vinnapas® 410) (55% solids)
  c. 1.00% by weight of a surfactant (Surfynol® 465)
  d. 1.50% by weight of a defoamer agent dispersion (Surfynol® DF 110L) (20% solids)
  e. 0.50% by weight of a surface additive (BYK®-333)
  f. 57.00% by weight of deionized water (DI H2O)

Example 9. A printing composition useful in the present disclosure for flexographic application comprises the following formulation by weight:
  a. 30.00% by weight of a viscosity modifier dispersion (Methocel™ A15LV) (5% solids)
  b. 20.00% by weight of a polymer dispersion (Vinnapas® 410) (55% solids)
  c. 1.00% by weight of a surfactant (Surfynol® 465)
  d. 0.80% by weight of a defoamer agent dispersion BYK®-023) (19% solids)

e. 5.00% by weight of a wax additive dispersion (Ultralube® E-912) (35% solids)
f. 5.00% by weight of a polymer modifier dispersion (Rheolate® 212) (20% solids)
g. 1.00% by weight of a polyether siloxane copolymer (TEGO® Glide 410)
h. 37.20% by weight of deionized water (DI H2O)

The 37.20% DI H2O is additional deionized water to the water already used for other. The total amount of deionized water throughout the printing composition is 82.60% (counting dispersion and other subcomponent water content).

INDUSTRIAL APPLICABILITY

In summary, the web handling system 200 utilizes one or more precisely grooved nip rollers, multiple cross-grooved idler rollers, accurately aligned and spaced contact points throughout the entire system, and dynamic splice detection and subsequent image head retraction to minimize the possibility of wrinkle formation and damage therefrom. In addition, spreader rollers before important imaging nip points and dynamic gap and tension control also help minimize risk of system and product damage. The control system is operable to undertake closed-loop printhead gapping, splice, and/or wrinkle detection and printhead retraction to prevent printhead damage.

Also in summary, a.) tension measurements of the previous zone are used to adjust driven rollers to achieve closed loop control; b.) control calculations allow for a wide range of change but at a slower rate to build tension in the elastic plastic film; and c.) multiple PID control algorithms are used for each tension control (i.e., driven) roller comprising a first PID controller tuned to control roller positions relatively quickly to maintain synchronized movement of all rollers, and a second PID controller responsive to tension feedback for each zone that adjusts roller positions relatively slowly.

Further, the system 20 including the control system 130 adjusts the registration from imager unit to imager unit without using any mechanical adjustment. The digital system 130 adjusts the firing of the printheads without the need to move the substrate or the print head array for registration purposes. By not moving the web around laterally, wrinkles are controlled/eliminated.

The print system 20 also allows for dual side printing using multiple imager units on a single print drum per imager unit. Also, each imager unit can be virtually/digitally decoupled, so each portion of each imager unit 30, 44, 60, 70, and/or 82 can print independently from the other. Registration alignment can be made from imager unit to imager unit, side to side and back to front. This alignment can be processed through a camera and/or a high-speed sense mark system.

Further, in some embodiments, the printing system 20 utilizes one or more printing methodologies such as flexography and ink jet to deposit a primer improving the ability to print an ink jet image on a flexible/shrinkable and/or an impermeable substrate, such as a heat-shrinkable substrate that is continuously variable at a high printing throughput speed with coating(s) and/or ink(s) that are water-based and comprise food law compliant component(s) for food packaging, such as substance(s) listed in annex(es) of Swiss Ordinance RS 817.023.21.

In addition, in some embodiments, the printing system 20 for printing on a clear polymeric film web 24 includes a plurality of imager units 44, 60, 82, and 228 having inkjet print units 1184, 1186, 1188, and 228. Such inkjet print units are operated to deposit material on the web 24 at a particular resolution and drop size selected in accordance with the type of material being deposited by such inkjet print unit and content being reproduced thereby. In addition, a distortion corrector 1200 determines adjustments to the dimensions and position on the web 24 of a page element prior being printed to compensate for distortion of the printed page element that results from heat shrinking of a bag manufactured from the web 24 around a product disposed therein.

Also, a dryer management system 2217 is disclosed herein that operates on or more dryer unit(s) 32, 46, 64, 80, and/or 84 to dry material disposed on a web. It should be apparent to one who has ordinary skill in the art that the embodiments of the dryer management system 2217 disclosed herein may be adapted to dry any type of material deposited on any type of substrate using heat and/or a flow of heated air. Further, it should be apparent such embodiments may be adapted to dry material deposited on a substrate using any type of material deposition process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure. This written description uses examples to disclose the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A printing system, comprising:
   a transport apparatus adapted to transport a flexible web along a process direction;
   first and second individually controllable ink jet imager units offset from one another along the process direction wherein each of the first ink jet imager unit and the second ink jet imager unit includes a first portion operable to print on a first portion of the web and a second portion operable to print on the second portion of the web wherein each of the first portion and second portion of the first and second ink jet imager units is stationary along the process direction and the lateral direction and wherein the first ink jet imager unit prints on the web at a first print resolution and the second ink jet imager unit prints on the web at a second print resolution different than the first print resolution;

the second ink jet imager unit comprising a plurality of inkjet printing units disposed around a circumference of a drum;

each inkjet printing unit comprising a plurality of inkjet printheads such that ejection nozzles of the inkjet printheads substantially span the width of the flexible web;

a first closed-loop control system that controls web handling and a distance of at least one of the first portion and the second portion of at least one of the first ink jet imager unit and the second ink jet imager unit from the web; and a second closed-loop control system that controls registration between the first ink jet imager unit and the second ink jet imager unit.

2. The printing system of claim 1, wherein the first closed-loop control system includes a printhead position sensor and a printhead actuator.

3. The printing system of claim 1, further including a plurality of cross-grooved idler rollers that support the web wherein each cross-grooved idler roller comprises two independently journaled portions.

4. The printing system of claim 3, further including an imaging drum, a nip roller adjacent the imaging drum and forming a nip therewith, and a spreader roller disposed between the plurality of cross-grooved idler rollers and the nip roller.

5. The printing system of claim 4, wherein each idler roller is disposed no more than a first distance from an adjacent idler roller, spreader roller, and nip roller and wherein the spreader roller is disposed no more than a second distance from the nip, wherein the first distance is in a range of 38 to 28 inches, 36 to 30 inches, or 35 to 33 inches and the second distance is in a range of 6 to 11 inches, 6.5 to 9 inches, or 7.0 to 8.5 inches.

6. A printing system for printing a heat-shrinkable web, comprising:

a transport apparatus adapted to transport a heat shrinkable flexible web along a process direction, the heat-shrinkable flexible web having a total free shrink at 185° F. of at least 20% as measured by ASTM D2732;

first and second individually controllable ink jet imager units offset from one another along the process direction wherein each of the first ink jet imager unit and the second ink jet imager unit includes a first portion operable to print on a first portion of the web and a second portion operable to print on the second portion of the web wherein each of the first portion and second portion of the first and second ink jet imager units is stationary along the process direction and the lateral direction and wherein the first ink jet imager unit includes printheads that print on the web at a first print resolution and the second ink jet imager unit includes printheads that print on the web at a second print resolution different than the first print resolution;

a first closed-loop control system that controls web handling and a distance of at least one of the printheads from the web;

a second closed-loop control system responsive to web temperature that controls print drying without substantial shrinking of the web; and a third closed-loop control system that controls registration between the first ink jet imager unit and the second ink jet imager unit.

7. The printing system of claim 6, wherein the first closed-loop control system includes a printhead position sensor and a printhead actuator.

8. The printing system of claim 6, further including a plurality of cross-grooved idler rollers that support the web wherein each cross-grooved idler roller comprises two independently journaled portions.

9. The printing system of claim 8, further including an imaging drum, a nip roller adjacent the imaging drum and forming a nip therewith, and a spreader roller disposed between the plurality of cross-grooved idler rollers and the nip roller.

10. The printing system of claim 9, wherein each idler roller is disposed no more than a first distance from an adjacent idler roller, spreader roller, and nip roller and wherein the spreader roller is disposed no more than a second distance from the nip, wherein the first distance is in a range of 38 to 28 inches, 36 to 30 inches, or 35 to 33 inches and the second distance is in a range of 6 to 11 inches, 6.5 to 9 inches, or 7.0 to 8.5 inches.

11. A printing system for printing a heat-shrinkable web, comprising:

a transport apparatus adapted to transport a flexible heat-shrinkable web along a process direction, the heat-shrinkable flexible web having a total free shrink at 185° F. of at least 20% as measured by ASTM D2732;

first and second individually controllable ink jet imager units offset from one another along the process direction wherein each of the first ink jet imager unit and the second ink jet imager unit includes a first portion operable to print on a first portion of the web and a second portion operable to print on the second portion of the web wherein each of the first portion and second portion of the first and second ink jet imager units is stationary along the process direction and the lateral direction;

at least one dryer operable to dry print on the web without substantial shrinking of the web;

a first closed-loop control system responsive to an indication of web temperature that controls the at least one dryer; and a second closed-loop control system that controls registration between the first ink jet imager unit and the second ink jet imager unit.

12. The system of claim 11, further including a distortion corrector that adjusts dimensions of a page element to be printed on the web to compensate for distortion of the printed page element due to shrinking of the web.

13. The system of claim 12, wherein the distortion corrector includes a customer-site distortion analyzer that analyzes an image of the web having a product disposed therein to adjust distortion parameters.

14. The system of claim 11, wherein the at least one dryer includes a heater unit associated with and disposed downstream of one of the ink jet imager units and adapted to generate a flow of heated air to heat the web.

15. The system of claim 14, further comprising a camera disposed downstream of the heater unit, wherein the first closed-loop control system receives an image of the web from the camera, analyzes the received image to detect insufficient drying of material deposited on the web, and in response adjusts operation of the heater unit.

16. The system of claim 11, wherein the second closed-loop control system is adapted to register first content printed by the first portion of the first ink jet imager unit with content printed by the first portion of the second ink jet imager unit, register content printed by the second portion of the first ink jet imager unit with content printed by the second portion of the second ink jet imager unit, independently control the first portion and the second portion of the first ink jet imager unit, and independently control the first portion and the second portion of the second ink jet imager unit.

17. A printing system for printing a heat-shrinkable web, comprising:
- a transport apparatus adapted to transport a flexible heat-shrinkable web along a process direction, the heat-shrinkable flexible web having a total free shrink at 185° F. of at least 20% as measured by ASTM D2732;
- first and second individually controllable ink jet imager units offset from one another along the process direction wherein each of the first ink jet imager unit and the second ink jet imager unit includes a first portion operable to print on a first portion of the web and a second portion operable to print on the second portion of the web wherein each of the first portion and second portion of the first and second ink jet imager units is stationary along the process direction and the lateral direction and wherein the first ink jet imager unit prints on the web at a first print resolution and the second ink jet imager unit prints on the web at a second print resolution different than the first print resolution;
- at least one dryer operable to dry print on the web without substantial shrinking of the web;
- a first closed-loop control system responsive to an indication of web temperature that controls the at least one dryer; and
- a second closed-loop control system that controls registration between the first ink jet imager unit and the second ink jet imager unit wherein the second closed-loop control system is adapted to register first content printed by the first portion of the first ink jet imager unit with content printed by the first portion of the second ink jet imager unit, register content printed by the second portion of the first ink jet imager unit with content printed by the second portion of the second ink jet imager unit, independently control the first portion and the second portion of the first ink jet imager unit, and independently control the first portion and the second portion of the ink jet second imager unit.

18. The system of claim 17, further including a distortion corrector that adjusts dimensions of a page element to be printed on the web to compensate for distortion of the printed page element due to shrinking of the web.

19. The system of claim 18, wherein the distortion corrector includes a customer-site distortion analyzer that analyzes an image of the web having a product disposed therein to adjust distortion parameters.

20. The system of claim 17, wherein the at least one dryer includes a heater unit associated with and disposed downstream of one of the ink jet imager units and adapted to generate a flow of heated air to heat the web.

21. The system of claim 20, further comprising a camera disposed downstream of the heater unit, wherein the first closed-loop control system receives an image of the web from the camera, analyzes the received image to detect insufficient drying of material deposited on the web, and in response adjusts operation of the heater unit.

\* \* \* \* \*